US007846296B2

(12) United States Patent
Luu et al.

(10) Patent No.: US 7,846,296 B2
(45) Date of Patent: Dec. 7, 2010

(54) ABSORBENT SHEET EXHIBITING RESISTANCE TO MOISTURE PENETRATION

(75) Inventors: Phuong V. Luu, Appleton, WI (US); Steven L. Edwards, Fremont, WI (US); David W. White, Clintonville, WI (US); Brigitte K. Schauer, North Canton, OH (US); Martin A. Hynnek, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 109 days.

(21) Appl. No.: 11/974,864

(22) Filed: Oct. 16, 2007

(65) Prior Publication Data

US 2008/0044644 A1    Feb. 21, 2008

Related U.S. Application Data

(63) Continuation of application No. 10/702,414, filed on Nov. 6, 2003, now Pat. No. 7,300,547.

(60) Provisional application No. 60/424,434, filed on Nov. 7, 2002.

(51) Int. Cl.
*D21H 19/18*    (2006.01)
*D21H 27/30*    (2006.01)
*D21H 27/32*    (2006.01)

(52) U.S. Cl. ............... 162/172; 162/112; 162/123; 162/127; 162/184

(58) Field of Classification Search ......... 162/112, 162/119, 127, 135–137, 172, 179, 109, 183–186, 162/123; 428/152–154
See application file for complete search history.

(56) References Cited

U.S. PATENT DOCUMENTS 1,682,346 A    8/1928    Lorenze (Continued)

FOREIGN PATENT DOCUMENTS

GB    519618    4/1940

(Continued)

OTHER PUBLICATIONS

Fundamentals of Barrier Properties, Stannett, V.T. et al., Department of Chemical Engineering, North Carolina State University, Raleigh, North Carolina. (undated).

(Continued)

*Primary Examiner*—Eric Hug
(74) *Attorney, Agent, or Firm*—Michael W. Ferrell

(57) ABSTRACT

An absorbent paper sheet is treated with an aqueous wax dispersion such that the sheet includes a fused wax and emulsifier residue in an amount of from about 1 to about 20 weight percent of the sheet based on the combined weight of the fiber, wax residue and an emulsifier residue in the sheet. The fused wax emulsion operates to make at least one surface of the sheet laterally hydrophobic, exhibiting a moisture penetration delay of at least about 2 seconds and less than about 40 seconds as well as a typical contact angle with water at one minute of at least about 50 degrees. There is thus provided absorbent products which exhibit both absorbency and resistance to moisture penetration. The treated sheet further exhibits microbial barrier properties, impeding transfer of bacteria, for example, through the sheet. There are produced tissue products which resist moisture penetration from propelled liquids as well as sequester sorbed liquids in the interior of the tissue.

25 Claims, 36 Drawing Sheets
(6 of 36 Drawing Sheet(s) Filed in Color)

U.S. PATENT DOCUMENTS

| | | | |
|---|---|---|---|
| 3,432,936 A | 3/1969 | Cole et al. | 34/6 |
| 3,546,716 A | 12/1970 | Laumann | 4/112 |
| 3,607,348 A | 9/1971 | Wray et al. | 117/38 |
| 3,612,054 A | 10/1971 | Matsuda et al. | 128/287 |
| 3,654,064 A | 4/1972 | Laumann et al. | 161/156 |
| 3,994,771 A | 11/1976 | Morgan et al. | 162/113 |
| 4,102,737 A | 7/1978 | Morton | 162/113 |
| 4,117,199 A | 9/1978 | Gotoh et al. | 428/486 |
| 4,349,610 A | 9/1982 | Parker | 428/447 |
| 4,468,254 A | 8/1984 | Yokoyama et al. | 106/271 |
| 4,529,480 A | 7/1985 | Trokhan | 162/109 |
| 4,543,156 A | 9/1985 | Cheshire et al. | 162/101 |
| 4,601,938 A | 7/1986 | Deacon et al. | 428/153 |
| 4,786,367 A | 11/1988 | Bogart et al. | 162/158 |
| 4,789,564 A | 12/1988 | Kanner et al. | 427/255.6 |
| 4,816,320 A | 3/1989 | St. Cyr | 428/198 |
| 4,950,545 A | 8/1990 | Walter et al. | 428/446 |
| 4,987,632 A | 1/1991 | Rowe et al. | 15/104.93 |
| 5,227,242 A | 7/1993 | Walter et al. | 428/446 |
| 5,399,366 A | 3/1995 | Geddes et al. | 426/87 |
| 5,431,840 A | 7/1995 | Soldanski et al. | 252/174.17 |
| 5,449,551 A | 9/1995 | Taniguchi | 428/288 |
| 5,510,002 A | 4/1996 | Hermans et al. | 162/113 |
| 5,552,187 A | 9/1996 | Green et al. | 427/389.8 |
| 5,560,945 A | 10/1996 | Geddes et al. | 426/87 |
| 5,585,129 A | 12/1996 | Geddes et al. | 426/394 |
| 5,601,871 A | 2/1997 | Krzysik et al. | 427/288 |
| 5,609,901 A | 3/1997 | Geddes et al. | 426/394 |
| 5,614,293 A | 3/1997 | Krzysik et al. | 428/222 |
| 5,650,218 A * | 7/1997 | Krzysik et al. | 428/195.1 |
| 5,658,639 A | 8/1997 | Curro et al. | 428/131 |
| 5,665,426 A | 9/1997 | Krzysik et al. | 427/211 |
| 5,690,788 A | 11/1997 | Marinack et al. | 162/113 |
| 5,695,487 A | 12/1997 | Cohen et al. | 604/384 |
| 5,716,692 A | 2/1998 | Warner et al. | 428/153 |
| 5,792,404 A | 8/1998 | Cree et al. | 264/134 |
| 5,849,000 A | 12/1998 | Anjur et al. | 604/367 |
| 5,851,352 A | 12/1998 | Vinson et al. | 162/112 |
| 5,851,353 A | 12/1998 | Fiscus et al. | 162/113 |
| 5,855,697 A | 1/1999 | Luo et al. | 148/420 |
| 5,858,173 A | 1/1999 | Propst, Jr. | 162/164.1 |
| 5,865,955 A | 2/1999 | Ilvespaa et al. | 162/207 |
| 5,891,309 A | 4/1999 | Page et al. | 162/281 |
| 5,932,316 A | 8/1999 | Cree et al. | 428/182 |
| 5,968,590 A | 10/1999 | Ahonen et al. | 427/209 |
| 5,972,094 A | 10/1999 | Bates et al. | 106/145.1 |
| 6,001,421 A | 12/1999 | Ahonen et al. | 427/316 |
| 6,015,935 A | 1/2000 | LaVon et al. | 604/378 |
| 6,025,049 A | 2/2000 | Ouellette et al. | 428/131 |
| 6,027,611 A | 2/2000 | McFarland et al. | 162/127 |
| 6,033,736 A | 3/2000 | Perlman et al. | 427/384 |
| 6,046,378 A | 4/2000 | Quincy, III et al. | 604/375 |
| 6,054,020 A | 4/2000 | Goulet et al. | 162/112 |
| 6,066,379 A | 5/2000 | Ma et al. | 428/53 |
| 6,074,525 A | 6/2000 | Richards | 162/100 |
| 6,107,539 A | 8/2000 | Palumbo et al. | 604/378 |
| 6,119,362 A | 9/2000 | Sundqvist | 34/120 |
| 6,180,052 B1 | 1/2001 | Ouellette et al. | 264/504 |
| 6,187,695 B1 | 2/2001 | Krzysik et al. | 442/62 |
| 6,231,948 B1 | 5/2001 | Ouellette et al. | 428/131 |
| 6,232,521 B1 | 5/2001 | Bewick-Sonntag et al. | 604/378 |
| 6,261,580 B1 | 7/2001 | Lehrter et al. | 424/402 |
| 6,267,842 B1 | 7/2001 | Ishikawa et al. | 162/135 |
| 6,332,952 B1 * | 12/2001 | Hsu et al. | 162/127 |
| 6,383,960 B1 | 5/2002 | Everett et al. | 442/394 |
| 6,403,858 B1 | 6/2002 | Quincy, III et al. | 604/375 |
| 6,416,628 B1 | 7/2002 | Huang et al. | 162/180 |
| 6,432,267 B1 | 8/2002 | Watson | 162/111 |
| 6,758,943 B2 * | 7/2004 | McConnell et al. | 162/158 |
| 2003/0219613 A1* | 11/2003 | Boylan | 428/523 |

FOREIGN PATENT DOCUMENTS

| | | |
|---|---|---|
| WO | WO 00/00698 | 1/2000 |
| WO | WO 03/037394 A1 | 5/2003 |

OTHER PUBLICATIONS

Smart Materials for Liquid Control, Non-Wovens World, Oct.-Nov. 1999, Dyrmose-Peterson, pp. 95-99.

* cited by examiner

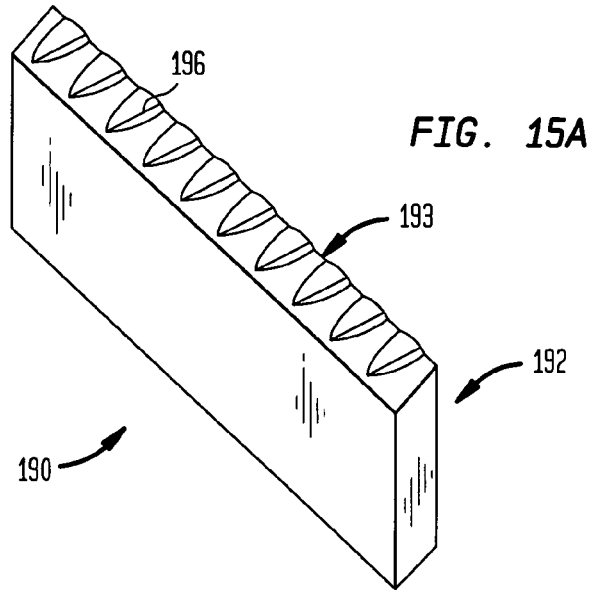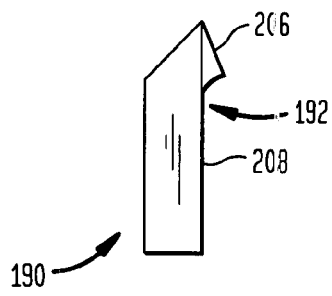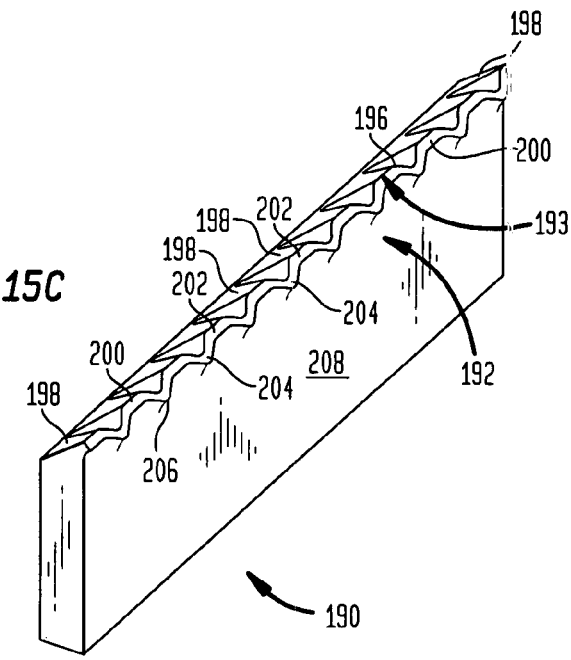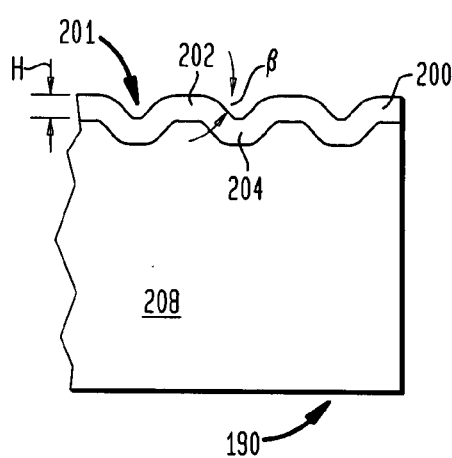
FIG. 15A
FIG. 15B
FIG. 15C
FIG. 15D

3-PLY STERNUTATION TESTING

3-PLY STERNUTATION TESTING
COMMERCIAL TISSUE

6-PLY STERNUTATION TESTING
COMMERCIAL TISSUE

ABSORBENT SHEET EXHIBITING RESISTANCE TO MOISTURE PENETRATION

CROSS-REFERENCE TO RELATED APPLICATIONS

This non-provisional patent application is a continuation of U.S. patent application Ser. No. 10/702,414, filed Nov. 6, 2003, now U.S. Pat. No. 7,300,547. U.S. patent application Ser. No. 10/702,414 was based upon U.S. Provisional Application Ser. No. 60/424,434 filed Nov. 7, 2002 and also is of like title with this application. The priorities of the above applications are hereby claimed and their disclosures incorporated herein by reference.

TECHNICAL FIELD

The present invention relates generally to absorbent paper sheet such as tissue, towel, or the like, treated with a wax dispersion which is heated in situ above the melting temperature of the wax so as to fuse the wax with the web. The absorbent sheet of the invention includes a moisture-penetration resistant layer provided with a laterally hydrophobic surface.

BACKGROUND ART

Additives or other treatments to enhance the performance of absorbent sheet are well known in the art. There is disclosed in U.S. Pat. No. 6,074,525 to Richards a process for increasing bulk of a foreshortened fibrous web which in includes adding moisture to the web at selected portions, thereby causing the crepe in those portions to relax. Among the functional additives which may be present in the added moisture, there are listed softeners, debonders, binders, polyhydroxy compounds, lotions, dispersions, anti-bacterial agents and so forth. See (Col. 10, lines 50-(Col. 11, line 5.

Polymer films have been used on paper products to enhance or provide barrier properties. Barrier performance of polymer films on paper substrates is a complex process and is influenced by the wicking effects in the paper. Films may be applied to paper by extrusion or the like or by way of a latex. See FUNDAMENTALS OF BARRIER PROPERTIES, Stannett, V. T. et al., Department of Chemical Engineering, North Carolina State University, Raleigh, N.C. (undated). Dispersion coating is likewise known. For example, there is shown in EP 1103522 A1 a process is disclosed for application of a polymer coating on a granular activated carbon to essentially eliminate or significantly reduce attrition by dusting without a reduction in absorptive velocity or capacity of the activated carbon. The coatings applied include a high density polyethylene dispersion and a silicone dispersion. See EP 1 103522 A1 at page 5, lines 10 and following.

Composite structures including paper layers are often used in products requiring a variety of attributes in the overall performance of the product. This is so, in part, because an open paper structure will have good liquid acquisition properties but poor distribution properties. Multiple layers may accordingly be employed in some absorbent products which require a spectrum of properties. One non-woven described in SMART MATERIALS FOR LIQUID CONTROL, Non-Wovens World, October-November 1999, Dyrmose-Peterson, pages 95-99 includes an upper (over stock layer thermally bonded to a layer combining both desirable liquid acquisition and distribution properties.

Likewise, composite structures have been used as bed pan liners for example. See U.S. Pat. No. 3,546,716 to Laumann. The bed pan liner described in the '716 patent includes generally a cold water-soluble base film of synthetic polymeric material, a water insoluble or water repellant coating on one side of the base film and tissue paper covering and adhered to the insoluble coating.

So also, a sheet product including a substrate of non-woven cellulosic fibers, a discontinuous prime coating of hydrophobic material adhering to the cellulosic fibers and a second hydrophilic material filling the surface voids between hydrophobic material deposits is described in U.S. Pat. No. 3,607,348 to Wray et al. The dual coatings described in the '348 patent render the paper relatively impermeable.

There is described in U.S. Pat. No. 5,399,366 to Geddes et al. multi-layer packaging for hot food. The package includes an absorbent layer for disposing adjacent the hot food, an extruded barrier film layer adjacent the absorbent layer and an outer paper layer adjacent the barrier layer. The absorbent layer keeps moisture and grease away from the hot food (employing a partially hydrophobic or a low-capacity sub-layer) while the barrier layer prevents soak through and retains heat. Various polymers and waxes are used in the impermeable layer. See also U.S. Pat. Nos. 5,560,945; 5,585,129; and 5,609,901 also to Geddes et al.

There has been employed in connection with absorbent paper structures, various means to increase water resistance. There is disclosed in U.S. Pat. No. 1,682,346 to Lorenz a multi-layer paper sheet for wash cloths and the like which will not dissolve during use. At least one layer is made from pulp which has been sized with resin or latex to impart water resistance. Indeed, paper structures have been modified or combined with layers of polymer films in a variety of ways to enhance performance or provide performance attributes not attainable with paper alone. There is disclosed in U.S. Pat. No. 3,654,064 to Laumann a multi-layer structure including layers of tissue paper and wax for providing a disposable barrier pro duct. In general, the wax or polymer layer is applied to the paper substrate by way of extrusion coating. See Col. 4, lines 14 and following. In U.S. Pat. No. 3,612,054 to Matsuda there is disclosed a sanitary napkin including a plurality of layers of absorbent material and at least one barrier sheet of liquid repellant material interposed between absorbent layers. The barrier sheet is reported to improve distribution of liquid within the absorbent material. U.S. Pat. No. 4,117,199 to Gotoh et al. discloses a coated paper having a moisture and water-proof coating thereon produced by coating a paper substrate with an aqueous dispersion containing a synthetic rubber latex and a wax dispersion in various amounts. See Col. 3, lines 25 and following.

U.S. Pat. No. 4,349,610 to Parker discloses a method for improving the water repellency of a naturally porous, moisture containing paper web by treating the web with a coating composition containing as its active coating ingredient an alkyl alkoxysiloxane which reacts with the moisture contained in the paper web to produce a polymer.

U.S. Pat. No. 4,786,367 to Bogart et al. discloses a soft, absorbent and bulky cellulosic fibrous web which has been treated to impart a soothing or emollient effect to the human skin when used for wiping and drying. The agent applied to the web is a lauroamphoglycinate.

U.S. Pat. No. 4,601,938 to Deacon et al., discloses paper towels which have been impregnated with a liquid composition. Migration of the liquid along the length of the paper substrate is substantially prevented by dividing the substrate into a plurality of individual areas by means of a repeating pattern of liquid-repellant barrier material, for example, wax or certain resins, extending across the width of the substrate.

U.S. Pat. No. 4,789,564 to Kanner et al. discloses that paper may be treated with certain hydridoaminosilanes in order to render the materials water-repellant.

U.S. Pat. No. 4,816,320 to St. Cyr discloses a multiply tissue for use as cleansing, facial or toilet tissue combining at least one and preferably two, soft, absorbent layers of loosely felted cellulose fiber paper and an overlying layer of thin, light-weight moisture resistant cellulose fiber paper with non-skid traction material overlying the moisture resistant layer. The traction material may be a layer of cellulose fiber paper having a roughened overlying surface or may have an out-r coating of finely divided latex particles applied to the overlying surface of the moisture resistant layer or to a separate, overlying layer. The moisture-resistant layer may be, for example, a layer of glassine paper. See Col. 2, lines 50-55.

U.S. Pat. No. 4,950,545 to Walter et al. discloses facial tissue containing a silicone compound exhibiting improved softness and reduced lint while maintaining absorbency. According to the disclosure, the silicone compound is added in an amount of from about 0.1 to about 5 weight percent. See Col. 1, lines 40-45. See, also, U.S. Pat. No. 5,227,242 to Walter et al.

In U.S. Pat. No. 4,987,632 to Rowe et al. discloses an absorbent wiping towel suitable for use in cleaning soiled surfaces in the presence of water which includes an absorbent substrate, such as paper, having applied thereon a moisture barrier to cover at least 10% of the total area of each side of the sheet in such a manner that the moisture barrier on one side of the sheet coincides with the moisture barrier on the opposite side so as to form a sandwich. Examples of moisture barrier material include wax dispersions applied to the sheet. See Col. 7, lines 40 and following.

There is disclosed in U.S. Pat. No. 5,449,551 to Taniguchi a fibrous web such as tissue paper and non-woven fabrics containing at least one kind of hygroscopic material such as polyhydric alcohols or sugars exhibiting hygroscopicity. According the '551 patent the hygroscopic material renders the tissue softer and increases the adhesiveness between fibers, thereby reducing lint.

In U.S. Pat. No. 5,552,187 to Green et al. there is disclosed a fibrous mat-faced gypsum board coated with a water-resistant resinous coating. A preferred resin for use in connection with these structures is available in the form of a latex sold by Unicol Chemicals Division of Unicol Corporation under the mark 76 RES 1018. The pH and solids content of the latex are respectively 7.5-9 and 50%. The resin is a styrene acrylic copolymer which has a relatively low film forming temperature and a Tg of 22° C. See Col. 9, lines 57 and following.

There is disclosed in U.S. Pat. No. 5,601,871 to Krzysik et al. a soft, uncreped through dried tissue product having uniformly distributed surface deposits of a chemical composition which imparts a reduction in skin irritation during use. Suitable compositions are those which have a melting point of from about 30° C. to about 70° C. and are applied to the outer surface of the tissue product in melted form, preferably by rotogravure printing. A suitable composition contains an oil, a wax and preferably a fatty alcohol. Add-on rates may be from about 1% to at out 40 weight percent of the product. See Col. 3, lines 12 and following.

In some embodiments, the product of the '871 patent is characterized by its hydrophobicity which helps prevent "wet-through" to the users hand during use. This property can be measured in accordance with U.S. Pat. No. 4,950,545 noted above. See also U.S. Pat. No. 5,614,293 and U.S. Pat. No. 5,650,218 to Krzysik et al. as well as: U.S. Pat. No. 5,665,426 to Krzysik et al. which discloses a tissue product having uniformly distributed surface deposits of a solidified composition having a melting point of from about 30° C. to about 70° C.; and U.S. Pat. No. 5,885,697 and U.S. Pat. No. 6,187,695 both to Krzysik et al. all of which references disclose tissue products having disposed thereon surface deposits of a solidified composition having a melting point of from about 30 to about 70° C. Such compositions include in melted firm oils, waxes, and the like. The additive is reported to enhance the feel of the tissue upon the skin.

In U.S. Pat. No. 6,267,842 to Ona et al. there is disclosed a water-based treatment agent for application to tissue paper which suppresses a feeling of slipperiness or wetness in ordinary tissue paper so that the paper has a dry touch, ample smoothness and a clean, smooth, tactile impression. The treatment age it includes a silicone oil dispersion in which cross-linked silicone particles of a specified size contained in the silicone oil droplets are dispersed in water and applied to the tissue. See Col. 10, lines 5 and following.

There is disclosed in U.S. Pat. No. 5,716,692 to Warner et al. a lotioned tissue paper. The lotion composition is applied to the tissue in amour its of from about 5 to about 15 percent by weight. The lotion composition includes plastic or fluid emollient such as petrolatum, a mixture of petrolatum with alkyl ethoxylate emollient and an immobilizing agent such as a fatty alcohol or a fatty acid to immobilize the emollient on the surface of the tissue paper web and optionally a hydrophilic surfactant to improve wettability when applied to the tissue.

Various additional methods of influencing liquid migration in a web or composite structures are disclosed in the following U.S. Pat. No. 5,658,639 to Curro et al.; U.S. Pat. No. 5,695,487 to Cohen et al.; U.S. Pat. No. 5,792,404 to Cree et al.; U.S. Pat. No. 5,849,000 to Anjur et al.; U.S. Pat. No. 5,932,316 to Cree et al.; U.S. Pat. No. 6,015,935 to LaVon et al.; U.S. Pat. No. 6,025,049 to Ouellette et al.; U.S. Pat. No. 6,046,378 to Quincy, III et al.; U.S. Pat. No. 6,107,539 to Palumbo et al.; U.S. Pat. No. 6,180,052 to Ouellette et al.; U.S. Pat. No. 6,231,948 to Ouellette et al.; U.S. Pat. No. 6,232,521 to Bewick-Sonntag et al.; U.S. Pat. No. 6,383,960 to Everett et al.; U.S. Pat. No. 6,403,858 to Quincy, III et al.; and U.S. Pat. No. 6,416,628 to Huang et al. Curro et al. '639; Cree et al. '404, Cree et al. '316, Ouellette et al. '049, '948 and '052, and Bewick-Sonntag et al. '521 relate to increasing the moisture penetration into a web by making a surface more hydrophobic. Anjur et al. '000 report greater permeability when a wettable staple fiber is used with a wettable binder fiber, while La Von et al. enumerates advantages of having enhanced vertical wicking in the crotch area of certain absorbent products and Cohen et al. disclose corrugated structures for increasing Z-direction liquid transport. So also, it is seen in U.S. Pat. No. 6,046,378 to Quincy, III, et al. that wettability of synthetic fibers is increased by altering their surface properties; in this respect, see also Quincy, III, et al. '858, as well as Palumbo et al., '052. The '960 Everett et al. patent discloses composites including superabsorbent polymers and finally with respect to the patents noted in this paragraph, Huang et al. '628 relates to paperboard impregnated with hydrophobic rosin.

Perhaps more pertinent to the discussion which follows are the references noted below.

U.S. Pat. No. 6,332,952 to Hsu et al. discloses a tissue with strikethrough resistance provided by way of a water-repellant agent such as sizing agents, waxes, or latexes. Col. 1-2. The sizing agent is added in an amount of from about 0.5 to 10 pounds per ton of fiber, e.g., from about 0.025 to about 0.5 percent by weight, Col. 2, lines 42-46. In some embodiments, the tissue does not contain permanent wet-strength binder resins such as polyamide epichlorohydrin resins. Col. 6, lines 2-11, and the sizing is sprayed on the tissue after the product is creped from a Yankee dryer, or wax, for example, may be added to the furnish before it is applied to the forming fabric by way of a layered headbox. The only repellant agent exemplified is an alkyl ketene dimer. There is disclosed in related PCT publication No. WO 00/00698 (Application No. PCT/US99/14402) a toilet tissue product including a first cellulosic ply and a second cellulosic ply at least one of which has been treated with a repellant agent to prevent fluid from striking through the tissue product. The repellent agent is added in an amount of from about 1 to about 30 pounds per ton of fiber; and more specifically from about 1.2 to about 20 pounds per ton of fiber. See Publication No. WO 00/00698 at page 2, lines 8 and following.

U.S. Pat. No. 6,027,611 to McFarland et al. discloses a process by which facial tissue is rendered resistant to water penetration by treating the fibers with a sizing agent prior to forming the sheet, or typically after the sheet is formed. The sizing agent is added in an amount of from about 1 to about 10 pounds of sizing agent per ton of fiber in the tissue, that is, up to about 0.5 weight percent. See, Col. 2, lines 22-26. Typical products have an absorbency rate of from 100-400 seconds. See, Cols. 2-3.

In U.S. Pat. No. 6,054,020 to Goulet et al. there is disclosed tissue and towel products which resist moisture. Moisture-resistance is imparted by way of amine-modified polysiloxane compounds applied to the outer surfaces of the web. The amount of amine functionality may be controlled to adjust hydrophobicity to the desired levels which delay, however, allow moisture penetration into the tissue. The siloxane may be typically applied in the form of an dispersion. Add-on rates are specified to be from about 0.1 to about 5 weight percent. Col. 4, lines 12-19. The products of the '020 patent are reported to have characteristically long wet-through times and relatively large wet-out areas.

U.S. Pat. No. 5,851,352 to Vinson et al. discloses a multi-ply tissue product provided with an internal surface which has deposited thereon a strength agent in an amount of form 0.5 to 10% by weight. The only strength resin exemplified is an acrylic latex applied by way of direct roto-gravure printing. See Column 25, line 43 and following. Note also a number of water-soluble materials are enumerated in Col. 7, line 55 and following.

U.S. Pat. No. 6,066,379 to Ma et al. discloses a repulpable water-resistant paperboard provided with a water-repellant coating which includes a polymer matrix, wax and pigment mixture. The paperboard is particularly well-suited for corrugated products. The water-repellant coatings are reported to form pinhole-free coatings (Col. 8, line 10 and following) and are applied in amounts of from about 2-3 weight percent of the weight of the paperboard.

U.S. Pat. No. 5,858,173 to Propst, Jr. discloses coating cardboard and the like with an aqueous acrylic/wax dispersion mixture to provide grease ad water resistance. A typical mixture includes 15 parts of a high viscosity aqueous acrylic resin dispersion, 65 parts of a low viscosity aqueous acrylic resin dispersion and 6 parts of an aqueous polyethylene wax dispersion. The mixture is applied upstream of the headbox, in the headbox or downstream of the headbox by spraying, for example. According to the patent, more or less than 3.0-20% by weight of the aqueous composition can be incorporated into the stock or finished paper. Col. 4, line 4. According to the '173 patent, the described product is repulpable.

SUMMARY OF INVENTION

The present invention relates generally to absorbent paper tissue, towel and the like, wherein the web of cellulosic fibers has been rendered resistant to moisture penetration while generally retaining its absorbency. In preferred embodiments the treated webs exhibit physical properties such as air permeability and wet tensile strength similar to, or the same as, a like untreated product. A web treated with a few weight percent wax and emulsifier in accordance with the invention is capable of exhibiting a contact angle with water almost the same as the wax for a limited time and thus controls the migration of fluid in the web much more so than one would expect given the relatively small amount of wax present. That is, a small amount of wax can increase the contact angle with water of a cellulosic web, typically 0 degrees, to an initial contact angle value comparable to wax at about 90 degrees while the absorbency of the web is maintained. An aqueous wax/emulsifier composition applied to the web does not exhibit the desired barrier properties described herein until the residue is heated above its melting point in situ with the web. Without intending to be bound by any theory, it is believed that the emulsifier operates as a dispersing aid for the wax and cooperates with the fiber surfaces to disseminate the wax in the web such that the wax has no independent macro-structure and the wax associates with a great deal of fiber surface area at a hydrophobic surface of the treated web.

A typical process for treating a web in accordance with the invention involves wetting at least one surface of the web with an aqueous dispersion including a wax and an emulsifier and heating the web above the melting point of the wax to fuse the wax of the dispersion and to provide a hydrophobic surface on the web. The hydrophobic surface is much more hydrophobic than the web of cellulosic fibers and generally exhibits a contact angle with water at one minute of 50 degrees or more.

There is thus provided in one aspect of the invention, a method of making an absorbent cellulosic web resistant to moisture penetration comprising: (a) wetting at least one surface of the web with an aqueous dispersion including a wax and an emulsifier; and (b) heating the web above the melting temperature of the wax to fuse the wax of the dispersion and to provide a hydrophobic surface on the web, the wax being disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web.

The aqueous wax dispersion may be sprayed, printed or otherwise applied to the web and is optionally dried before heating to a temperature above the melting temperature of the wax. Heat may be applied to the web by way of an oven or by way of a Yankee Dryer, an impingement-air dryer, a through-dryer and so forth as is known in the art.

In another aspect, there is provided a method of making a multi-ply at sorbent cellulosic product comprising: (a) wetting at least one surface of a web with an aqueous dispersion including a wax and an emulsifier; (b) heating the wetted web above the melting temperature of the wax to fuse the wax of the dispersion and to provide a hydrophobic surface on the web, the wax being disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web; and (c) plying the web with at least one additional ply.

In a still further aspect, there is provided a method of making a tissue product comprising: (a) wetting at least one surface of a web with an aqueous dispersion including a wax and an emulsifier; (b) heating the web above the melting temperature of the wax to fuse the wax of the dispersion and to provide a hydrophobic surface on the web, wherein the wax is disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web; and (c) incorporating the web into a tissue product having a basis weight of from about 15 to about 30 lbs per 3000 square foot ream, wherein the tissue product exhibits liquid penetration barrier properties such that less than about 20 percent of liquid sorbed from 0.1 ml of liquid propelled to one surface of the tissue in a sneeze simulation test will penetrate to the surface of the tissue product opposite to impact of the liquid.

The foregoing aspects of the invention may be combined independently with the Alternative Embodiments enumerated hereinafter which may likewise be independently combined with one another. The invention also relates to a multiplicity of products enumerated hereinafter.

BRIEF DESCRIPTION OF DRAWINGS

The file of this patent contains at least one drawing executed in color. Copies of this patent with color drawing(s) will provided the Patent and Trademark Office upon request and payment of the necessary fee.

The invention is described in detail below with reference to the drawings, wherein like numerals designate similar parts and wherein.

DETAILED DESCRIPTION

The invention is described in detail below with reference to the various examples and Figures provided herein. Such discussion and exemplification are for purposes of illustration only and is not intended to limit in any way the scope of the present invention. Variations and modifications to various exemplified embodiments within the spirit and scope of the present invention, defined in the appended claims, will be readily apparent to those of skill in the art. Typically, the treated products of the invention are prepared by wetting an absorbent web with an aqueous wax dispersion including a wax and an emulsifier followed by melt fusing the wax dispersion with the web to prepare a product with at least one hydrophobic surface.

The products of the invention are further appreciated by reference to FIGS. 1A-1F and 2A-2F which are color photographs and photomicrographs in various views of the plies of wax treated napkins which were wetted with blue-dyed water in order to show barrier and liquid transport properties. The napkins generally had the two-ply structure shown in FIGS.

19 and 20; that is, one treated ply and one untreated ply. The napkins were suspended in a frame as noted in connection with the moisture penetration delay protocol (described hereinafter) in unfolded form and wetted with blue-dyed water at their upper surface using a dropper. The liquid was allowed to spread within the test specimen. After drying the specimens were separated into their constituent plies and photographed. Representative photographs are appended as FIGS. 1A-1F and 2A-2F and are further discussed below.

Figure 1A:
FIGS. 1A-1F are color photographs and photomicrographs of various plies of a two-ply napkin of the invention wherein a hydrophobic surface is wetted with blue-dyed water to illustrate barrier properties.
Figure 1B:
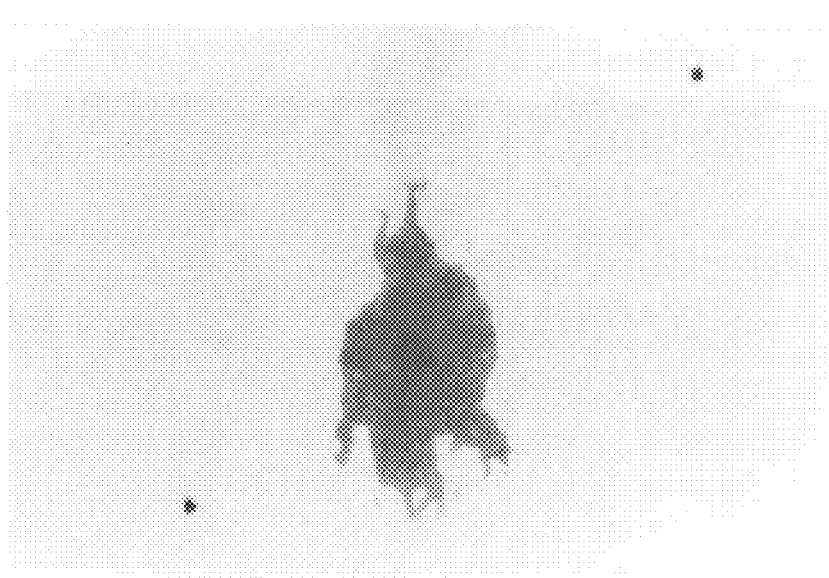

FIG. 1A is a photograph (1×) of the upper surface of a wax treated ply (that is, the upper surface was the surface of the ply to which the wax dispersion was applied) which was wetted with colored water. It can be seen that the point of application in the center of the stain is significantly darker than the periphery, indicating liquid transport preferentially in the Z-direction into the sheet. FIG. 1B is a photograph (1×) of the inner surface of the upper ply, the surface of the ply opposite the surface shown in FIG. 1A, again showing the stain more concentrated at its center. The surface of FIG. 1A typically has a contact angle with water at one minute of about 90° or so, while the surface of FIG. 1B has a contact angle, with water at one minute of about 60°-75° or so. In either case, it is seen the hydrophobicity is such that moisture preferentially migrates inwardly rather than laterally in the treated ply.

Figure 1C:
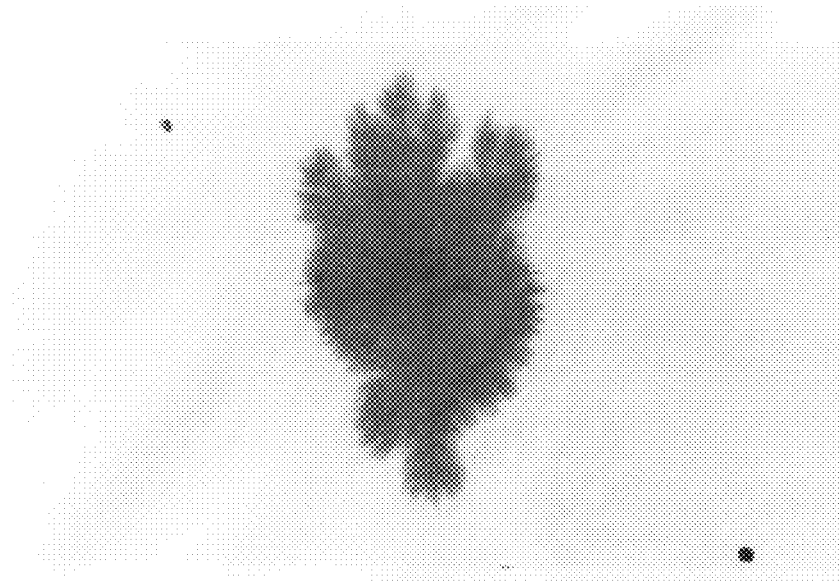
Figure 1D:
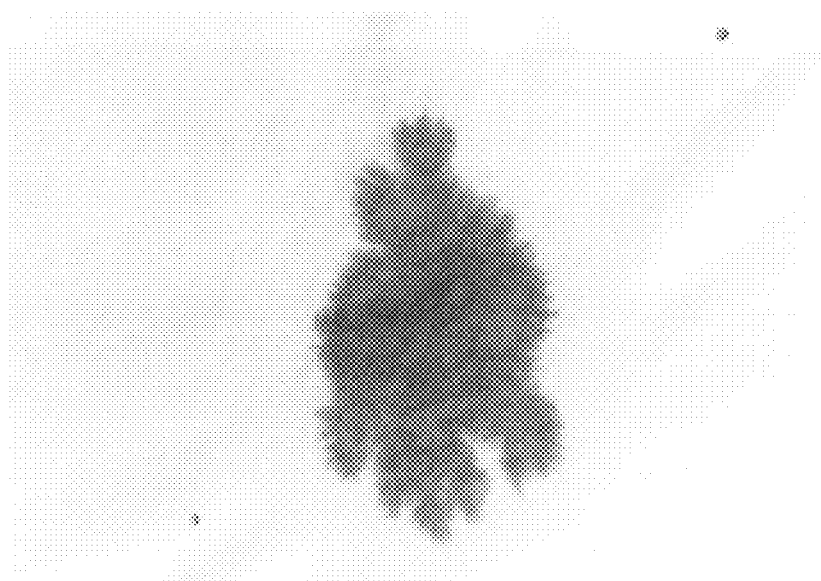

FIG. 1C is a photograph (1×) of the upper surface of the lower, untreated ply of the test specimen. Here, it is seen the stain is relatively uniform indicating substantial lateral migration in the hydrophilic ply which typically has a contact angle with water of about 0°. Further, FIG. 1D is a photograph (1×) of the opposite surface of the lower hydrophilic ply; that is, the lowermost surface of the test specimen, which again is relatively uniform indicating substantial lateral migration of moisture. Moreover, it can be seen that FIGS. 1C and 1D have relatively similar stain intensity indicating relatively uniform absorption in the untreated ply in all directions.

Figure 1E:
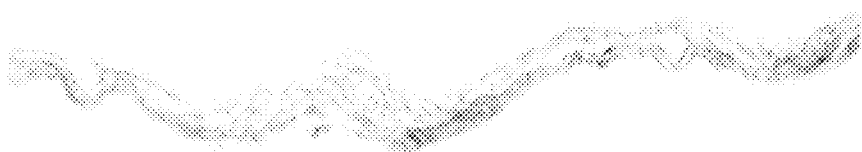
Figure 1F:
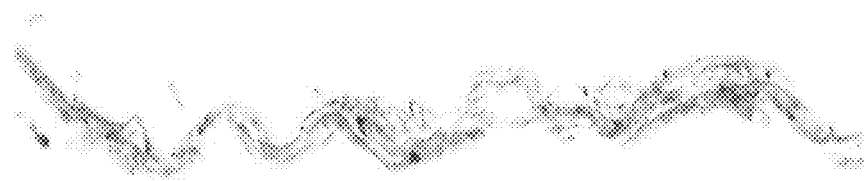

FIGS. 1E and 1F are color photomicrographs (250×) of the plies of FIGS. 1A-1D taken from the side at locations away from the insult but within the stain area, respectively. It can be seen in FIG. 1E that the upper surface of the upper ply is essentially unstained, indicating moisture penetration substantially in an inward direction and a lack of lateral moisture migration on the surface. Moreover, it can be seen from FIG. 1E that while the lower surface of the upper ply is somewhat stained, the stain extends only about halfway through the ply indicating the fused wax dispersion acted effectively as a barrier to moisture wicking to the treated surface from the larger and more concentrated stain in the hydrophilic layer below.

FIG. 1F is a side view of the lower ply of the test specimen in the stain at a location away from the point of insult. Here it is seen the stain is more concentrated and uniform indicating uniform absorption or fluid in all directions and preferential absorption in the lower layer.

In some applications of the invention, it is preferable in many cases to orient the structure so that the point of moisture contact is at a hydrophilic, highly absorbent layer as is seen in FIGS. 2A-2D. In these Figures, the two ply napkin was oriented so that the treated ply was oriented downwardly with the surface where wax was applied being the lowermost surface and the uppermost surface where the napkin was wetted in the tests was an untreated ply. Here again, absorbency, moisture migration and barrier properties are analogous to the features observed when the napkin is wetted from the other side.

Figure 2A:
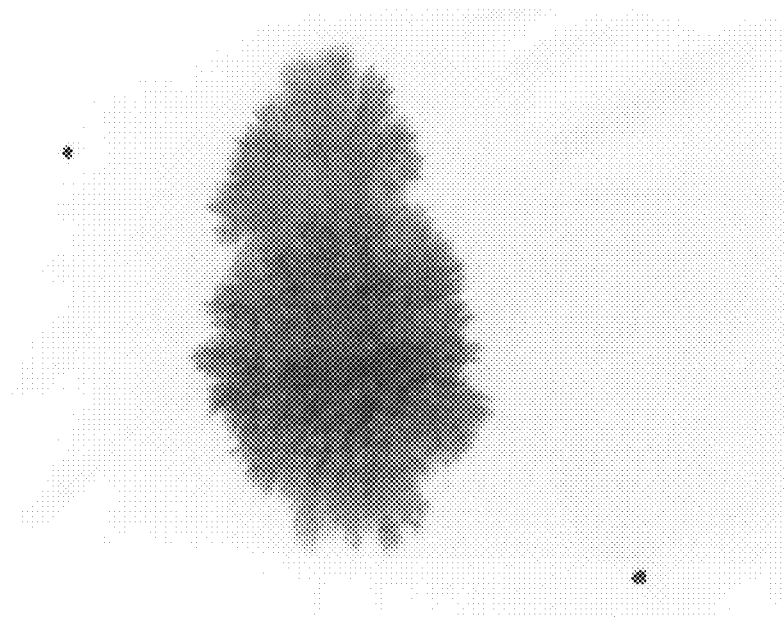
FIGS. 2A-2F are color photographs and photomicrographs of various plies of a two-ply napkin of the invention wherein a hydrophilic surface is wetted with blue-dyed water to illustrate barrier properties.

FIG. 2A is a photograph (1×) of the uppermost surface of the untreated ply which was wetted with the dyed water. It can be seen that the stain is intensive and uniform in the X-Y plane indicating uniform fluid absorption in all directions.

Figure 2B:
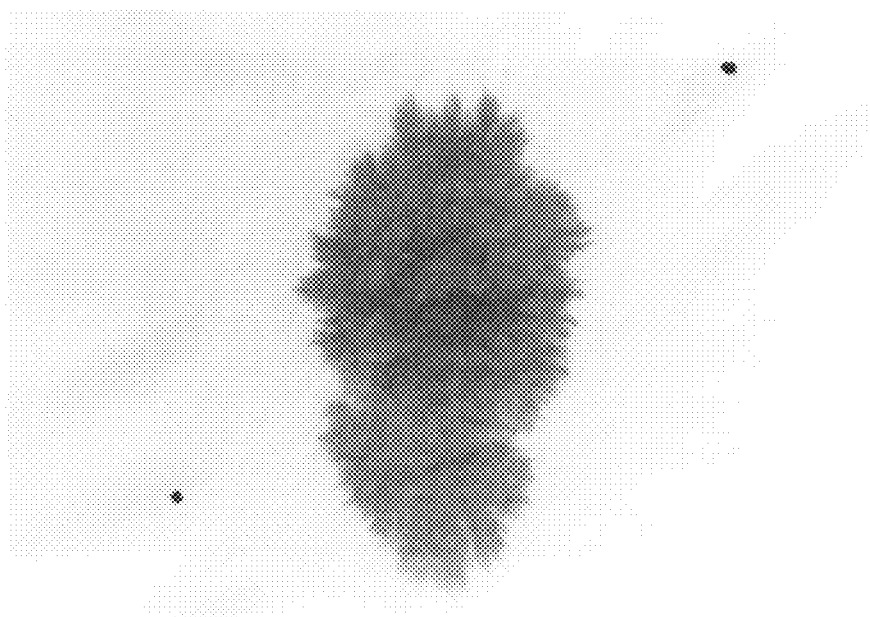

FIG. 2B is a photograph (1×) of the opposite (internal) surface of the untreated ply, again showing an intense uniform stain throughout. The stains in FIGS. 2A and 2B are relatively uniform in all directions and of similar intensity indicating relatively uniform absorption in the X, Y and Z directions in the ply.

Figure 2C:
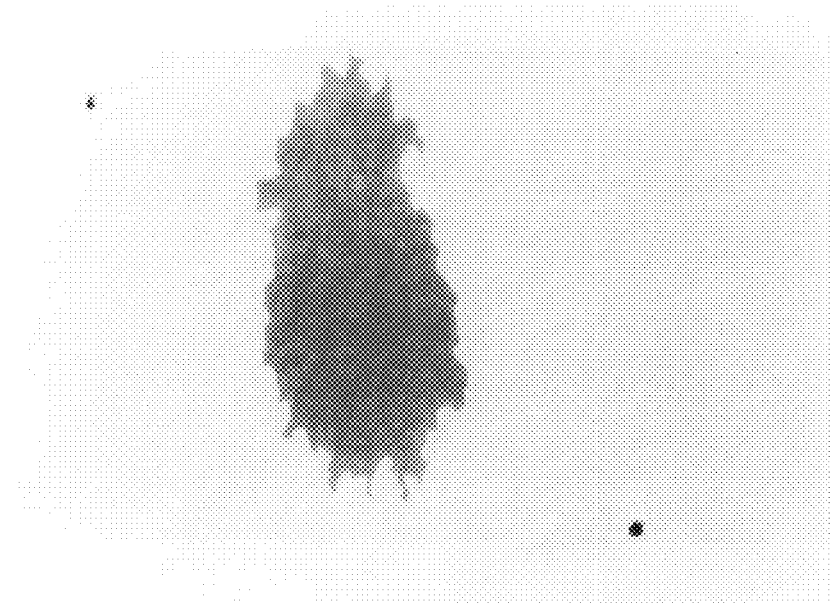
Figure 2D:
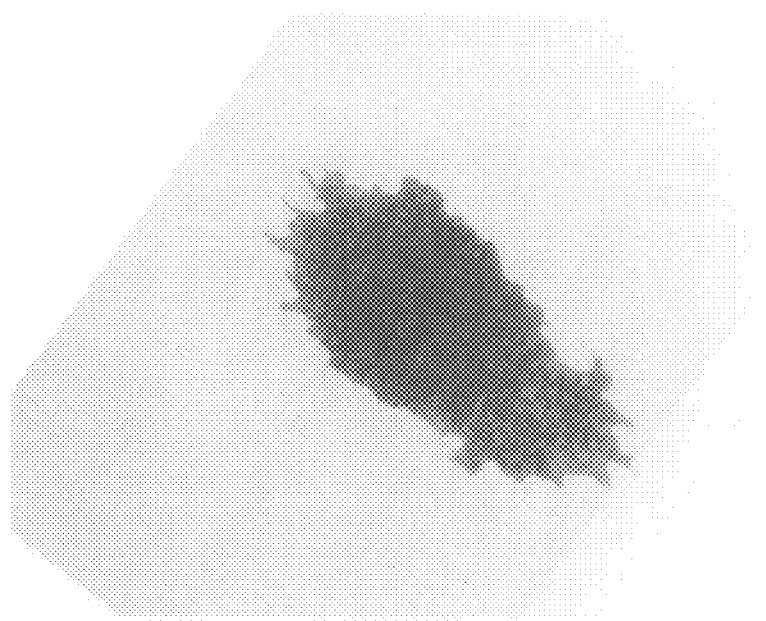

FIG. 2C is a photograph (1×) of the upper (inner) surface of the lower treated ply, while FIG. 2D is a photograph (1×) of the outer surface of the treated ply, which has a slightly larger contact angle with water than the upper surface, of the ply as noted above. Here it is seen that the stains of FIGS. 2C and 2D are much less intense than those of FIGS. 2A and 2B, indicating resistance to moisture transfer to the ply. In addition, the stain at the outer surface (2D) is less intense than at its inner surface (2C) indicating barrier properties within the ply, despite its almost negligible thickness.

Figure 2E:
Figure 2F:
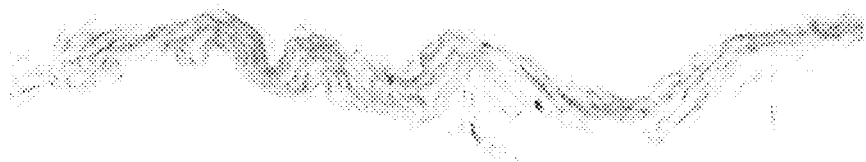

FIGS. 2E and 2F are photomicrographs (250×) showing a side view of the stain of FIGS. 2A-2D; FIG. 2E being the upper ply and FIG. 2F being the lower ply. As one might expect from the foregoing discussion, an intense uniform stain is observed in the upper ply, FIG. 2E. The lower ply (FIG. 2F) shows a substantially complete barrier to moisture penetration wherein the dye terminates before the lower surface of the ply.

As it will be appreciated from the discussion which follows, there are numerous aspects and variations which may be employed in connection with the present invention. There is provided in one aspect an absorbent cellulosic web exhibiting resistance to moisture penetration including an absorbent web of cellulosic fibers provided with a fused wax composition in intimate contact with the fibers in the web generally assimilating the morphology of the fiber surfaces, the fused wax composition including a wax and an emulsifier and being disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web. The open microstructure is demonstrated by the air permeation data appearing hereinafter as well as the appended photomicrographs, typically preserving at least 80 percent of the permeability of an untreated web. The fused nature of the wax is seen in numerous aspects since, for example, the wax does not exhibit an observed macrostructure of its own either as film or as particles when viewed at a magnification of 250×. Moreover, the wet strength of the web does not change dramatically and the contact angles increase as the wax/emulsion composition is melt-fused in situ with the web for adequate times as will be appreciated from the various examples hereinafter.

Typically, the laterally hydrophobic surface of the web exhibits a moisture penetration delay of from about 3 to about 40 seconds with delay times of 5, 10, or 20 seconds being somewhat typical. The wax is generally present in an amount of from about 1 to about 20 weight percent based on the amount of wax and cellulosic fiber in the web, with from about 2 to about 10 weight percent based on the amount of wax and cellulosic fiber in the web being typical. Preferably, there is about 3 to about 5 weight percent wax based on the amount of wax and cellulosic fiber in the web.

The wax treatment generally should not prevent the web or sheet from remaining permeable to air. Generally, the web exhibits an air permeability of at least 25 percent of the air permeability of a like web untreated with the wax and emulsifier composition and typically web exhibits an air permeability of at least 40 percent of the air permeability of a like web untreated with the wax and emulsifier composition. An air permeability of at least 60 percent of the air permeability of a like web untreated with the wax and emulsifier composition is more preferred; while are air permeability of at least 80 percent of the air permeability of a like web untreated with the wax and emulsifier composition is even more preferred. In some cases the web exhibits substantially the same air permeability as a like web of cellulosic fiber untreated with the wax and emulsifier composition. Generally, such air permeabilities are from about 15 to about 45 ft$^3$/min-ft$^2$ at 0.5 inches of water for paper towel with from about 50 to about 150 ft$^3$/min-ft$^2$ at 0.5 inches of water for lighter basesheet being somewhat typical. Air permeabilities of from 5 ft$^3$/min-ft$^2$ at 0.5 inches of water to about 175 ft$^3$/min-ft$^2$ at 0.5 inches of water are readily maintained.

It is likewise preferred not to change the wet strength of the web radically by way of the wax treatment. In general the web exhibits a wet tensile strength that is less than about 135 percent of the wet tensile strength of a like web untreated with the wax and emulsifier composition and typically the web exhibits a wet tensile strength that is less than about 125 percent of the web tensile strength of a like web untreated with the wax and emulsifier composition. Still more preferably, the web exhibits a wet tensile strength that is less than about 115 or 110 percent of the web tensile strength of a like web untreated with the wax and emulsifier composition and may exhibit substantially the same wet tensile strength as a like web of cellulosic fiber untreated with the wax and emulsifier composition. Typically, the web exhibits substantially the same dry tensile strength as a like web of cellulosic fiber untreated with the wax and emulsifier composition.

The wax treatment need not have a detrimental effect on absorbency. In general the treated web exhibits an absorbency of at least 60 percent of that of a like web untreated with the wax and emulsifier composition and preferably the web exhibits an absorbency of at least 75 percent of that of a like web untreated with the wax and emulsifier composition. In preferred cases, the web exhibits an absorbency of at least 90 percent of that of a like web untreated with the wax and emulsifier composition and still more preferably the web exhibits substantially the same absorbency as a like web of cellulosic fiber untreated with the wax and emulsifier composition. Typical absorbencies are at least 2 g/g or 3 g/g and preferably at least 4 g/g. In preferred embodiments, the web has an absorbency of at least 6-8 g/g.

One way to characterize the inventive products of the invention is by contact angle with water; hereinafter specified. Cellulosic or paper webs typically are quite hydrophilic and thus exhibit a contact angle with water of 0 degrees. The treated webs, on the other hand, typically exhibit a contact angle with water of at least about 70 degrees at one minute of contact time with the web with about 80 degrees it one minute of contact time with the web being preferred. The treated webs are also characterized as being repulpable, and in some cases dispersible as well as flushable.

The wax is generally a wax selected from the group consisting of microcrystalline waxes, carnauba waxes, polyolefin waxes such as polyethylene waxes, polypropylene waxes and polybutene waxes, polyurethane waxes, montan waxes, paraffin waxes, Fischer-Tropsch waxes and mixtures thereof and has a molecular weight in the range of from about 500 to about 3000. Melting temperatures of the wax are usually less than about 140° C. and more preferably less than 120 degrees centigrade. The melting temperature of the wax is most preferably less than about 105° C.; for example, from about 50° to about 105° C. or from about 75° to about 105° C.

The applied wax composition usually includes an emulsifier selected from the group consisting of anionic emulsifiers, cationic emulsifiers and non-ionic emulsifiers.

The web of cellulosic fiber may be a creped web of cellulosic fiber having, for example a biaxially undulatory structure and may further comprise a grease repellant agent, an emollient, a binder and/or a cross-linking agent. Suitable emollients include emollients or emollient blends known in the art, generally including materials which function to lubricate or moisturize the skin surface, retard moisture, loss, and/or maintain the skin moisture/vapor balance. Suitable emollients include those compounds which associate with resolidified lotion to form a smooth, lubricious, nongreasy-feeling layer on the skin. Suitable emollients includes those used in emollient creams and lotions, including liquid hydrocarbons (such as mineral oil, and the like), vegetable and animal fats and oils (such as, lanolin, triglycerides, and the like), alkyl fatty acid esters (such as methyl, isopropyl, and butyl esters of fatty acids, and the like), fatty alcohol esters of benzoic acid, phospholipids (such as lecithin, and the like), and silicones. Emollients are further described in U.S. Pat. No. 5,871,763 to Luu et al. Grease repellants include fluorochemicals, polyvinylalcohol, poly(2-ethyl-2-oxazoline) and the like. Any suitable binder resins may be used if so desired, water soluble or insoluble depending on the product as well as wet strength resins which are well known. Crosslinkers such as zinc inorganic or organic salts may be used with suitable binders or other resins if so desired.

Unless more specifically defined herein, terms are given their ordinary meaning and generally accepted test procedures are used. In the discussion which follows various technical terms are used and test methods are referred to. Unless otherwise specified or clear from the context, ambient conditions are implied, percent means weight percent, predominant and like terminology means more than 50 weight percent. Generally speaking, the present invention relates to absorbent cellulosic sheet as is used in connection with paper towel, paper tissue and related products. This type of paper product is characterized by relatively high void volume so that it is absorbent as opposed to paper products with very low void volumes used in cardboard or paperboard products. Absorbent sheet is characterized generally by a void volume of greater than about 2 gms/gm, typically from about 4-10 gms/gm. Preferred products usually have a void volume of greater than about 5 gms/gm.

The "void volume", as referred to hereafter, is determined by saturating a sheet with a nonpolar liquid and measuring the amount of liquid absorbed. The volume of liquid absorbed is equivalent to the void volume within the sheet structure. The void volume is expressed as grams of liquid absorbed per gram of fiber in the sheet structure. More specifically, for each single-ply sheet sample to be tested, select 8 sheets and cut out a 1 inch by 1 inch square (1 inch in the machine dissection and 1 inch in the cross-machine direction). For multi-ply product samples, each ply is measured as a separate entity. Multiple samples should be separated into individual single plies and 8 sheets from each ply position used for testing. Weigh and record the dry weight of each test specimen to the nearest 0.0001 gram. Place the specimen in a dish containing POROFIL™ liquid, having a specific gravity of 1.875 grams per cubic centimeter, available from Coulter Electronics Ltd., Northwell Drive, Luton, Beds, England; Part No. 9902458.) After 10 seconds, grasp the specimen at the very edge (1-2 millimeters in) of one corner with tweezers and remove from the liquid. Hold the specimen with that corner uppermost and allow excess liquid to drip for 30 seconds. Lightly dab (less than ½ second contact) the lower corner of the specimen on

4 filter paper (Whatman Ltd., Maidstone, England) in order to remove any excess of the last partial drop. Immediately weigh the specimen, within 10 seconds recording the weight to the nearest 0.0001 gram. The void volume for each specimen, expressed as grams of POROFIL liquid per gram of fiber, is calculated as follows:

$$\text{void volume} = [W_2 - W_1]/W_1],$$

wherein
 "$W_1$" is the dry weight of the specimen, in grams; and
 "$W_2$" is the wet weight of the specimen, in grams.

The void volume for all eight individual specimens is determined as described above and the average of the eight specimens is the void volume for the sample.

The void volume may also be expressed as a "void volume ratio" by using the test procedure described above and calculating the percentage weight increase (PWI) as follows:

The PWI for each specimen, expressed as grams of POROFIL liquid per gram of fiber, is calculated as follows:

$$PWI = [(W_2 - W_1)/W_1] \times 100\%$$

wherein
 "$W_1$" is the dry weight of the specimen, in grams; and
 "$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage. Void volume ratios of 300-800 are typical for products of the invention; typically from about 400-700.

In order to measure the moisture penetration delay of a surface of absorbent sheet, single or multiply, a sample is conditioned at 23° C. and 50% relative humidity. The conditioned sample is secured lightly in a frame without substantial stretching in either the machine or cross-direction, but with sufficient tension in all directions such that the sheet is smooth. The sheet is suspended in the frame horizontally such that both surfaces of the sheet are not in contact with any other surface, that is, in contact with air only, since a surface in contact with the sheet can significantly influence moisture penetration delay times. The surface to be characterized is oriented upwardly and a 0.10 ml droplet of colored water is placed gently thereon. A timer is started simultaneously with the placement of the colored water droplet on the surface and stopped when the droplet is completely absorbed into the sheet and no longer projects upwardly from the surface as observed visually with the naked eye. The time is recorded as the moisture penetration delay. Testing is conducted at room temperature.

Figure 26A:
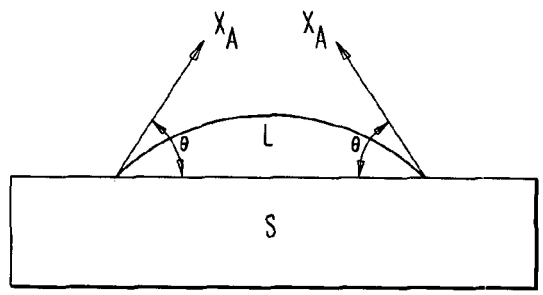
FIG. 26A is a schematic diagram illustrating the contact angle of water with a sample of treated material.
Figure 26B:
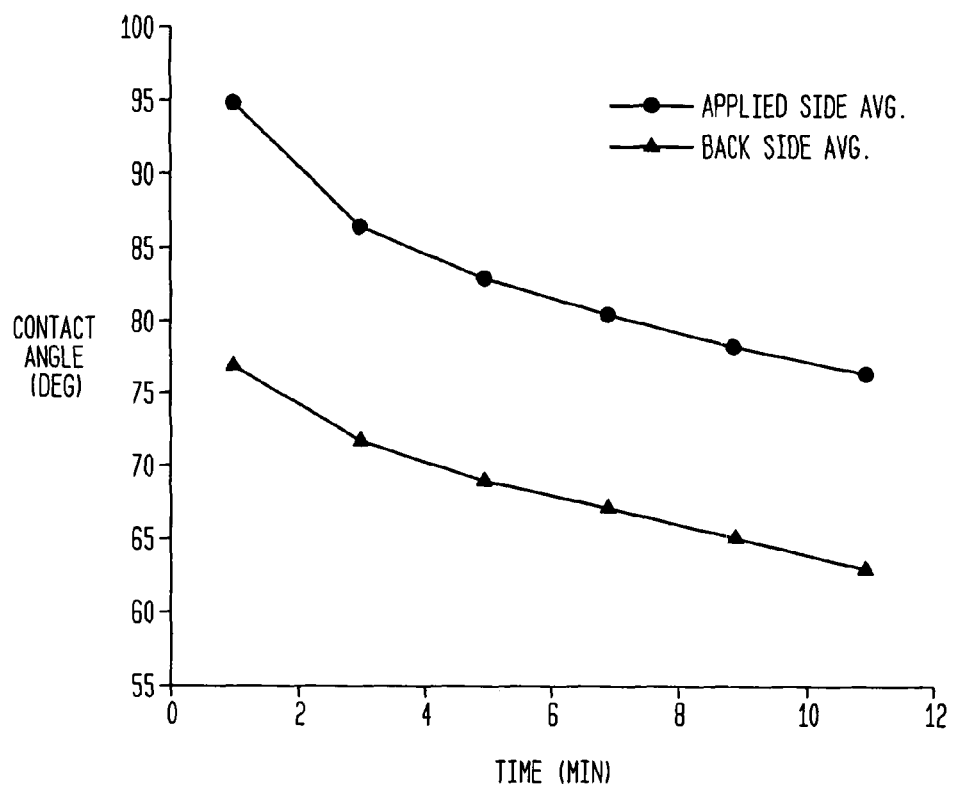
FIG. 26B is a plot of contact angle versus time for the treated and untreated side of a basesheet.
Figure 26C:
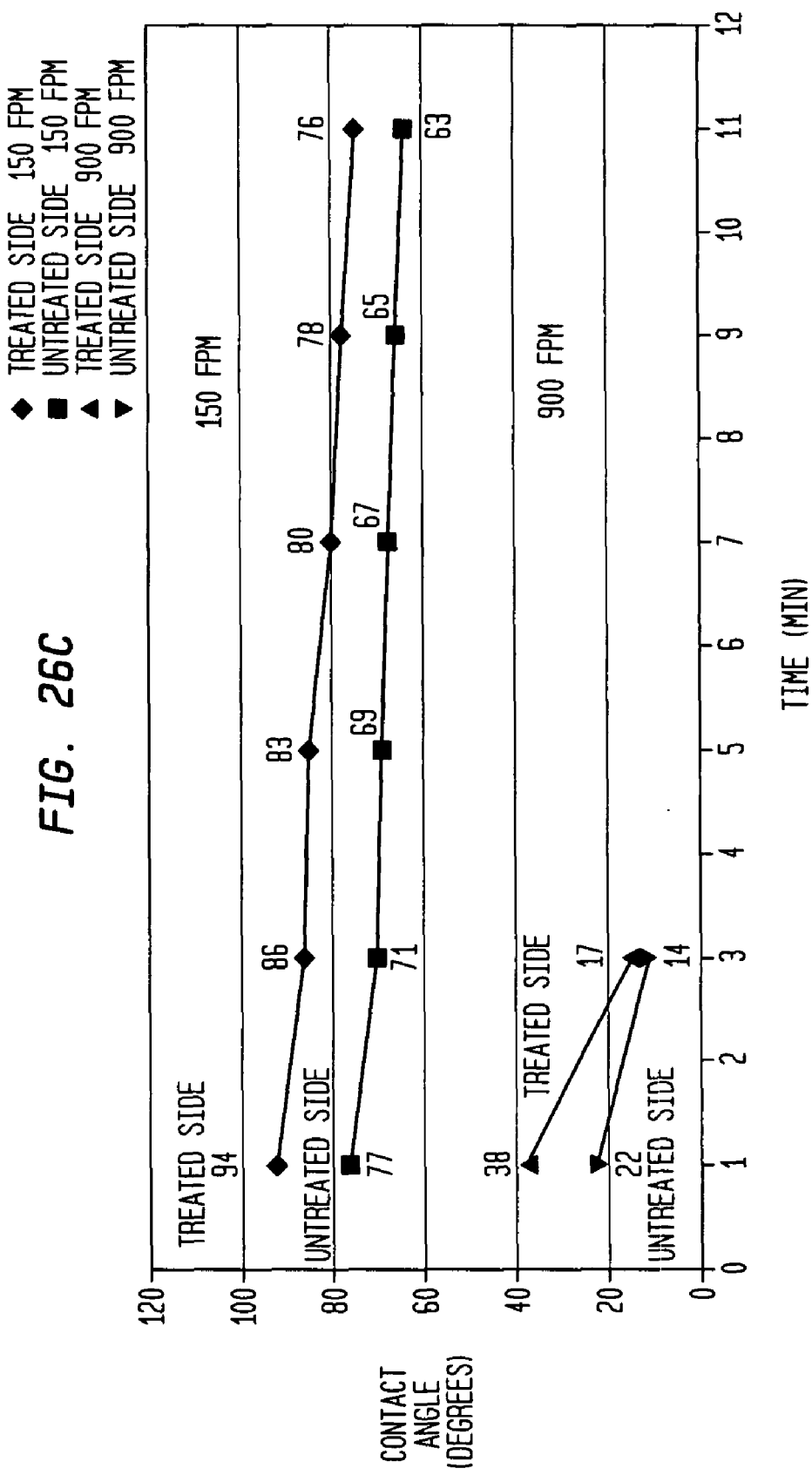
FIG. 26C is a plot of contact angle versus time for the treated and untreated sides of basesheet wherein the melt-fusion time employed was varied.

The angle defined between a tangent to a liquid droplet surface at its air/liquid interface at the droplet's line of contact with a solid and the solid substrate surface upon which the droplet rests (as measured through the liquid) is generally referred to as the contact angle of a liquid with a solid. The contact angle may be measured at any point at the line of contact of the three phases, air/liquid/solid. "Contact angles" herein refer to contact angles of the absorbent sheet with water at room temperature as measured with a goniometer. While it was found that the sheet of the invention exhibited contact angles which varied somewhat over time, however, the differences between contact angles between a treated surface and the opposite (untreated) surface thereof remains relatively constant as is seen in Table 9 and FIGS. 26B and 26C. Moreover, since the contact angle of an untreated cellulosic sheet is 0 degrees, the absolute increase in contact angle is a reliable quantification of the inventive products. Contact angles reported herein were determined by adhering the sample to a 75×25 mm glass microscope slide. A slide was prepared to receive the sample with a strip of double-sided adhesive tape. A sample ply, typically a basesheet, was adhered to the tape with the surface to be tested oriented upwardly. The slide was then placed on the goniometer sample stage and a 0.01 ml drop of distilled water is placed on the surface to be tested. The time is started simultaneously with placing the droplet on the sample surface and the image of the droplet/sheet sample interface is captured at 1, 3, 5, 7, 9 and 11 minutes by the goniometer using a telescopic lens arrangement and video signal recorder. The video signals were analyzed for contact angle by drawing a tangent vector from the line of contact between the water droplet and the sheet surface as illustrated in FIG. 26A, discussed in connection with Table 9 below. Any suitable goniometer may be employed. One suitable apparatus is a goniometer available from Rame-Hart Inc., which is operated with Panasonic camera WV-BP312 and used Java based software to measure the contact angle.

Unless otherwise specified, "basis weight" refers to the weight of a 3000 square foot ream of product. Likewise, percent or like terminology refers to weight percent on a dry basis, that is to say, with no free water present.

Absorbency of the inventive products is measured with a simple absorbency tester. The simple absorbency tester is a particularly useful apparatus for measuring the hydrophilicity and absorbency properties of a sample of tissue, napkins, or towel. In this test a sample of tissue, napkins, or towel 2.0 inches in diameter is mounted between a top flat plastic cover and a bottom grooved sample plate. The tissue, napkin, or towel sample disc is held in place by a ⅛ inch wide circumference flange area. The sample is not compressed by the holder. De-ionized water at 73° F. is introduced to the sample at the center of the bottom sample plate through a 1 mm. diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per square meter of sample or grams of water per gram of sheet. In practice, an M/K Systems Inc. Gravimetric Absorbency Testing System is used. This is a commercial system obtainable from M/K Systems Inc., 12 Garden Street, Danvers, Mass., 01923. WAC or absorbent capacity (referred to sometimes herein simply as "absorbency") is actually determined by the instrument itself. WAC is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a 5 second time interval as termination criteria.

Dry tensile strengths (MD and CD), stretch and break modulus are measured with a standard Instron test device or other suitable elongation tensile tester which may be configured in various ways, typically using 3 or 1 inch wide strips of tissue or towel, conditioned at 50% relative humidity and 23° C. (73.4), with the tensile test run at a crosshead speed of 2 in/min. Break modulus is the ratio of peak load to stretch at peak load.

The wet tensile of the tissue of the present invention is measured using a three-inch wide strip of tissue that is folded into a loop, clamped in a special fixture termed a Finch Cup, then immersed in a water. The Finch Cup, which is available from High-Tech Manufacturing Services, Inc., Vancouver, Wash. or the Thwing Albert Instrument Company of Philadelphia, Pa., is mounted onto a tensile tester equipped with a load cell with the flange of the Finch Cup clamped by the tester's lower jaw and the ends of tissue loop clamped into the upper jaw of the tensile tester. The sample is immersed in water (Standard Water Solution, N9832770, at 23° C. (73° F.), available from Fisher Scientific Company, 1600 W. Glenlake Avenue, Itasca, Ill.) and the tensile is tested after a 5 second immersion time.

Modulus is measured on a 1" or 3" sample using an EJA-1000 Tensile Tester available from Thwing-Albert Instrument Company, Philadelphia, Pa. and light-weight (50-lb) pneumatic action grips, with rubber coated, 1-inch line contact faces, available from Instron Corporation, 100 Royall Street, Canton, Mass.

Tensile energy absorption (T.E.A.), which is defined as the area under the load/elongation (stress/strain) curve, is also measured during the procedure for measuring tensile strength. Tensile energy absorption is related to the perceived strength of the product in use. Products having a higher T.E.A. may be perceived by users as being stronger than similar products that have lower T.E.A. values, even if the actual tensile strength of the two products are the same. In fact, having a higher tensile energy absorption may allow a product to be perceived as being stronger than one with lower T.E.A., even if the tensile strength of the high-T.E.A. product is less than that of the product having the lower tensile energy absorption.

Generally, a paper product is considered repulpable if it is repulped and reformed into the product wherein the reformed product does not exhibit a substantial increase in wet tensile strength over that of the original product or like product made with untreated fiber. Preferably there is no increase in either wet tensile or dry tensile. In some embodiments, treated material is dispersible and/or flushable as well. A sheet product is considered dispersible if, when a sample is placed in a flask and shaken at room temperature, disintegrates quickly, typically in less than 1000 strokes or so using the following test. Dispersibility is determined by shaking the sheet gently in water in a 250 ml bottle at room temperature using a mechanical bottle shaker. The water employed is a standard water solution, Standard Water Solution, NC9832770, at 23° C. (73° F.), available from Fisher Scientific Company. When testing tissue, sheets (or 4.5"×4.5" specimens) are tested in 3 sheet stacks, while dispersible towel is tested in 2 sheet stacks employing 4.5"×4.5" specimens. The bottle shaker is set for a predetermined number of strokes and 180 ml of the standard water solution is placed in a 250 ml bottle with an $^{11}/_{16}$" mouth. The specimen stack is carefully rolled up and placed in the bottle with the water. The bottle is immediately mounted in the bottle shaker which is started and the container is shaken for the predetermined number of strokes. When the shaker stops, dispersibility is checked by inverting the bottle in one quick motion and attempting to pour out the contents. In order to pass the test, the entire contents of the bottle must empty within 8 seconds without shaking the bottle. A product is considered flushable if it generally meets criteria of size and dispersibility.

Calipers reported herein are 8 sheet calipers unless otherwise indicated. The sheets are stacked and the caliper measurement taken about the central portion of the stack. Preferably, the test samples are conditioned in an atmosphere of 23°±1.0° C. (73.40±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in/sec descent rate. For finished product testing, each sheet of product to be tested must have the same number of plies as the product is sold. Select and stack eight sheets together. For napkin testing, completely unfold napkins prior to stacking. For base sheet testing off of winders, each sheet to be tested must have the same number of plies as produced off the winder. Select and stack eight sheets together. For base sheet testing off of the paper machine reel, single plies must be used. Select and stack eight sheets together.

On custom embossed or printed product, try to avoid taking measurements in these areas if at all possible.

Air permeability is measured using a Frazier Air Permeability Tester, available from Frazier Precision Instrument Company, Hagerstown, Md. Air permeability is defined as the flow rate of air at 23±1° C. through a sheet of material under a specified pressure head. It is usually expressed as cubic feet per minute per square foot at 0.50 in. (12.7 mm) water pressure, in $cm^3$ per second per square cm or in units of elapsed time for a given volume per unit area of sheet. The instrument referred to above is capable of measuring permeability from 0 to approximately 5000 cubic feet per minute per square foot of test area.

The term "cellulosic", "cellulosic sheet" and the like is meant to include any product incorporating papermaking fiber having cellulose as a major constituent. "Papermaking fibers" include virgin pulps or recycle cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood kraft fibers; hardwood fibers, such as eucalyptus, maple, birch, aspen, or the like. Papermaking fibers can be liberated from their source material by any one of a number of chemical pulping processes familiar to one experienced in the art including sulfate, sulfite, polysulfide, soda pulping, etc. The pulp can be bleached if desired by chemical means including the use of chlorine, chlorine dioxide, oxygen and so forth. The products of the present invention may comprise a blend of conventional fibers (whether derived from virgin pulp or recycle sources) and high coarseness lignin-rich tubular fibers, such as bleached chemical thermomechanical pulp (BCTMP).

Absorbent cellulosic webs typically have a heat tolerance limit which when exceeded by applying too much heat to the web, tends to result in the degradation of optical properties, i.e., yellowing, and/or the physical properties of the web. Since many applications of the present invention involve products where aesthetics are important, yellowing due to overheating the web is avoided by employing a wax with a suitable melting point such that it can be fused on the web without exceeding the heat tolerance limit of the web. One way to characterize the heat tolerance limit of a web is the maximum heat input under a given set of conditions which will not result in a substantial increase in the Hunter Color b value of the web. The L, a and b brightness parameters (Hunter Color Values) are suitably measured using TA PPI Method T-524-OM-94. In the Hunter Color Scheme L, a and b designate color as follows: L denotes lightness increasing form 0 for black to 100 for perfect white, a shows redness when plus, green when minus and zero for grey, b represents yellowness when plus, blueness when minus and zero when grey. Preferably, processing a web without exceeding its heat tolerance limit will result in a change of no more than about 20% in its Hunter Color b value (absolute); and preferably less than that. In practice, the heat tolerance limit for a web is a function of the temperature, time at temperature and composition of the web. High lignin filters such as BCTMP or pulps with significant amounts of secondary fiber will tend to yellow more and thus will have lower heat tolerance limits when made into webs than webs made from virgin KRAFT fiber, for example. So also, a relatively moist web will be more heat-tolerant. The maximum temperature which can be used depends, in part, upon the time the web is exposed to the temperature. A drier temperature of 400° F., for example, may be suitable at a processing speed of 500 feet per minute (fpm), but may cause degradation at a line speed of 100 fpm. Thus, one way to avoid exceeding the heat tolerance limit of the web while fusing the wax is to employ suitable line speeds in a given equipment configuration while another way to avoid exceeding the heat tolerance limit of the web is to control the temperature. It will be seen hereinafter that controlling fusing conditions also allows one to control migration of wax into the web so as to enable particular forms of product with controlled contact angle differences on different surfaces of the web.

Unless otherwise specified, the term "ply" as used herein refers to a monolithic fibrous structure integrally formed on a paper machine, for example, which may or may not be layered or sided as opposed to multiply products or multiply layers of a product formed by bonding one or more plies together. The term ply thus includes plies made with a multi-layered headbox with different compositions, whereas the term "layer" and the like includes structures of one or more plies bonded together or adjacent one another, as well as layered plies generally inseparable into constituent plies.

Wax means and includes relatively low melting organic mixtures or compounds of relatively high molecular weight, solid at room temperature and generally similar in composition to fats and oils except that they contain little or no glycerides. Some waxes are hydrocarbons, others are esters of fatty acids and alcohols. Waxes are thermoplastic, but since they are not high polymers, are not considered in the family of plastics. Common properties include smooth texture, low toxicity, and freedom from objectionable odor and color. Waxes are typically combustible and have good dielectric properties. They are soluble in most organic solvents and insoluble in water. Typical classes of waxes are enumerated brie fly below.

Natural waxes include carnauba waxes, paraffin waxes, montan waxes, and microcrystalline waxes. Carnauba is a natural vegetable wax derived from fronds of Brazilian palm trees (*Copernica cerifera*). Carnauba is a relatively hard, brittle wax whose main attributes are lubricity, anti-blocking and FDA compliance. Carnauba is popular in the can and coil coating industry as well as the film coating industry. The melting point of carnauba waxes is generally from about 80 to about 86° C.

Paraffins are low molecular weight waxes with melting points ranging from about 48° to about 74° C. They are relatively highly refined, have a low oil content and are straight-chain hydrocarbons. Paraffins provide anti-blocking, slip, water resistance and moisture vapor transmission resistance.

Montan waxes are mineral waxes which, in crude form, are extracted from lignite formed decomposition of vegetable substances. Typical melting point for montan wax range from about 80 to about 90° C.

Microcrystalline waxes come from the distillation of crude oil. Microcrystalline waxes have a molecular weight of from about 500 to 675 grams/mole and melting points of about 73° C. to about 94° C. These waxes axe highly branched and have small crystals.

Synthetic waxes include Fischer-Tropsch waxes, polyethylene waxes and wax dispersions of various macromers. Fischer-Tropsch waxes are produced almost exclusively in South Africa by coal gasification. They include methylene groups which can have either even or odd numbers of carbons. These waxes have molecular weights of 300-1400 gms/mole and are used in various applications.

Polyethylene waxes are made from ethylene produced from natural gas or by cracking petroleum naptha. Ethylene is then polymerized to provide waxes with various melting points, hardnesses, and densities. Polyethylene wax molecular weights range from about 500-3000 gms/mole. Oxidized polyethylenes are readily emulsifiable whereas non-oxidized polyethylenes largely are not. However, some non-oxidized polyethylenes have been successfully emulsified. High density polyethylenes (HDPE) have a great deal of crystallinity and their molecules are tightly packed. Melting points range from about 85° C. to about 141° C. and they are used in paints, textiles, coatings and polishes. Low density polyethylenes display more toughness and exhibit better crystal formation. Densities are from about 0.9 to about 0.95 gms/ml, and melting points range from 30° C. to 141° C.

Wax dispersions are well known in the art. It is preferred in accordance, to the present invention to employ water-borne wax dispersions as are particularly well known in the art. In this respect there is noted in U.S. Pat. No. 6,033,736 to Perlman et al.; U.S. Pat. No. 5,431,840 to Soldanski et al., as well as U.S. Pat. No. 4,468,254 to Yokoyama et al., the disclosure of which patents is incorporated herein by reference. In general a wax dispersion includes from about 90 to about 50 percent water, from about 10 to about 50 percent wax solids, and minor amounts of an emulsifier. "Aqueous wax dispersion" and like terminology refers to a stable mixture of wax, emulsifier and water without a substantial solvent component. The wax is in solid or unmelted form at room temperature and the wax dispersion is typically wetted onto the sheet under ambient or near ambient conditions. The particle size of the dispersion may be greater than or less that 1 micron, with average particle sizes of from about 100 nm to about 500 nm being typical for use in connection with the present invention. Typically, the dispersions are from 20-50 weight percent solids.

Thermal characteristics of wax dispersions are suitably measured employing differential scanning calorimetry ("DSC"). Unless otherwise indicated, DSC data herein was obtained using the following protocol: (a) hold for 1 minute at −40° C.; (b) heat from −40° C. to 110° C. at 10° C. per minute; (c) hold for 1 minute at 110° C.; (d) cool from 110° C. to −40° C. at 10° C. per minute; (e) hold for 2 minutes at −40° C.; (f) heat from −40° C. to 110° C. at 10° C. per minute.

Preferred Embodiments

It has been found in accordance with the invention that wax dispersions; such as polyethylene wax dispersions, polypropylene wax dispersions, polybutene wax dispersions, polyurethane wax dispersions, polycrystalline was dispersions, carnauba wax dispersions, and carnauba wax blend dispersions, can be used to create a barrier for tissue and towel products while not impairing their absorbency or adversely affecting their look and feel. The treated surface surprisingly has a better hand feel perception and becomes more hydrophobic than a non-treated sample. Webs may be treated in accordance with the invention by spraying a wax dispersion containing 20-40 percent solids onto the web in an amount of from about 3-5 percent or so followed by heating the web in an oven for 5 minutes at 100° C. when the wax has a melting temperature of less than 100° C.

In some embodiments, the fibers under the treated surface appear to be more hydrophilic than the non-treated sample. Without intending to be bound by any theory, these properties may be due to the micelle structure breaking during contact with the fiber. During this process the wax may first be disposed on the web surface and the emulsifier (hydrophilic material) component of the dispersion may then migrate further into the web to improve the fiber wettability. This interaction of a fused wax dispersion with the fiber surface offers a significant advantage for creating a water barrier without adversely affecting the softness and absorbency of the product.

It was also discovered that the water barrier properties of treated samples is not affected by the location of the treated surface in the web structure. The treated surface could be located either outside in contact with the wiping surface or inside of the web structure, as well as throughout a ply. In the cases where the treated surface is outside, the water barrier functions to reduce the wetted area (i.e., reduce xy or lateral water spreading and promote z direction migration). A lower wet web surface area is another advantage of the invention as it reduces the discomfort feeling of a consumer in the case when the product is a napkin (grease barrier) or the product is contacted to the skin for long period such as is the case with diapers, and other personal hygiene products. Location of the wax in the web is seen in Examples 1 and 2 below.

EXAMPLE 1

Wax Treated 2-Ply Towel

Figure 3:
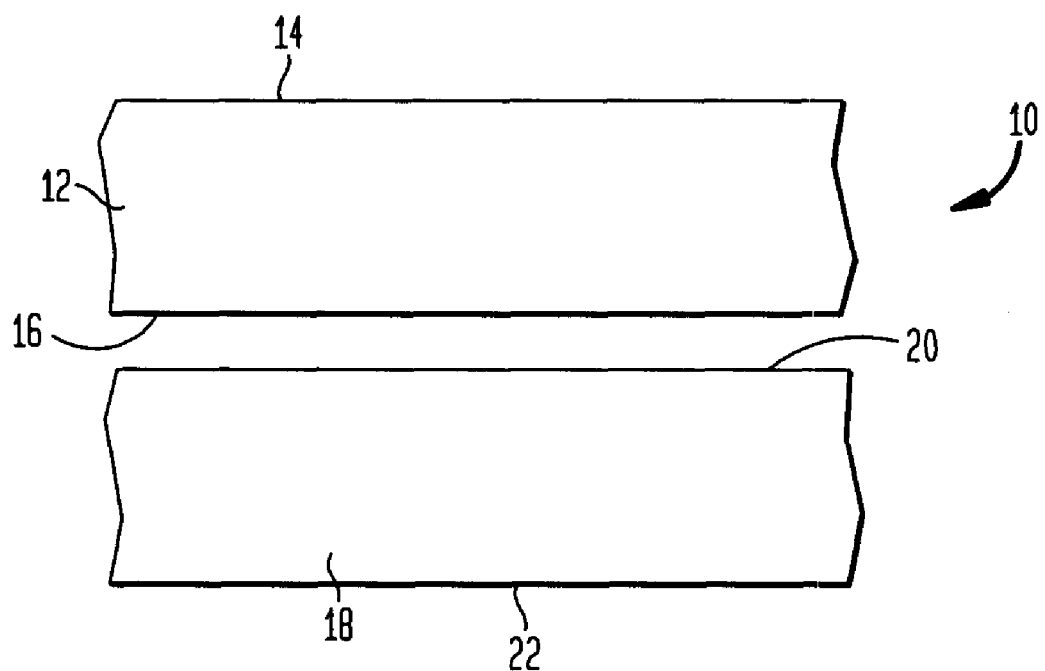
FIG. 3 is a schematic diagram of a wax-treated 2-ply towel.

Surface IR chromatography was used to detect wax penetration of a MICHEM® M48040M2 dispersion applied to a 2-ply wet pressed towel using the procedure described above. FIG. 3 is a schematic diagram showing an exploded view of the towel 10 having a first ply 12 with a treated surface 14 and an inner ply surface 16. Towel 10 is also provided with a second ply 18 having an inner untreated ply surface 20 and an outer untreated ply surface 22. These surfaces were compared with an untreated towel.

Figure 4:
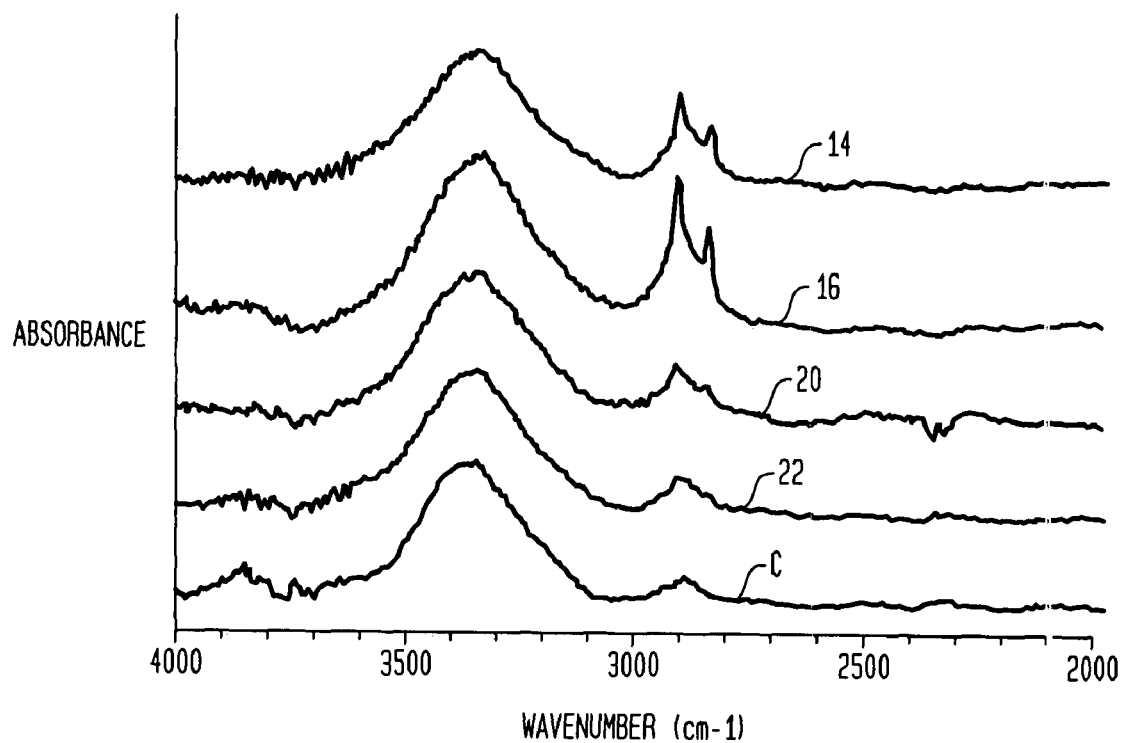
FIG. 4 is an IR chromatogram illustrating wax penetration in the 2-ply towel of FIG. 3.

In FIG. 4 there is shown the relevant spectra for the various surfaces of treated 2-ply towel 10, with the wax applied exhibiting a peak at 2914 $cm^{-1}$. The treated surface 14 of ply 12 had a peak height of approximately 0.019 absorbance units at this wavelength, while the inner ply had a peak height of approximately 0.021 absorbance units indicating the wax had fully penetrated the first ply. On the other hand, surfaces 20 and 22 of untreated ply 18 exhibited absorbance values of 0.007, roughly equivalent to the surface of an untreated towel indicating that the wax had not penetrated to the second ply of the towel.

EXAMPLE 2

Wax Treated Air-Laid Sheet

Figure 5:
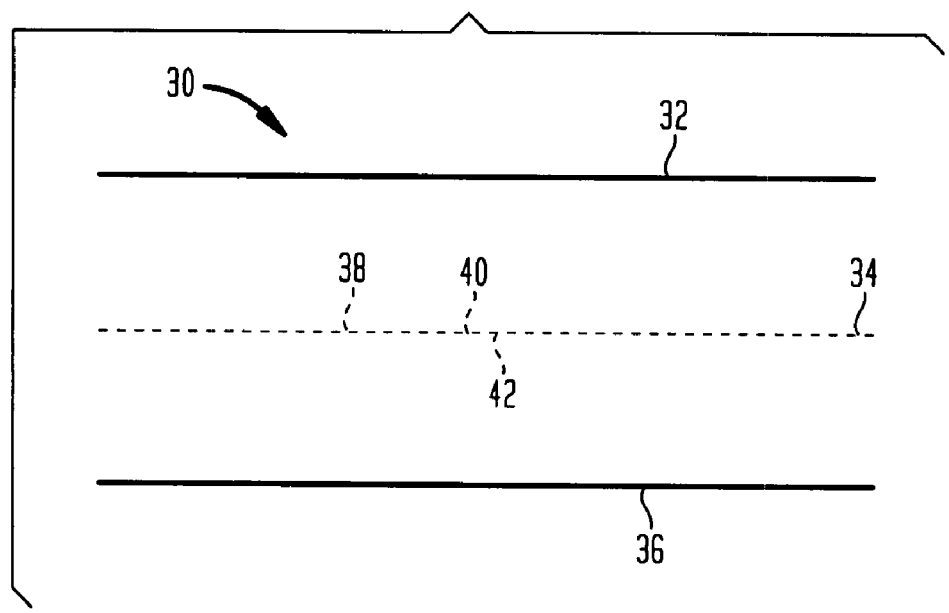
FIG. 5 is a schematic diagram of a wax-treated air-laid sheet.
Figure 6:
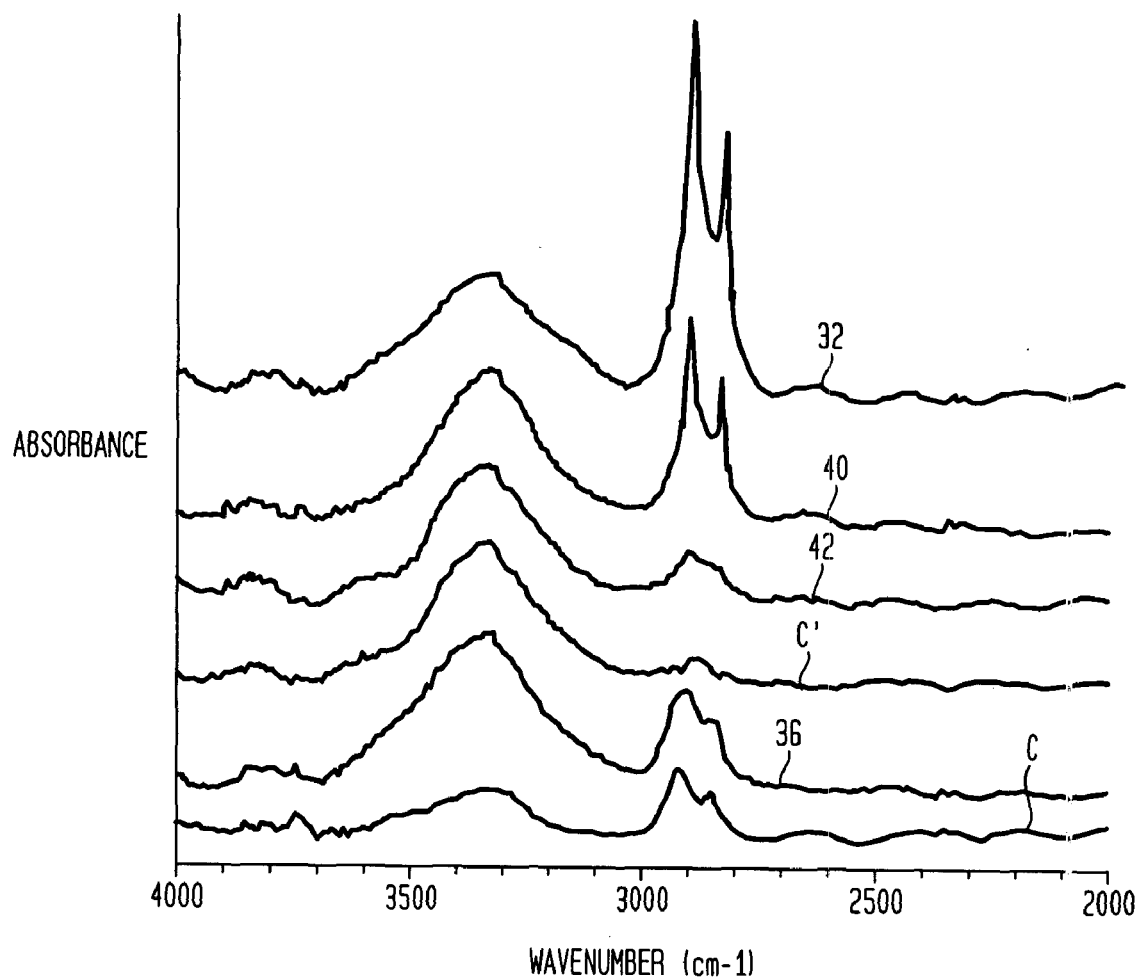
FIG. 6 is an IR chromatogram illustrating wax penetration in the wax-treated air laid sheet of FIG. 5.

Surface IR chromatography was also used to detect wax penetration of a MICHEM® M48040M2 dispersion applied to an air-laid sheet in accordance with the invention. Here, the (unitary or single ply) sheet was split as shown schematically in FIG. 5. In FIG. 5, there is shown an air-laid sheet 30 having a treated upper surface 32, a middle portion 34 and an untreated surface 36. The sheet was split along dotted line 38 and spectra were taken at surfaces 32,36 and at the split surface 40 proximate to treated surface 32 and the split surface 42 proximate to untreated surface 36. Results appear in FIG. 6. The wax found in the middle of the sheet was about 50 percent of that on the surface. That is, the peak height was 0.116 absorbance units at surface 32 (@ 2915 $cm^{-1}$) but only 0.061 absorbance units (@2915 $cm^{-1}$) at surface 40. The absorbance values found at surfaces 42 and 36 were close to the values for untreated air-laid sheet indicating that the wax did not penetrate the web completely and was retained for the most part on the upper half of the web.

EXAMPLES 3 AND 4

These examples demonstrate dramatic changes in water penetration delay while permeability and wet tensile remain constant.

2-ply toweling having a basis weight as set forth in Table 1 prepared by conventional wet press technology was sprayed on one side with the amount indicated of a wax dispersion containing approximately 20 to 40 percent solids, the solids primarily being waxes having molecular weight in the range of about 500 to 3000 such as paraffins along with naturally occurring waxes such as carnauba wax. The approximate melting point of the wax mixture was under 100° C. The samples were cured in an oven at approximately 100° C. for 5 minutes.

The properties of the samples of the invention as compared to the control are set forth in Table 1 which illustrate that the moisture penetration delay of the treated side increased greatly while air permeability, dry tensile and wet tensile remained about equal to or only slightly less than that of the control. The untreated ply did not exhibit an increase in moisture penetration delay.

TABLE 1

Properties of 2-Ply Treated Paper Towel

| Examples | Basis Weight (lb/ream) | GM Dry Tensile (g/3 in) | GM Wet Tensile (g/3 in) | Frazier Air Permeability* | Moisture Penetration Delay (0.10 ml) | |
|---|---|---|---|---|---|---|
| | | | | | Non Treated Side (Second) | Treated Side (Second) |
| Control (untreated) | 31.7 | 3255 | 919 | 31 | 1 | — |
| Example 3 - Treated 4.4 wt % | 33.15 | 3077 | 816 | 31 | 1 | 9 |

TABLE 1-continued

Properties of 2-Ply Treated Paper Towel

| Examples | Basis Weight (lb/ream) | GM Dry Tensile (g/3 in) | GM Wet Tensile (g/3 in) | Frazier Air Permeability* | Moisture Penetration Delay (0.10 ml) | |
|---|---|---|---|---|---|---|
| | | | | | Non Treated Side (Second) | Treated Side (Second) |
| Example 4 - Treated 10.6 wt. % | 35.48 | 3213 | 919 | 31 | 1 | 18.6 |

*ft³/min-ft² at 0.5" water pressure drop

As is seen from the above examples which follow, the resistance to water penetration of the treated samples increased greatly, even though the air permeabilities are unchanged. As a benchmark, it should be noted that nonwoven polyethylene porous film of the class noted in U.S. Pat. No. 5,658,639 to Curro et al. referenced above has an air permeability of 600 ft3/min-ft2 by the foregoing test method.

EXAMPLES 5 THROUGH 13 AND COMPARATIVE EXAMPLES A AND B

Figure 7:
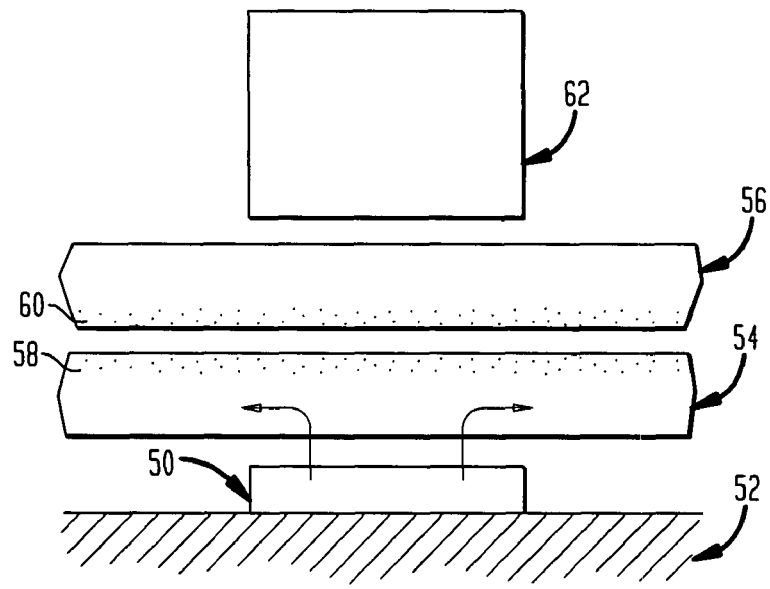
FIG. 7 is a schematic diagram illustrating a test for measuring resistance to moisture penetration.

A series of commercially available wax dispersions (available from Michelman, Inc., Cincinnati, Ohio) were evaluated for their ability to impart resistance to moisture penetration to paper towel, air-laid dinner napkins and facial tissue. About 5% by weight (dry basis) of an aqueous wax dispersion was applied to a surface of the samples by spraying followed by drying in an oven at 100° C. for 3 minutes. The samples were then evaluated for resistance to moisture penetration using the procedure illustrated in connection with FIG. 7.

A 1×1 inch square of filter paper 50 was wetted with distilled water containing 1% NaCl; about 0.35 g (10 drops) for high basis weight samples and about 0.175 g (5 drops) for the facial tissue. The wetted filter paper 50 was placed on a flat surface 52. Two plies of wax heated sample 54, 56 were placed over the wetted filter paper 50 with their treated sides in the interior of the two ply structure at 58, 60 as shown or with the treated surface of the lower ply in contact with wetted filter paper 50.

A 1 lb. weight 62 (also 1×1 inch) was placed over the sample plies 54, 56 in alignment with the filter paper to apply 1 psi pressure to the structure. The weight was left on the high basis weight samples for 10 seconds and facial tissue samples for 5 seconds.

In the case of MICHEM® dispersion M48040M2 for paper towel, air-laid napkins, and facial tissue, no water penetrated the second ply 56 when the non-treated ply was placed in contact with the wetted filter paper 50.

In the case of air-laid sample, water dispersion in the treated sample, away from the treated surface was significantly faster than water dispersion in an untreated ply, indicating that the wax remained on the treated surface and the emulsifier had migrated into the web to improve the hydrophilic properties thereof away from the wetted side.

Results for various dispersions are summarized in Table 2 below.

TABLE 2

Moisture Barrier Results and Impact on Sheet Properties

| Dispersion | Solids Melting Temperature* | Results |
|---|---|---|
| MICHEM ® 48040M2 Microcrystalline wax | 73-94° C. | Very Good Barrier |
| MICHEM ® Lube 110 Carnauba Wax | 85-110° C. | Good Barrier |
| MICHEM ® Lube 160 Carnauba Wax | 85° C. | Good Barrier |
| MICHEM ® 44730 Polyethylene (A) | 105° C. | Poor Barrier |
| MICHEM ® 39235 Polyethylene (B) | 139° C. | Poor Barrier |
| MICHEM ® 71646M Microcrystalline Wax | 91° C. | Good Barrier, no impact on softness |
| MICHEM ® Lube 124 Synthetic Wax | 68-101° C. | Good Barrier, untreated side also hydrophobic |
| MICHEM ® 35160 Polybutylene | — | Good Barrier, tends to be strong when wet |
| Fiberglass X 9 Polypropylene | — | Coating very stiff |
| MICHEM ® 43040 Epolene ® Modified Polypropylene | — | Good Barrier |
| MICHEM ® 59740 | — | Good Barrier |

*approximate values reported by manufacturer

As can be seen from the above data, the sheet treated with wax having, a threshold melting temperature above 100° C., the temperature to which the sample was heated, did not perform well in moisture barrier testing. See Comparative examples A and B. On the other hand, the waxes which fully melt or are heated above their threshold melting temperatures (e.g., MICHEM® Lube 110) sufficiently to fuse the wax exhibit good moisture barrier properties.

The 48040M2 emulsion is an aqueous emulsion typically with about 40% solids including an ethoxylated C18 alcohol (nonionic) emulsifier and microcrystalline wax as well as various additives such as poly(ethylene glycol), dimethyl silicone and triethanolamine. The surfactant may be present in an amount of about 0.5-5 percent based on the amount of solids (0.75-1.5% in some cases) while the other additives are typically present in the aggregate in an amount of less than 5 percent based on the weight of solids. Thus, the solids in the emulsion are predominately (more than 50%) wax. The emulsifier may have about 34 ethylene oxide repeat units, thus being a PEG-1500 nonionic surfactant. The solids are typically more than 80% by weight wax in suitable microcrystalline wax emulsions.

The 71646M emulsion includes a microcrystalline wax, about 3% of a fatty acid (anionic) surfactant and about 3% triethanolamine, the weight of the additives being based on the weight of solids. The surfactant may be a 50:50 blend of stearic and palmitic acid and the emulsion is typically about 45% or so solids.

EXAMPLES 14-17

These examples illustrate the synergistic effect of having two contiguous treated surfaces contacting each other in a multilayer structure.

Samples of treated toweling were tested for the moisture barrier behavior generally as noted above by cutting specimen swatches having an approximate size of five cm by five cm, then placing a pair of the specimen swatches on a square of filter paper approximately 1 inch on a side wetted with 0.35 grams water in the various configurations illustrated in FIGS. 8 through 11, that is:

- In Example 14, the lower swatch was placed with its treated side up while the upper swatch was placed with its treated side down;
- In Example 15, both of the two superposed specimen swatches were placed with treated side up;
- In Example 16, both of the two superposed specimen swatches were placed with the treated side down;
- In Example 17, the upper specimen swatch was placed with its treated side up while the treated side of the lower specimen swatch was down.

Figure 8:
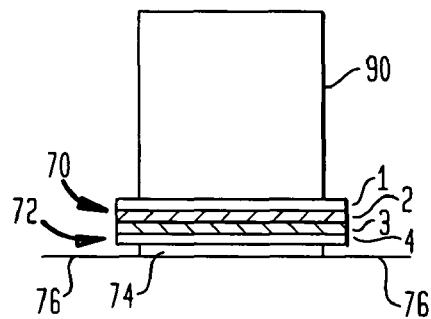
FIGS. 8, 9, 10 and 11 are schematic diagrams illustrating testing for moisture penetration of various multilayer arrangements of treated cellulosic sheet.
Figure 9:
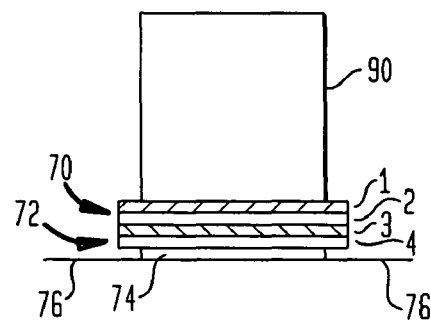
Figure 10:
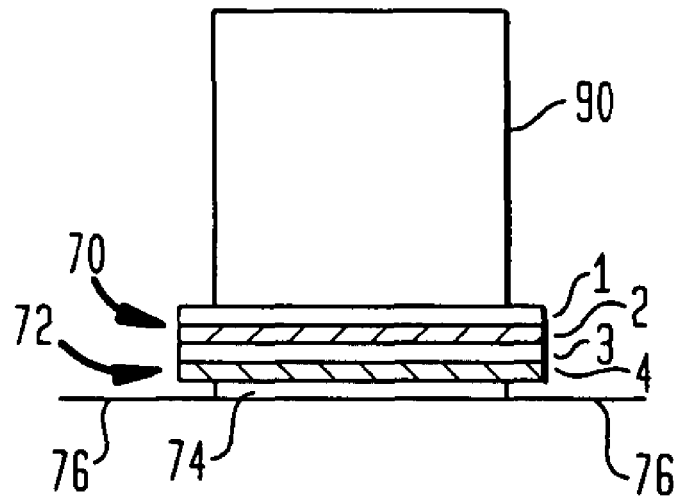
Figure 11:
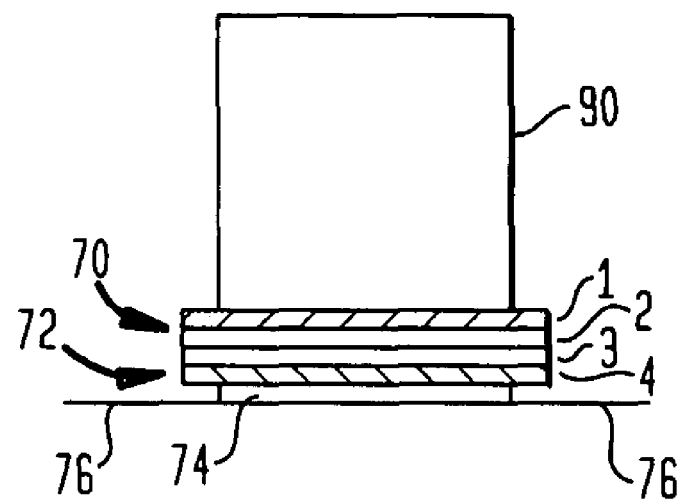

In FIGS. 8, 9, 10 and 11 there are shown two double ply swatches 70,72 overlaid on the moistened filter paper 74 which is on surface 76. Swatches 70,72 thus define four layers, two of which have been treated with a wax dispersion. In FIGS. 8-11 the treated layers are indicated by the diagonal lines. The layers are numbered 1, 2, 3 and 4 for convenience. FIG. 8 shows the multilayer configuration, for Example 14, whereas FIGS. 9, 10 and 11 illustrate the multilayer structures for Examples 15, 16, 17 and 18, respectively.

In each of the arrangements of FIGS. 8-11, an approximately 500 g weight 90 was applied to the upper specimen swatch to produce a pressure approximately one pound per square inch to simulate finger pressure. After 10 seconds the weight was removed and the wetted area of each sheet was measured. Results are set forth in Table 3.

TABLE 3

Wetted Surface Area (in cm$^2$) of Layers Under 1 PSI Pressure

| Towel Web Structure | | Control | Example 14 (FIG. 8) | Example 15 (FIG. 9) | Example 16 (FIG. 10) | Example 17 (FIG. 11) |
|---|---|---|---|---|---|---|
| Top Ply | Layer 1 | 17.2 | 0 | 0 | 8.3 | 0 |
| | Layer 2 | 17.2 | 0 | 14.9 | 8.3 | 19.1 |
| Bottom Ply | Layer 3 | 18.5 | 25 | 22.7 | 21.8 | 20 |
| | Layer 4 | 18.5 | 25 | 22.7 | 21.8 | 20 |

The multilayer structure exhibited an unexpectedly complete barrier to moisture penetration when the two treated surfaces of the towel were placed in contact with one another (Example 14). In all cases, the treated sheet exhibited resistance to moisture penetration and increased wetted areas in some plies over the control, suggesting migration of the emulsifier into the sheet.

EXAMPLE 18

This Example 18 illustrates the re-pulpable properties of the inventive product. Towel treated with about 10% of fused wax dispersion is pulped at 2.5% consistency in a blender with water at 38° C. After about 150 seconds, the pulp is used to make a hand-sheet. Table 4 illustrates the physical properties of the hand-sheet re-formed from re-pulped material prepared in accordance with the invention versus a hand-sheet of non-treated towel formed from the same furnish.

TABLE 4

| Examples | B.W (lb/ream) | Caliper (mils/1 sheet) | Dry Tensile (G/1 in.) | Wet Tensile (G/3 in.) |
|---|---|---|---|---|
| Control (untreated sample) | 40.02 | 4.286 | 5327 | 313 |
| Example 18 - Treated and Re-pulped | 39.77 | 4.372 | 3985 | 207 |

The results showed that towel product containing wax dispersion is repulpable because wet tensile of treated hand-sheet does not increase, indeed it is well below the control. Preferably, the dry tensile of re-formed sheet made form re-pulped material is also no greater than and preferably lower than the control.

EXAMPLES 19, 20

Figure 12:
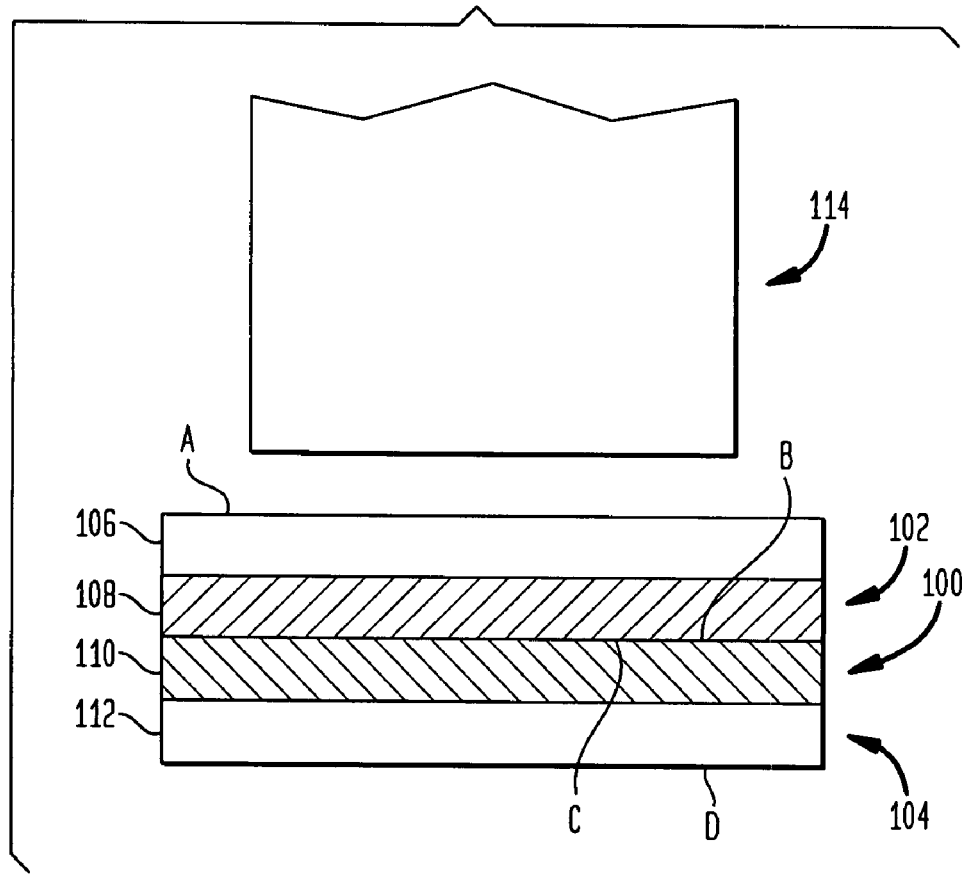
FIG. 12 is another schematic diagram for illustrating the microbial barrier properties of wax-treated cellulosic sheet.

It has also been found that sheets treated with wax dispersions in accordance with the invention also exhibit microbial barrier properties, as further described in connections with FIG. 12. FIG. 12 is a schematic diagram illustrating sheets of 2-ply towel or air-laid web which has been provided with a barrier coating of wax dispersion MICHEM® 48040M2 and tested for microbial barrier properties as, discussed hereinafter.

Samples of towel and air-laid wipe were submitted for testing to evaluate the ability of a barrier coating treatment to prevent bacteria from passing through the sample. The barrier coating treatment has been applied to one side of a sheet in accordance with the invention, untreated samples of the same towel and air-laid wipe were provided for the controls. All the samples were tested as two-layer specimens, that is, two layers of each sample type were placed on top of each other to form one test specimen. The layers containing the barrier coating of fused wax were put together such that the barrier of each layer was in the center in sandwich form as shown in FIG. 12.

In FIG. 12 there is shown a multilayer structure 100, including 2 sheets 102 and 104 of cellulosic sheet to be tested. Treated sheet 102 had an untreated surface 106 and a treated surface 108 while sheet 104 had treated surface 110 and untreated surface 112, such that the treated surfaces of the two sheets of the test specimen were in contact with each other. Untreated sheets were likewise employed for purposes of comparison.

The outside surface of 106 was contaminated with bacteria for a ten second time period. Each of the plies from the contaminated test specimen was placed on separate Mueller Hinton agar plates. The sample plys were then removed and the plates incubated. Specifics appear below.

The samples of towel and airlaid wipe were tested with both *staphylococcus aureus* ATCC 25923 and *E. coli* ATCC 25922. The bacteria were grown in separate tubes of Mueller Hinton broth. Each broth was adjusted to a 0.5 MacFarland turbidity standard. A standard serial dilution of this suspension resulting in approximately 10 million organisms per mL was then used as the inoculum. The plating media was commercially prepared, 150 mm, Mueller Hinton agar plates. Each of the samples were cut into squares which measured 1½ inches by 1½ inches. Two of the squares were then placed on top of each other such that the treated sides of the two sheets were in contact and aligned in sandwich style with each other as shown. A two layer specimen of either towel or airlaid wipe was placed on a sterile sheet of aluminum foil and the upper surface (A) of sheet 102 inoculated with two drops of bacteria. A 2-PSI weight 114 measuring one square inch for a contacting surface was flame sterilized and then placed on top of the sample for a 10-second time period.

For convenience, the sides of the sheets are designated A-D in FIG. 12 and in Table 5 and 6.

After inoculation with bacteria, sheet 102 was placed on a Mueller Hinton agar plate with the outer surface, Side-A, in contact with the agar. Sheet 104 was then placed on a second agar plated with the bottom side, Side-D, in contact with the agar. A second specimen was prepared in a similar fashion but Side-B, the barrier treated side of sheet 102 and Side-C, the barrier treated side of sheet 104 were placed in contact with the agar.

After a 15 minute time period, the sample sheets were removed and the plates were incubated for 18 hours at 30° C. Visible growth or no growth was used to indicated effectiveness of the barrier. This procedure was repeated for each of the four samples using both *staphylococcus aureus* and *E. coli*.

Results are given below in Table 5 for wax-treated paper towel and untreated paper towel (control).

TABLE 5

Microbial Barrier of Paper Towel

| Bacteria Tested | Ply | Side Tested | Towel Bacterial Growth | |
|---|---|---|---|---|
| | | | Control (No Barrier Coating) | Treated-Barrier MICHEM ®-Dispersion 48040M2 |
| Staphylococcus aureus | 1 | A | + | + |
| | | B | + | + |
| | 2 | C | + | − |
| | | D | − | − |
| E. coli | 1 | A | + | + |
| | | B | + | + |
| | 2 | C | + | − |
| | | D | + | − |

As will be appreciated from Table 5, the wax-treated towel was superior to the untreated towel, there being no penetration of the bacteria *staphylococcus aureus* or *E. coli* to the second sheet of the test specimen.

Results for wax-treated air-laid wipes and untreated wipes (control) appear in Table 6.

TABLE 6

Microbial Barrier of Air-Laid Wipes

| Bacteria Tested | Ply | Side Tested | Airlaid Wipe Bacterial Growth | |
|---|---|---|---|---|
| | | | Control (No Barrier Coating) | Treated-Barrier MICHEM ®-Dispersion 48040M2 |
| Staphylococcus aureus | 1 | A | + | + |
| | | B | + | + |

TABLE 6-continued

Microbial Barrier of Air-Laid Wipes

| Bacteria Tested | Ply | Side Tested | Airlaid Wipe Bacterial Growth | |
|---|---|---|---|---|
| | | | Control (No Barrier Coating) | Treated-Barrier MICHEM ®-Dispersion 48040M2 |
| | 2 | C | + | − |
| | | D | + | − |
| E. coli | 1 | A | + | + |
| | | B | + | − |
| | 2 | C | + | − |
| | | D | − | − |

As can be seen from Table 6 the bacteria was much more effectively controlled in all cases with treatment of the product in accordance with the invention. In fact, the *E. coli* was not observed on the bottom of the first sheet of air-laid web.

EXAMPLES 21 THROUGH 30

These examples illustrate the use of an integrated wet-crepe/after-drying and wax treatment process to produce the sheet of the invention.

Figure 13:
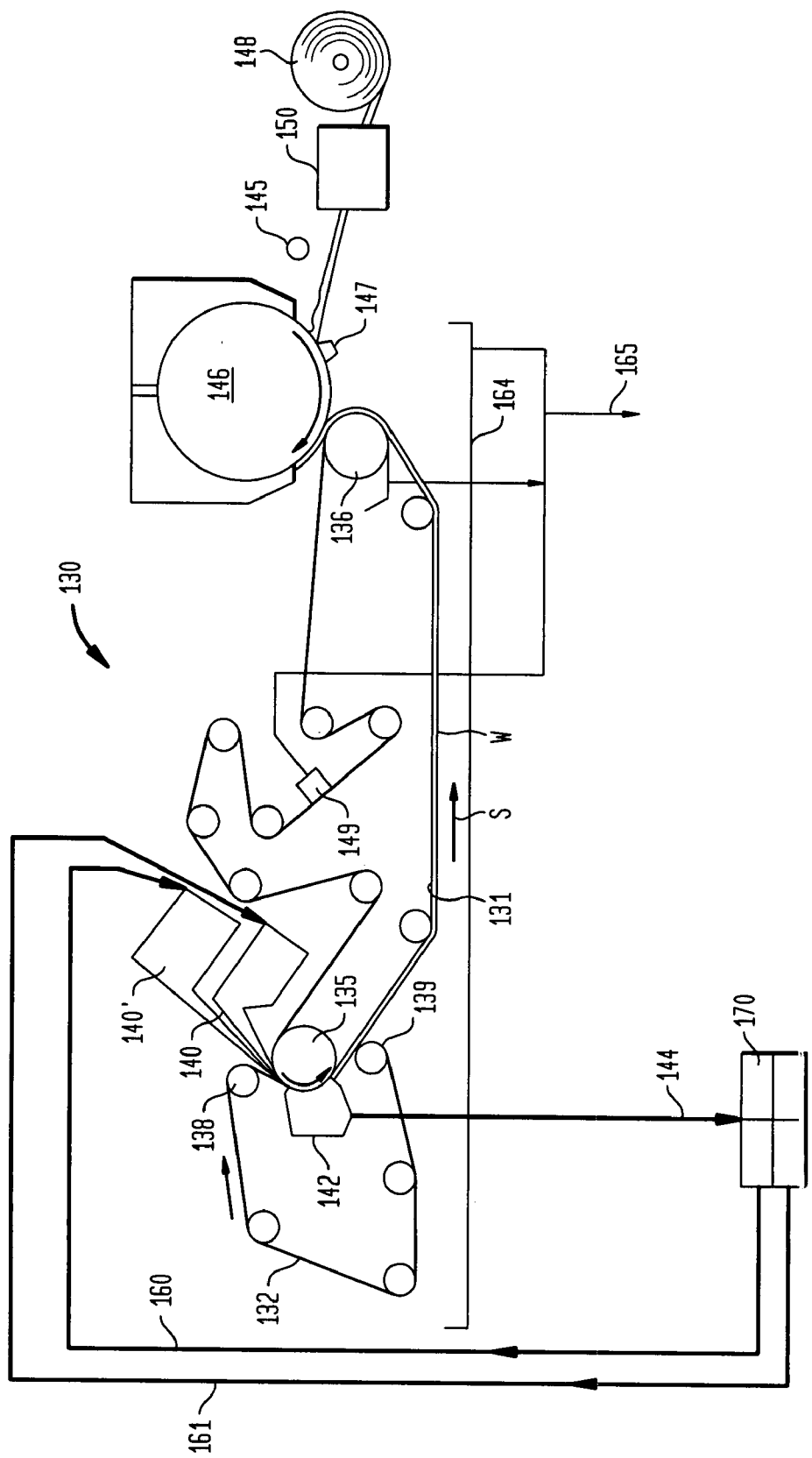
FIG. 13 is a schematic diagram of a paper machine useful for making the absorbent sheet of the present invention.

FIG. 13 illustrates a paper machine wherein a machine chest 170, which may be compartmentalized, is used for preparing furnishes that are treated with chemicals having different functionality depending on the character of the various fibers used. This embodiment shows two head boxes thereby making it possible to produce a stratified product. The product according to the present invention can be made with single or multiple head boxes and regardless of the number of head boxes may be stratified or unstratified. The treated furnish is transported through different conduits 160 and 161, where they are delivered to the head box 140, 140' (indicating an optionally compartmented headbox) of a crescent forming machine 130.

FIG. 13 shows a web-forming end or wet end with a liquid permeable foraminous support member 131 which may be of any conventional configuration. Foraminous support member 131 may be constructed of any of several known materials including photopolymer fabric, felt, fabric, or a synthetic filament woven mesh base with a very fine synthetic fiber batt attached to the mesh base. The foraminous support member 131 is supported in a conventional manner on rolls, including breast roll 135 and couch or pressing roll, 136.

Forming fabric 132 is supported on rolls 138 and 139 which are positioned relative to the breast roll 135 for pressing the press wire 132 to converge on the foraminous support member 131. The foraminous support member 131 and the wire 132 move in the same direction and at the same speed which is in the direction of rotation of the breast roll 135. The pressing wire 132 and the foraminous support member 132 converge at an upper surface of the forming roll 135 to form a wedge-shaped space or nip into which one or more jets of water or foamed liquid fiber dispersion (furnish) provided by single or multiple headboxes 140, 140' is pressed between the pressing wire 132 and the foraminous support member 131 to force fluid through the wire 132 into a saveall 142 where it is collected to reuse in the process.

The nascent web W formed in the process is carried by the foraminous support member 131 to the pressing roll 136 where the nascent web W is transferred to the drum 146 of a Yankee dryer. Fluid is pressed from the web W by pressing roll 136 as the web is transferred to the drum 146 of a dryer where it is partially dried and preferably wet-creped by means of an undulatory creping blade 147. The wet-creped web is then transferred to an after-drying section 150 prior to being collected on a take-up roll 148. The drying section 150 may include through-air dryers, impingement dryers, can dryers, another Yankee dryer and the like as is well known in the art and discussed further below.

Prior to the drying section, there is provided a spray boom 145 wherein an aqueous wax dispersion comprising a wax and an emulsifier is sprayed onto web W in accordance with the invention. The after-drying section 150 is operated at a temperature above the melting temperature of the wax so that the dispersion fuses during final drying of the web.

A pit 164 is provided for collecting water squeezed from the furnish by the press roll 136 and a Uhle box 149. The water collected in pit 164 may be collected into a flow line 165 for separate processing to remove surfactant and fibers from the water and to permit recycling of the water back to the paper-making machine 130.

According to the present invention, an absorbent paper web can be made by dispersing fibers into aqueous slurry and depositing the aqueous slurry onto the forming wire of a papermaking machine. Any suitable forming scheme might be used. For example, an extensive but non-exhaustive list includes a crescent former, a C-wrap twin wire former, an S-wrap twin wire former, a suction breast roll former, a Fourdrinier former, or any art-recognized forming configuration. The forming fabric can be any suitable foraminous member including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808 all of which are incorporated herein by reference in their entirety. One forming fabric particularly useful is Voith Fabrics Forming Fabric 2164 made by Voith Fabrics Corporation, Shreveport, La.

Foam-forming of the aqueous furnish on a forming wire or fabric may be employed as a means for controlling the permeability or void volume of the sheet upon wet-creping. Suitable foam-forming techniques are disclosed in U.S. Pat. No. 4,543,156 and Canadian Patent No. 2,053,505, the disclosures of which are incorporated herein by reference.

Figure 14:
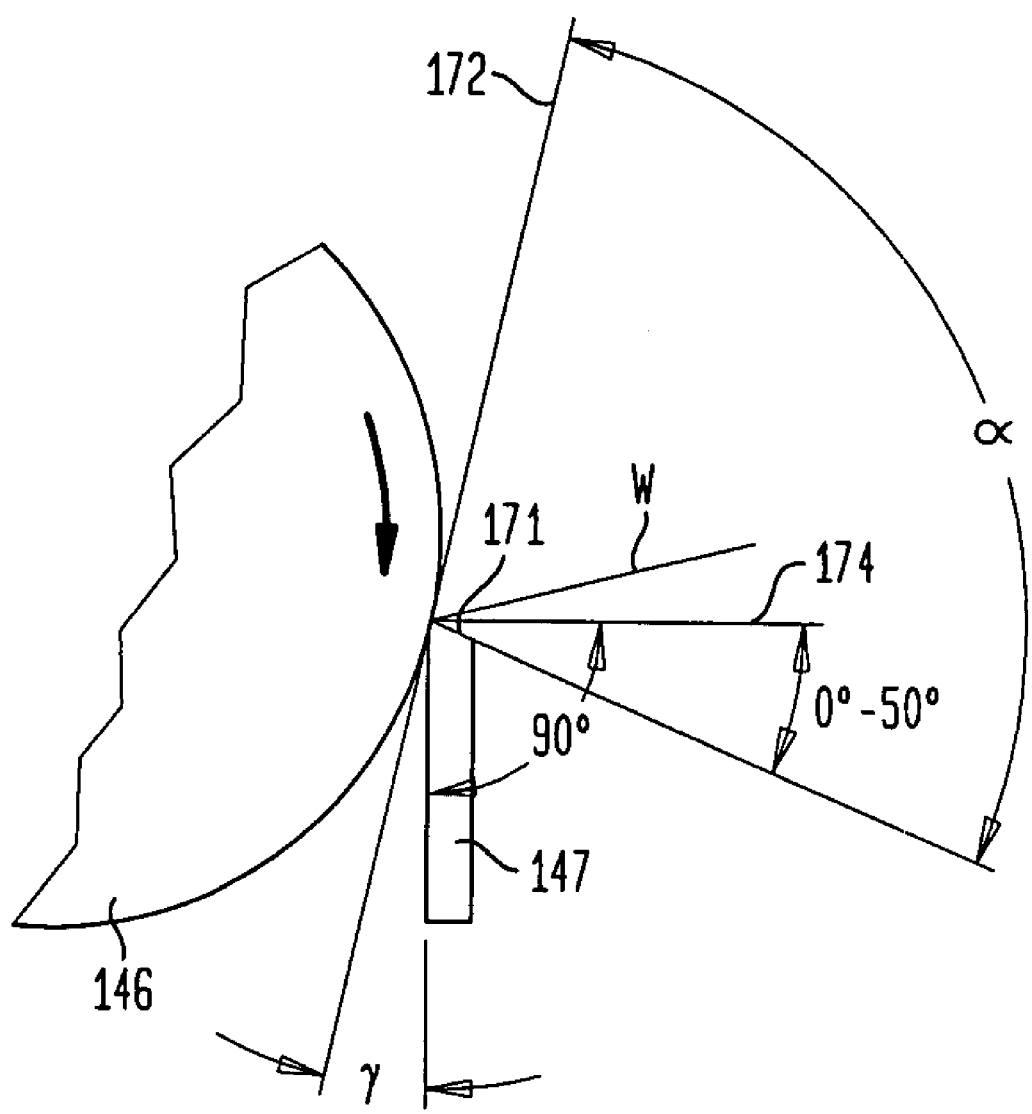
FIG. 14 is a schematic diagram illustrating creping angles for producing creped sheet which may be wax-treated in accordance with the invention.

The creping angle and blade geometry may be employed as means to influence the sheet properties. Referring to FIG. 14, the creping angle or pocket angle, α, is the angle that the creping rake surface 171 makes with a tangent 172 to a Yankee dryer at the line of contact of the creping blade 147 with the rotating cylinder 146 as in FIG. 13. So also, an angle γ is defined as the angle the blade body makes with tangent 172, whereas the bevel angle of creping blade 147 is the angle surface 171 defines with a perpendicular 174 to the blade body as shown in the diagram. Referring to FIG. 14, the creping angle is readily calculated from the formula:

$$\alpha = 90 + \text{blade bevel angle} - \gamma$$

for a conventional blade. These parameters vary over the creping surface of an undulatory blade as discussed herein.

In accordance with the present invention, creping of the paper from a Yankee dryer is carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes effected by use of the undulatory blade tend to correlate with improved softness perception of the tissue products. These blades, together with high-lignin pulps, cooperate to provide unexpected and, indeed, dramatic synergistic effect as discussed in connection with the examples below.

FIGS. 15A through 15D illustrate a portion of a preferred undulatory creping blade 190 useable in the practice of the present invention in which a relief surface extends indefinitely in length, typically exceeding 100 inches in length and often reaching over 26 feet in length to correspond to the width of the Yankee dryer on the larger modern paper machines. Flexible blades of the patented undulatory blade having indefinite length can suitably be placed on a spool and used on machines employing a continuous creping system. In such cases the blade length would be several times the width of the Yankee dryer. In contrast, the height of the blade 190 is usually on the order of several inches while the thickness of the body is usually on the order of fractions of an inch.

As illustrated in FIGS. 15A through 15D, an undulatory cutting edge 193 of the patented undulatory blade is defined by serrations 196 disposed along, and formed in, one edge of a surface 192 so as to define an undulatory engagement surface. Cutting edge 193 is preferably configured and dimensioned so as to be in continuous undulatory engagement with Yankee 146 when positioned as shown in FIG. 14, that is, the blade continuously contacts the Yankee cylinder in a sinuous line generally parallel to the axis of the Yankee cylinder. In particularly preferred embodiments, there is a continuous undulatory engagement surface 200 having a plurality of substantially colinear rectilinear elongate regions 202 adjacent a plurality of crescent shaped regions 204 about a foot 206 located at the upper portion of the side 208 of the blade which is disposed adjacent the Yankee. Undulatory surface 200 is thus configured to be in continuous surface-to-surface contact over the width of a Yankee cylinder when in use as shown in FIGS. 13 and 14 in an undulatory or sinuous wave-like pattern.

The number of teeth per inch may be taken as the number of elongate regions 202 per inch and the tooth depth is taken as the height, H, of the groove indicated at 201 adjacent surface 208.

Several angles are used in order to describe the geometry of the cutting edge of the undulatory blade of the patented undulatory blade. To that end, the following terms are used:

Creping angle "α"—the angle between a rake surface 198 of the blade 190 and the plane tangent to the Yankee at the point of intersection between the undulatory cutting edge 193 and the Yankee;

Axial rake angle "β"—the angle between the axis of the Yankee and the undulatory cutting edge 193 which is the curve defined by the intersection of the surface of the Yankee with indented rake surface of the blade 190;

Relief angle "γ"—the angle between the relief surface 192 of the blade 190 and the plane tangent to the Yankee at the intersection between the Yankee and the undulatory cutting edge 193, the relief angle measured along the flat portions of the present blade is equal to what is commonly called "blade angle" or holder angle", that is "γ" in FIG. 14.

Quite obviously, the value of each of these angles will vary depending upon the precise location along the cutting edge at which it is to be determined. The remarkable results achieved with the undulatory blades of the patented undulatory blade in the manufacture of the absorbent paper products are due to those variations in these angles along the cutting edge. Accordingly, in many cases it will be convenient to denote the location at which each of these angles is determined by a subscript attached to the basic symbol for that angle. As noted in the '788 patent, the subscripts "f", "c" and "m" refer to angles measured at the rectilinear elongate regions, at the crescent shaped regions, and the minima of the cutting edge, respectively. Accordingly, "$\gamma_f$", the relief angle measured along the flat portions of the present blade, is equal to what is commonly called "blade angle" or "holder angle". In general, it will be appreciated that the pocket angle $\alpha_f$ at the rectilinear elongate regions is typically higher than the pocket angle $\alpha_c$ at the crescent shaped regions.

Figure 15E:
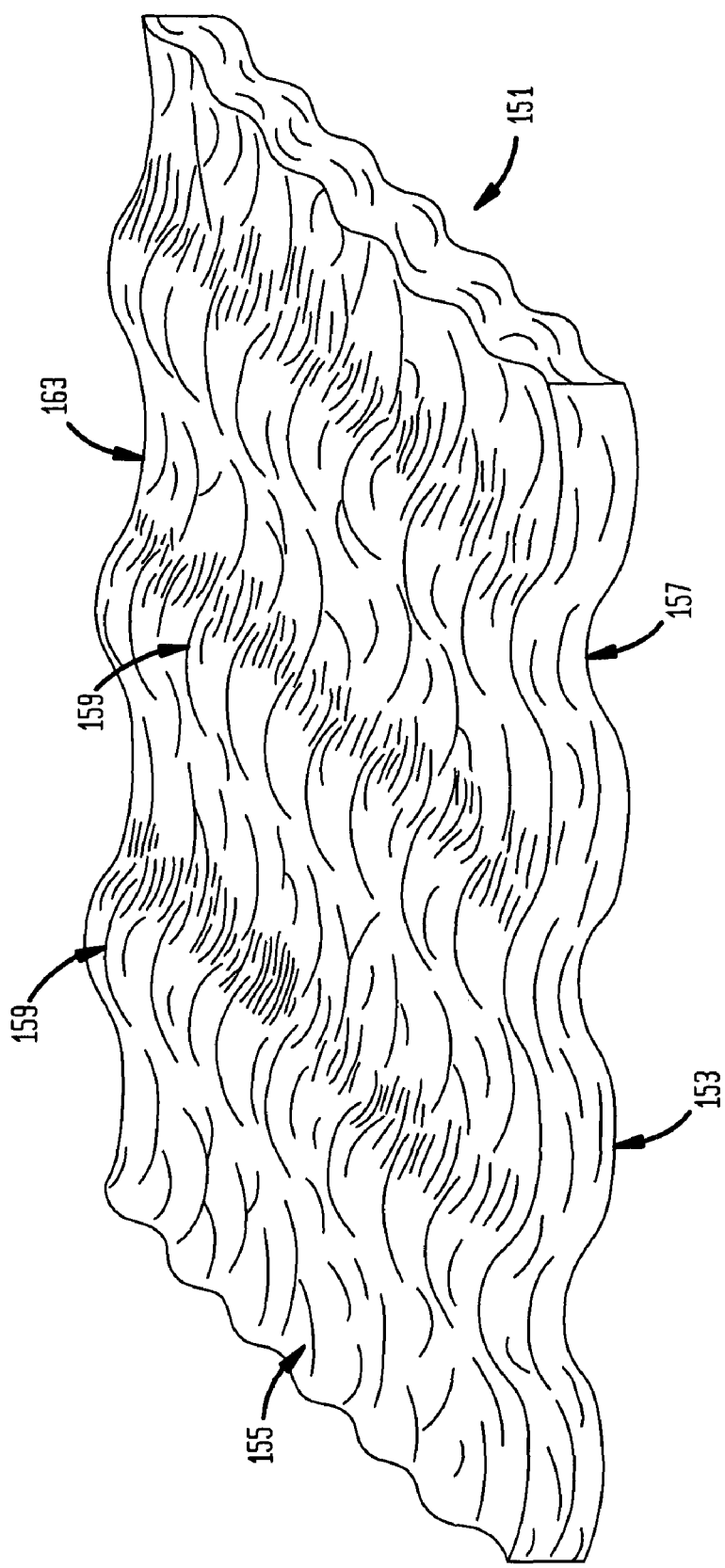
FIGS. 15A-15D illustrate an undulatory creping blade which may be used to produce a creped biaxially undulatory sheet shown in FIG. 15E which may be wax-treated in accordance with the invention.

An undulatory creping blade may be used to produce a creped or recreped web as shown in FIG. 15E comprising a biaxially undulatory cellulosic fibrous web 151 creped from a Yankee dryer 146 shown in FIGS. 13 and 14, characterized by a reticulum of intersecting crepe bars 155, and undulations defining ridges 153 on the air side thereof, said crepe bars 155 extending transversely in the cross machine direction, said ridges 153 extending longitudinally in the machine direction, said web 151 having furrows 157 between ridges 153 on the air side as well as crests 159 disposed on the Yankee side of the web opposite furrows 157 and sulcations 163 interspersed between crests 159 and opposite to ridges 153, wherein the spatial frequency of said transversely extending crepe bars 155 is from about 10 to about 150 crepe bars per inch, and the spatial frequency of said longitudinally extending ridges 153 is from about 4 to about 50 ridges per inch. It should be understood that strong calendering of the sheet can significantly reduce the height of ridges 153, making them difficult to perceive by the eye, without loss of the beneficial effects.

The crepe frequency count for a creped base sheet or product may be measured with the aid of a microscope. The Leica Stereozoom® 4 microscope has been found to be particularly suitable for this procedure. The sheet sample is placed on the microscope stage with its Yankee side up and the cross direction of the sheet vertical in the field of view. Placing the sample over a black background improves the crepe definition. During the procurement and mounting of the sample, care should be taken that the sample is not stretched. Using a total magnification of 18-20, the microscope is then focused on the sheet. An illumination source is placed on either the right or left side of the microscope stage, with the position of the source being adjusted so that the light from it strikes the sample at an angle of approximately 45 degrees. It has been found that Leica or Nicholas Illuminators are suitable light sources. After the sample has been mounted and illuminated, the crepe bars are counted by placing a scale horizontally in the field of view and counting the crepe bars that touch the scale over a one-half centimeter distance. This procedure is repeated at least two times using different areas of the sample. The values obtained in the counts are then averaged and multiplied by the appropriate conversion factor to obtain the crepe frequency in the desired unit length.

It should be noted that the thickness of the portion of web 151 between longitudinally extending crests 159 and furrows 157 will on the average typically be about 5% greater than the thickness of portions of web 151 between ridges 153 and sulcations 163. Suitably, the portions of web 151 adjacent longitudinally extending ridges 153 (on the air side) are about from about 1% to about 7% thinner than the thickness of the portion of web 151 adjacent to furrows 157 as defined on the air side of web 151.

The height of ridges 153 correlates with the tooth depth H formed in undulatory creping blade 190. At a tooth depth of about 0.010 inches, the ridge height is usually from about 0.0007 to about 0.003 inches for sheets having a basis weight of 14-19 pounds per ream. At double the depth, the ridge height increases to 0.005 to 0.008 inches. At tooth depths of about 0.030 inches, the ridge height is about 0.010 to 0.013 inches. At higher undulatory depth, the height of ridges 153 may not increase and could in fact decrease. The height of ridges 153 also depends on the basis weight of the sheet and strength of the sheet.

Advantageously, the average thickness of the portion of web 151 adjoining crests 159 is significantly greater than the thickness of the portions of web 151 adjoining sulcations 163; thus, the density of the portion of web 151 adjacent crests 159 can be less than the density of the portion of web 151 adjacent sulcations 163. The process produces a web having a specific caliper of from about 2 to about 8 mils per 8 sheets per pound of basis weight. The usual basis weight of web 151 is from about 7 to about 35 lbs/3000 sq. ft. ream.

Suitably, when web 151 is calendered, the specific caliper of web 151 is from about 2.0 to about 6.0 mils per 8 sheets per pound of basis weight and the basis weight of the web is from about 7 to about 35 lbs/3000 sq. ft. ream.

While the products of the invention may be made by way of a dry-crepe process, a wet crepe process is preferred in some embodiments, particularly with respect to single-ply towel in some cases. When a wet-crepe process is employed, after-drying section 150 may include an impingement-air dryer, a through-air dryer, a Yankee dryer or a plurality of can dryers. The dryer(s) are operated at sufficiently high temperatures so as to fuse the wax dispersion; however, the paper machines are operated so as not to exceed the heat tolerance limit of the web. Impingement-air dryers are disclosed in the following patents and applications, the disclosure of which is incorporated herein by reference:

U.S. Pat. No. 5,865,955 of Ilvespaaet et al.
U.S. Pat. No. 5,968,590 of Ahonen et al.
U.S. Pat. No. 6,001,421 of Ahonen et al.
U.S. Pat. No. 6,119,362 of Sundqvist et al.
U.S. patent application Ser. No. 09/733,172, entitled Wet Crepe, Impingement-Air Dry Process for Making Absorbent Sheet, now U.S. Pat. No. 6,432,267.

Figure 16:
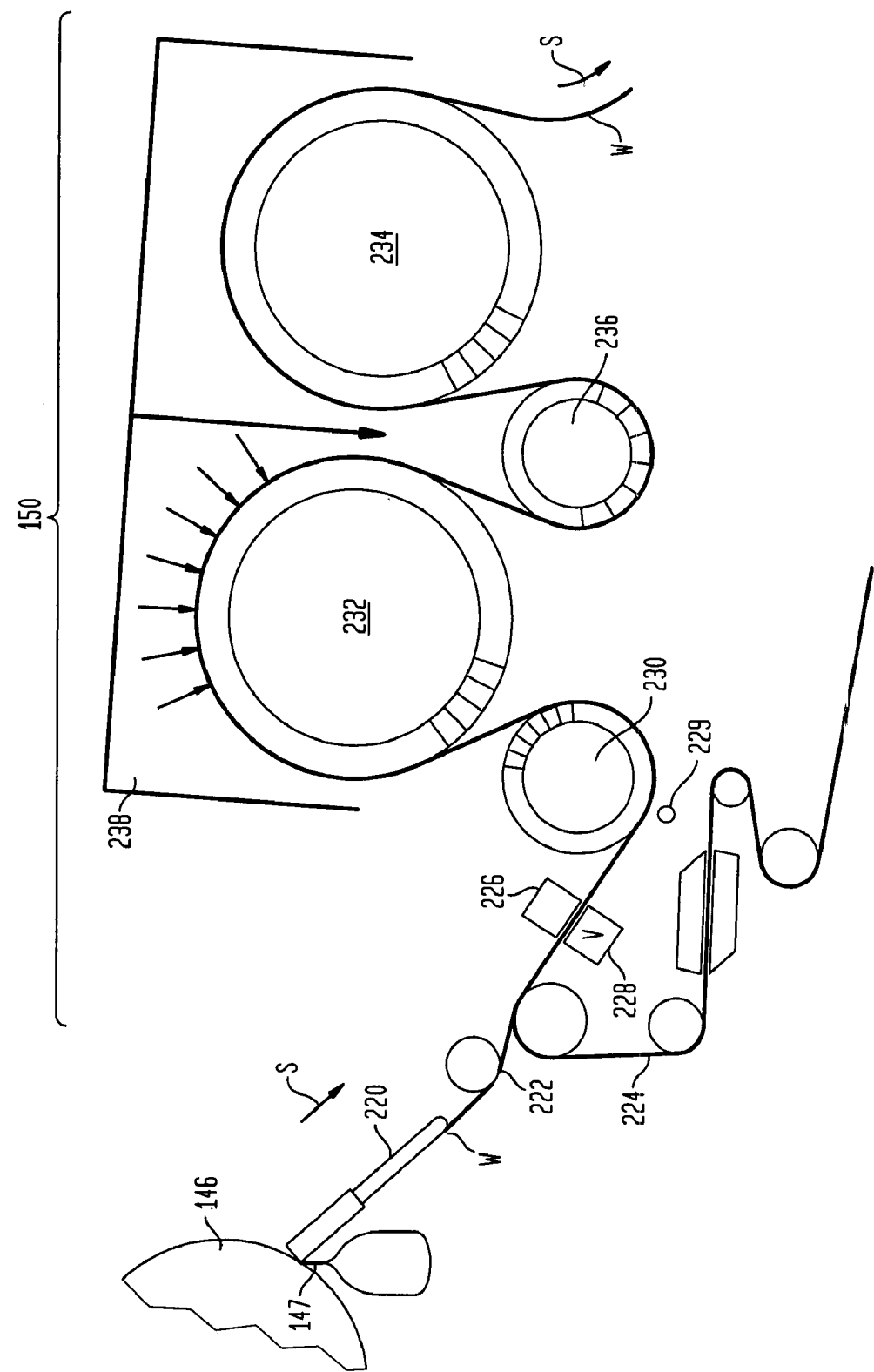
FIG. 16 is a schematic diagram of a drying apparatus which may be used to dry cellulosic sheet and fuse a wax composition applied thereto.

When an impingement-air after dryer is used, after drying section 150 of FIG. 13 may have the configuration shown in FIG. 16.

There is shown in FIG. 16 an impingement-air dry apparatus 150 useful in connection with the present invention. The web is creped off of a Yankee dryer, such as Yankee dryer 146 of FIG. 13 utilizing a creping blade 147. The web W traveling in direction S is aerodynamically stabilized over an open draw utilizing an air foil 220 as generally described in U.S. Pat. No. 5,891,309 to Page et al., the disclosure of which is incorporated herein by reference. Following a transfer roll 222, web W is disposed on a transfer fabric 224 and subjected to wet shaping by way of an optional blow box 226 and vacuum shoe 228. The particular conditions and impression fabric selected depend on the product desired and may include conditions and fabrics described above or those described or shown in one or more of: U.S. Pat. No. 5,510,002 to Hermans et al.; U.S. Pat. No. 4,529,480 of Trokhan; U.S. Pat. No. 4,102,737 of Morton and U.S. Pat. No. 3,994,771 to Morgan, Jr. et al., the disclosures of which are hereby incorporated by reference into this section.

After wet shaping, web W is transferred over vacuum roll 230 impingement-air dry system as shown. The wax emulsion may be sprayed on to the web by way of a spray boom 229 as shown in the diagram. The apparatus of FIG. 16 generally includes a pair of drilled hollow cylinders 232, 234, a vacuum roll 236 therebetween as well as a hood 238 equipped with nozzles and air returns. In connection with FIG. 16, it should be noted that transfer of a web W over an open draw needs to be stabilized at high speeds. Rather than use an impingement-air dryer, after-dryer section 150 of FIG. 16 may include instead of cylinders 232, 234 of a throughdrying unit as is well known in the art and described in U.S. Pat. No. 3,432,936 to Cole et al., the disclosure of which is incorporated herein by reference.

Yet another after-drying section is disclosed in U.S. Pat. No. 5,851,353 which may likewise be employed in a wet-creped process.

Figure 17:
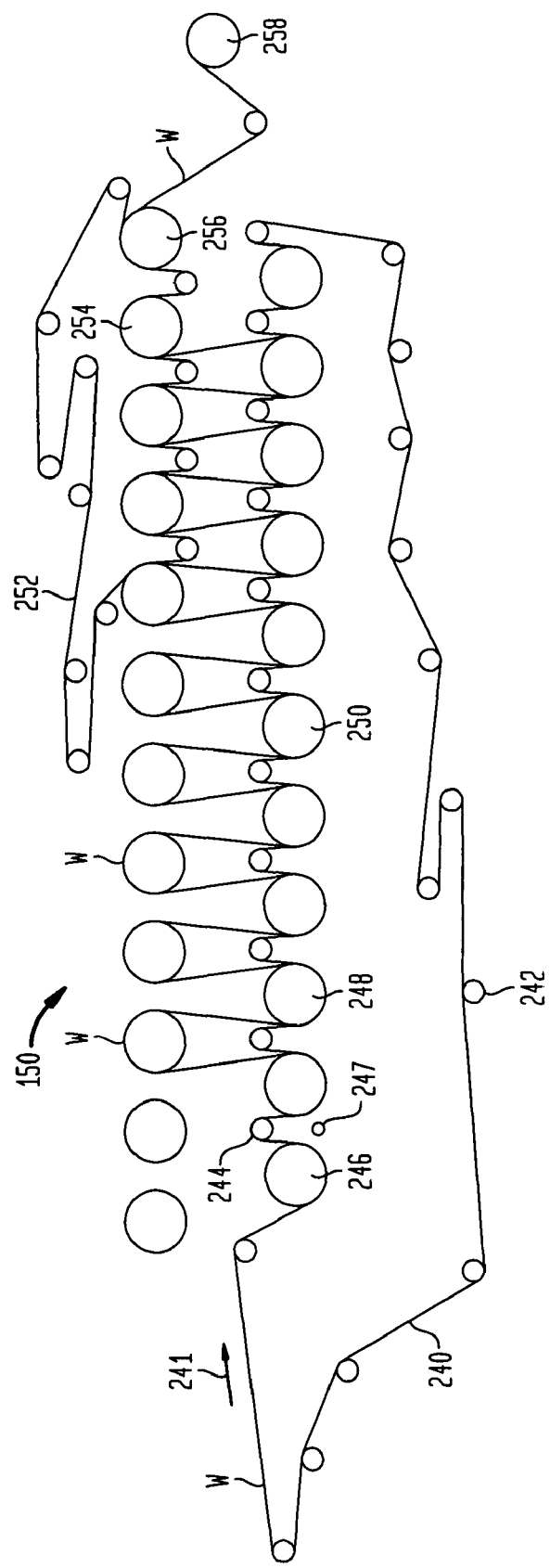
FIG. 17 is a diagram of another drying apparatus which may be used to dry cellulosic sheet and fuse a wax composition applied thereto.

Still yet another after-drying section 150 is illustrated schematically in FIG. 17. After creping from the Yankee cylinder the web W is deposited on an after-dryer felt 240 which travels in direction 241 and forms an endless lop about a plurality of after-dryer felt rolls such as rolls 242, 244 and a plurality of after-dryer drums such as drums (sometimes referred to as cans) 246, 248 and 250.

A second felt 252 likewise forms an endless loop about a plurality of after-dryer drums and rollers as shown. The various drums are arranged in two rows and the web is dried as it travels over the drums of both rows and between rows as shown in the diagram. The wax emulsion may be sprayed onto the web by way of a spray boom 247 as shown. Felt 252 carries web W from drum 254 to drum 256, from which web W may be further processed or wound up on a take-up reel 258.

Examples 21 to 30 illustrate the physical properties of 2-ply embossed towel products. The towel basesheet is produced at paper machine as shown in FIG. 13 with a through-dryer. MICHEM® 48040M2 was applied by a spray nozzle system positioned after the Yankee dryer and before the through air dryer (TAD). The curing temperature in the TAD is about 120° C. The basesheet towel is treated by barrier chemical on the air-side at two add-on levels 2.6% (low level) and 5% (high level). The towel basesheet was then converted to the 2-ply towel products with different combinations of: (1) non-treated ply with either low or high add-open level ply (Examples 22 to 25); (2) two treated plies (Examples 26 to 30); and (3) treated side positioned on the inside or the outside of the final product (Examples 22 to 30). Physical properties of the products appear in Table 7 for the 2-ply products.

TABLE 7

Physical Properties

| Examples | Towel Product Web Structure Top Ply | Bottom Ply | B.W. (lb/ream) | Caliper (mils/8 sht) | GM Dry tensile (g/3 in.) | GM Wet Tensile (g/3 in.) | Void Volume Ratio % | GM Modulus (g/%) | Break GM Modulus (g/%) |
|---|---|---|---|---|---|---|---|---|---|
| Example 21 | Non-Treated | Non-Treated | 29.31 | 120.0 | 3568 | 779 | 630 | 74.0 | 303 |
| Example 22 | Non-Treated | Low-Outside | 30.81 | 125.8 | 3599 | 784 | 579 | 76.7 | 299 |
| Example 23 | Low-Inside | Non-Treated | 29.80 | 121.7 | 3428 | 679 | 564 | 77.2 | 290 |
| Example 24 | Non-Treated | High-Outside | 30.60 | 125.6 | 3261 | 632 | 631 | 81.1 | 267 |
| Example 25 | High-Inside | Non-Treated | 30.00 | 121.8 | 3369 | 545 | 607 | 82.2 | 281 |
| Example 26 | Low-Inside | Low-Outside | 31.00 | 126.3 | 3287 | 696 | 547 | 80.4 | 286 |
| Example 27 | Low-Inside | Low-Inside | 29.80 | 125.6 | 2978 | 714 | 706 | 67.8 | 274 |
| Example 28 | Low-Outside | Low-Outside | 30.50 | 125.8 | 3301 | 646 | 628 | 85.7 | 291 |
| Example 29 | High-Inside | High-Inside | 38.70 | 121.8 | 2491 | 602 | 562 | 69.4 | 240 |
| Example 30 | High-Outside | High-Outside | 31.30 | 126.3 | 3179 | 651 | 532 | 82.0 | 287 |

The samples produced were evaluated for water absorptivity, the results being somewhat variable with treated samples showing a decrease in absorptivity as compared to untreated samples. It is thought that the variability of these results is due to relatively non-uniform spray characteristics. More repeatable results are obtained with better control of spray patterns, overlap and airflow in the spray region. In any event, these results demonstrate that it is possible to obtain product having highly desirable barrier properties on a paper machine by way of spray application of a wax dispersion.

EXAMPLES 31-47

2-Ply Napkins

Figure 18:
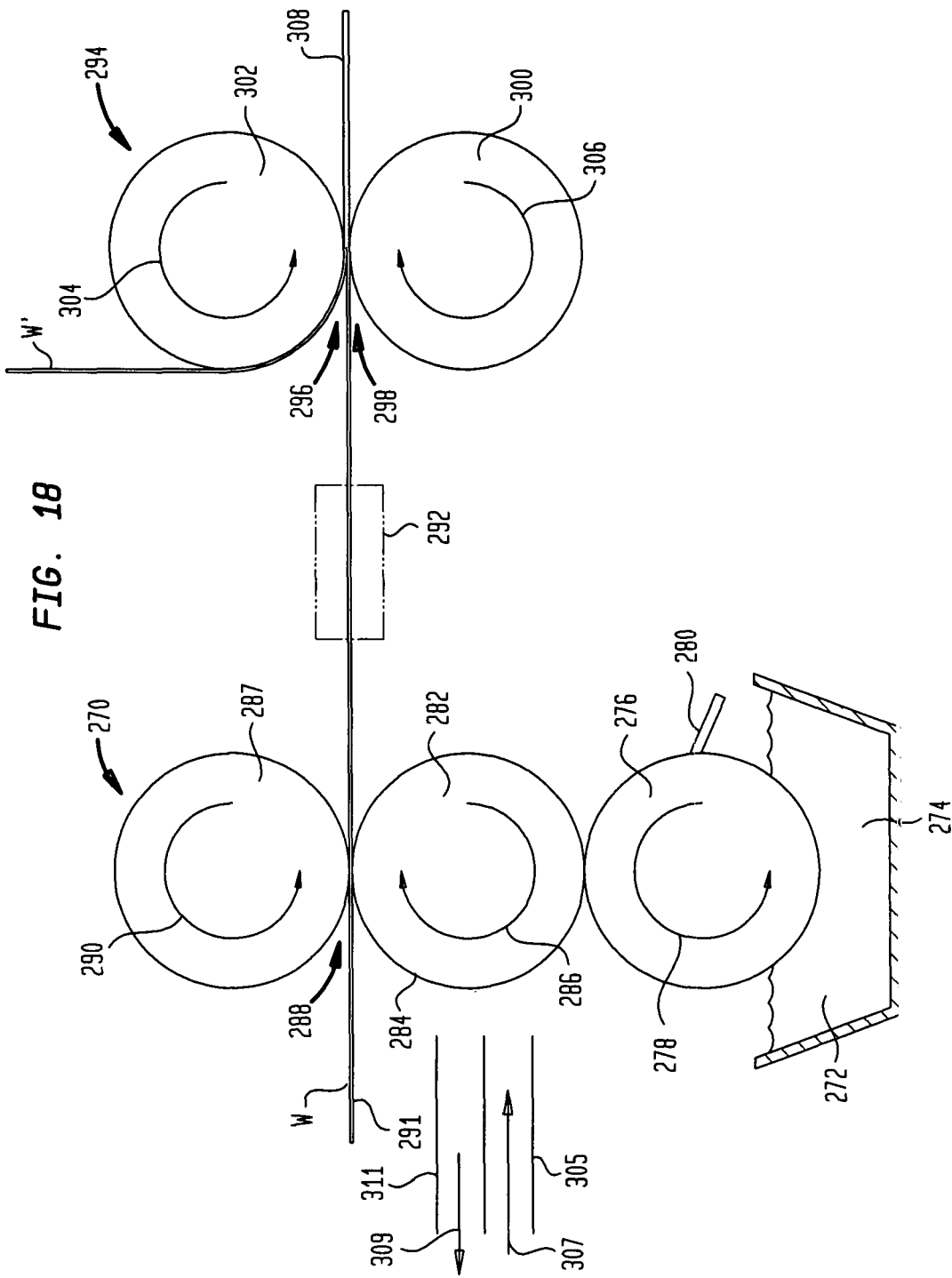
FIG. 18 is a schematic diagram of an offset printing and plying apparatus which may be used to prepare the inventive sheet products.

As an alternative to spraying the aqueous wax dispersion onto a base sheet or web W during its manufacture, one may obtain greater uniformity in the coating and accurate loadings by printing the wax onto the absorbent sheet followed by heating the web in an oven at temperatures sufficient to fuse the wax. Typically, it is desirable to distribute the aqueous dispersion uniformly at the surface (as opposed to distributing the dispersion in a pattern) by way of offset printing as shown schematically in FIG. 18 with a smooth applicator roll. There is shown in FIG. 18 a printing station 270 provided with a reservoir 272 of a suitable wax dispersion 274. A feed roller 276 is partially immersed in reservoir 272 and rotates in the direction indicated by arrow 278. Feed roller 276 may be provided with a roughened surface or engraved (e.g., a gravure roller) to pick up additional fluid as it rotates through reservoir 272. There is optionally provided a doctor blade 280 to remove excess dispersion form the roller. Blade 280 may or may not contact feed roller 276, depending on the amount of dispersion desired to be transferred to as an applicator roll 282, and the nature of the surface of the feed roll.

Applicator roll 282 has a smooth, resilient surface 284 which contacts feed roll 276 as shown. Surface 284 receives the dispersion as it rotates in the direction indicated by arrow 286 and prints it onto a web W of absorbent sheet as the sheet travels between applicator roll 282 and a backing roll 287 in the direction indicated by arrow 288 while roll 287 rotates in direction 290. The dispersion is printed onto surface 291 of web W in any suitable amount; typically in an amount such that the web is provided with about 1 to about 20 percent wax based on the amount of wax and cellulosic fiber in the sheet and then fused in an oven indicated at 292. The emulsifier is likewise present in the sheet, but typically in much smaller amounts since the emulsifier is generally present in amounts of less than 5 percent of the total solids in the dispersion.

There is optionally provided a conduit 305 for providing heated air indicated by arrow 307 to the surface of applicator roll 282 and on exhaust conduit 311 acting as a return in a flow direction indicated by arrow 309. The dispersion to be printed on the sheet is raised in solids at this point by using heated air to remove excess water. This water cannot be removed prior in the process because viscosities become too high. However at this point, as long as the material can be transferred to the web, water can be removed irrespective of the viscosity rise. In some cases, a "skin" may form over the material from the rapid drying and the base material may even "melt" or begin to melt which will permit even higher water removal while "sealing" the web so that the remaining water and desired material do not migrate into the sheet. Therefore less material need be applied to achieve desired effects. Likewise, heat can be provided to applicator roll 282 by any suitable means including electric coils, hot oil, steam and so forth in order to achieve the desired results.

Web W may be plied with another web W' at a calendar or embossing station 294 as web W advances along the direction indicated generally by arrow 296. Web W and web W' are bonded together in a nip 298 by light pressure between a pair of rolls 300, 302 which rotate in directions 304 and 306, respectively, to make a 2-ply napkin product, for example, as shown at 308. There is preferably provided an adhesive or glue between the plies to promote bonding between fibers of the plies. Alternatively, basesheet may be plied and then wax-treated.

Figure 19:
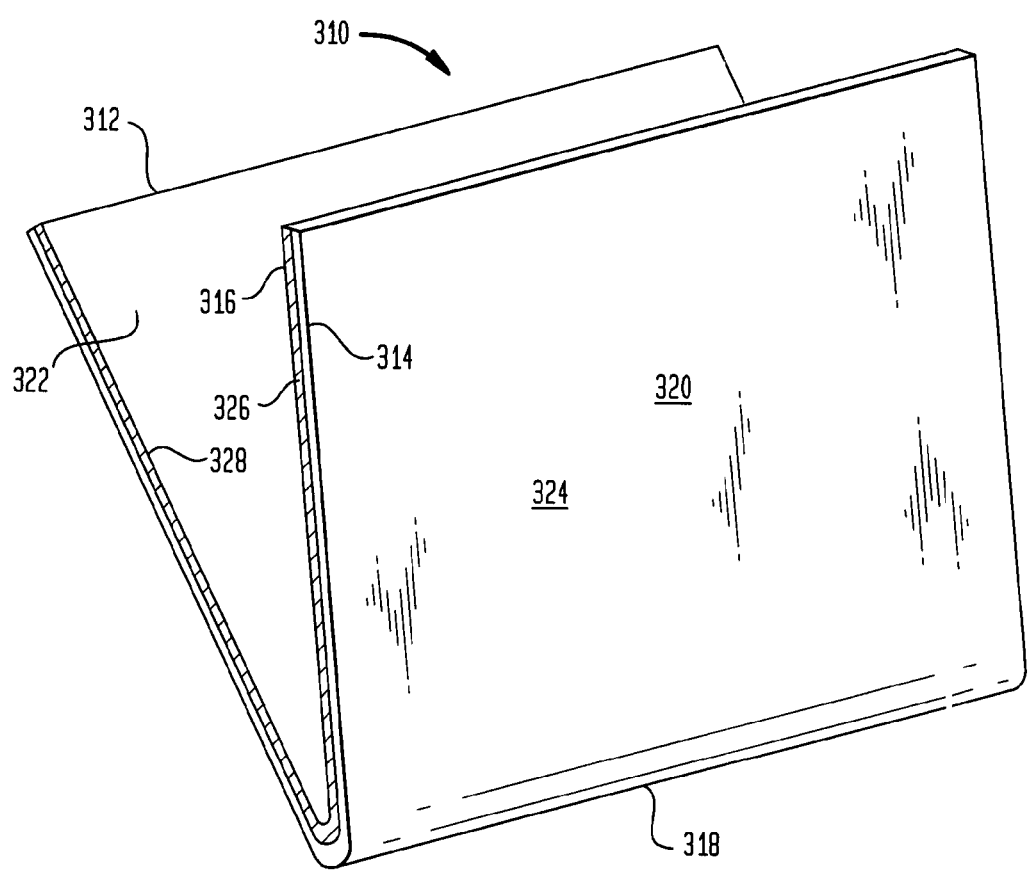
FIG. 19 is a schematic diagram of a 2-ply, 2-panel folded napkin prepared in accordance with the present invention.
Figure 20:
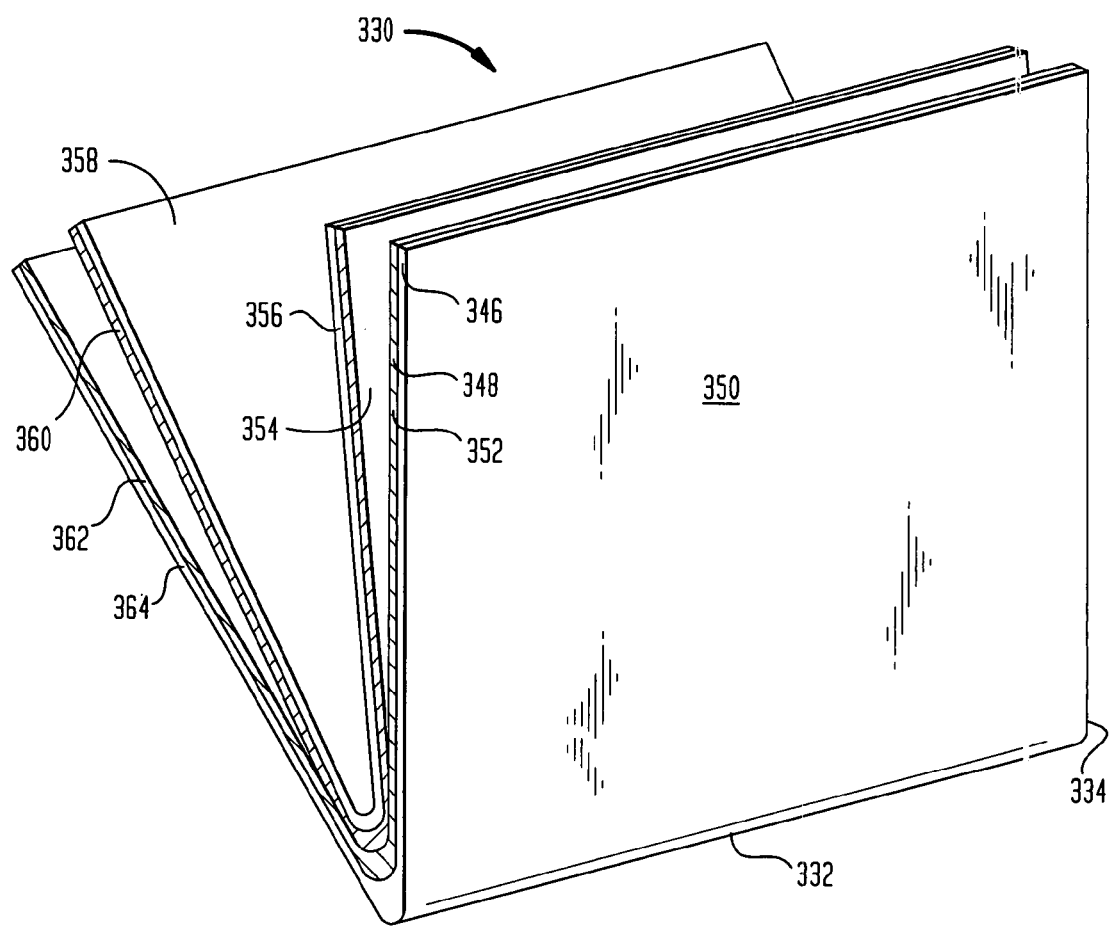
FIG. 20 is a schematic diagram of a 2-ply, 4-panel napkin prepared in accordance with the present invention.

2-ply sheet 308 is converted into 4-panel and 2-panel napkins having the fold/treated side arrangements illustrated schematically in FIGS. 19 and 20.

Referring to FIG. 19, there is shown a 2-panel napkin 310 made from a 2-ply sheet 312 including a first untreated ply 314 bonded to a second wax-treated ply 316. There is provided a single fold 318 between a first panel 320 and a second panel 322. Napkin 310 is thus configured to have two outer untreated surfaces, such as surface 324 and two internal treated hydrophobic surfaces 326, 328 which are provided with a fused wax treatment. Surfaces 326, 328 are contiguous when the napkin is folded flat providing a highly effective moisture barrier.

In FIG. 20 there is shown a 4-panel napkin 330 having folds at 332 and at 334. Napkin 330 has two plies 346, 348 bonded to each other. Ply 346 is made from untreated base sheet while ply 348 is prepared with 4-5 percent of a fused wax composition in accordance with the invention. The various panels accordingly have the following properties: surface 350 is untreated base sheet and is relatively hydrophilic; surface 352 is wax-treated and is laterally hydrophobic; surface 354 is also wax-treated and laterally hydrophobic; surfaces 356, 358 are untreated base sheet and are relatively hydrophilic; surfaces 360 and 362 are wax-treated and laterally hydrophobic; and surface 364 is untreated and relatively hydrophilic.

Napkin 330 thus has two interfaces made up of two contiguous hydrophobic surfaces. It has been found that the 4-fold napkin is substantially impenetrable to moisture when folded flat. Even teaspoon-size liquid insults do not penetrate the napkin. In testing, consumers observing this phenomenon indicated a strong preference for the product, including a purchase interest of over 90%. A purchase interest of 75% or more is unusual, while values above this such as 90% or more are remarkable.

In Table 8 there is provided properties of 2-panel and 4-panel 2-ply napkins wherein one ply has been provided with a fused wax treatment after the basesheets had been plied. Four different basesheets were plied and the first ten thousand (10,000) feet of each roll was wax-treated by offset printing and fused at 350° F. at 150 feet per minute. The next ten thousand (10,000) feet were run as a control. The rolls were converted into 2-panel and 4-panel napkins and evaluated. It is seen in Table 8, the wax treatment does not substantially effect physical properties or absorbency; yet moisture penetration is greatly reduced as noted above.

TABLE 8

2 and 4-Panel Napkin Properties

|  | Caliper mils/ 8 sht | Basis Weight lb/3000 ft 2 | Tensile MD g/3 in | Tensile CD g/3 in | Stretch MD % | Stretch CD % | T.E.A. MD mm-gm/ mm 2 | T.E.A. CD mm-gm/ mm 2 | Wet Tens Finch Cured-CD g/3 in | Wet Tens Finch Cured-MD g/ 3 in | Modulus GM g/% Stretch | Modulus CD g/% Stretch | Modulus MD g/% Stretch | Absorb. Capacity g/g |
|---|---|---|---|---|---|---|---|---|---|---|---|---|---|---|
| 4-Panel Napkins |  |  |  |  |  |  |  |  |  |  |  |  |  |  |
| Treated | 50.08 | 18.74 | 1304 | 343 | 10.3 | 5.3 | 0.993 | 0.142 | 91 | 182 | 28.8 | 20.7 | 40.2 | 8.59 |
| Untreated | 53.50 | 18.69 | 1316 | 396 | 15.5 | 6.2 | 1.312 | 0.184 | 81 | 236 | 21.2 | 21.3 | 21.1 | 8.72 |
| Treated | 66.00 | 22.10 | 856 | 312 | 11.2 | 7.0 | 0.678 | 0.170 | 35 | 68 | 19.0 | 16.7 | 21.7 | 8.92 |
| Untreated | 74.28 | 21.93 | 795 | 342 | 13.3 | 6.9 | 0.701 | 0.166 | 28 | 64 | 13.5 | 12.9 | 14.1 | 9.28 |
| Treated | 83.38 | 26.23 | 702 | 245 | 9.6 | 6.9 | 0.449 | 0.127 | 18 | 53 | 14.2 | 12.1 | 16.6 | 9.05 |
| Untreated | 93.28 | 26.41 | 741 | 280 | 14.7 | 7.5 | 0.683 | 0.153 | 23 | 37 | 11.5 | 11.3 | 11.6 | 9.69 |
| Treated | 55.38 | 20.28 | 1583 | 610 | 7.2 | 5.6 | 0.855 | 0.273 | 149 | 361 | 44.2 | 37.0 | 53.1 | 8.25 |
| Untreated | 66.58 | 20.21 | 1558 | 683 | 10.0 | 6.7 | 1.040 | 0.325 | 124 | 269 | 31.7 | 31.9 | 31.4 | 8.71 |
| Grand Avg | 67.81 | 21.82 | 1,106.74 | 401.31 | 11.46 | 6.50 | 0.84 | 0.19 | 68.61 | 158.69 | 23.02 | 20.49 | 26.24 | — |
| Untreated Avg | 71.91 | 21.81 | 1,102.24 | 425.21 | 13.35 | 6.81 | 0.93 | 0.21 | 63.89 | 151.51 | 19.46 | 19.38 | 19.56 | — |

TABLE 8-continued 2 and 4-Panel Napkin Properties

| | Caliper mils/ 8 sht | Basis Weight lb/3000 ft 2 | Tensile MD g/3 in | Tensile CD g/3 in | Stretch MD % | Stretch CD % | T.E.A. MD mm-gm/ mm 2 | T.E.A. CD mm-gm/ mm 2 | Wet Tens Finch Cured-CD g/3 in | Wet Tens Finch Cured-MD g/ 3 in | Modu-lus GM g/% Stretch | Modu-lus CD g/% Stretch | Modu-lus MD g/% Stretch | Absorb. Ca-pacity g/g |
|---|---|---|---|---|---|---|---|---|---|---|---|---|---|---|
| Treated Avg 2-Panel Napkins | 63.71 | 21.84 | 1,111.23 | 377.41 | 9.57 | 6.20 | 0.74 | 0.18 | 73.33 | 165.87 | 26.57 | 21.61 | 32.02 | — |
| Treated | 59.30 | 18.75 | 1167 | 334 | 9.13 | 7.1 | 0.788 | 0.183 | 76 | 249 | 23.9 | 16.9 | 33.8 | 9.07 |
| Untreated | 67.23 | 18.82 | 1318 | 346 | 13.4 | 7.7 | 1.173 | 0.192 | 69 | 239 | 17.2 | 14.2 | 20.7 | 10.0 |
| Treated | 77.5 | 22.31 | 854 | 361 | 11.4 | 6.7 | 0.681 | 0.181 | 34 | 59 | 20.5 | 19.8 | 21.2 | 9.09 |
| Untreated | 83.45 | 22.44 | 919 | 410 | 16.2 | 8.5 | 0.983 | 0.258 | 29 | 66 | 15.9 | 16.3 | 15.5 | 9.41 |
| Treated | 91.65 | 26.68 | 730 | 273 | 11.1 | 7.2 | 0.544 | 0.149 | 19 | 56 | 14.5 | 12.9 | 16.4 | 9.78 |
| Untreated | 103.33 | 26.69 | 629 | 277 | 12.5 | 9.2 | 0.471 | 0.191 | 23 | 48 | 11.2 | 10.6 | 11.9 | 10.23 |
| Treated | 63.85 | 20.60 | 1537 | 570 | 6.4 | 5.3 | 0.696 | 0.237 | 145 | 342 | 41.0 | 34.8 | 48.3 | 8.35 |
| Treated | 66.18 | 20.54 | 1499 | 646 | 7.4 | 5.5 | 0.797 | 0.275 | 155 | 340 | 40.5 | 36.5 | 45.1 | 8.31 |
| Untreated | 77.60 | 20.41 | 1557 | 668 | 10.3 | 6.9 | 1.093 | 0.337 | 126 | 264 | 30.0 | 27.8 | 32.4 | 9.48 |
| Grand Avg | 76.90 | 21.92 | 1,134.33 | 431.77 | 10.89 | 7.13 | 0.80 | 0.22 | 74.96 | 184.98 | 23.85 | 21.09 | 27.26 | — |
| Untreated Avg | 82.90 | 22.09 | 1,105.70 | 425.42 | 13.09 | 8.09 | 0.93 | 0.24 | 61.60 | 154.47 | 18.57 | 17.25 | 20.12 | — |
| Treated Avg | 72.11 | 21.78 | 1,157.22 | 436.85 | 9.13 | 6.37 | 0.70 | 0.20 | 85.64 | 209.39 | 28.08 | 24.16 | 32.96 | — |

As will be appreciated from the foregoing discussion and data, the process of preparing a base sheet to exhibit the desired barrier characteristics involves applying aqueous barrier chemicals to the sheet and then removing the water followed by curing the barrier material. It is seen above that the barrier chemicals do not completely seal the sheet since air permeability changes only slightly with proper treatment. That is, the natural porosity and surface texture of the sheet is retained to a great degree. This indicates most of the barrier chemical is located on the top surfaces of the fibers that make up the sheet and that very little of it "bridges" the spaces between fibers. Therefore, the barrier properties in use arise from the non-wettable surface properties of these exposed fibers. Further experiments have shown that with pressure, water can be forced through the open areas, again confirming that the porosity of the sheet remains intact. We have found that unless great care is taken, some of the water based barrier chemistry penetrates into the sheet structure and through to the other side of a treated sheet. While this backside of the sheet usually doesn't provide as much moisture barrier as the treated side, the degree to which this penetration is allowed affects the initial contact angle of wetting fluids and also may reduce the overall water holding capacity of these sheets. Still further work has shown that the surface characteristics of both sides of a treated ply of tissue, napkin, and towel paper affect the subsequent converting of cured sheets into multiply products.

Typically, plies are attached to make a finished product like a towel or napkin by embossing with or without adhesive to affect a physical attachment by the close proximity of two closely spaced elements of the embossing press. With conventional products, ply attachment generally increases with increased loadings in the embossing press. However, when using cured barrier treated plies of the invention, increased emboss pressing loading without adhesive does not suffice to bond a treated ply to an untreated ply. Even when the embossing process introduced tears into the sheet from excessive loading no effective ply attachment was observed. So also, adhesive should be applied to a treated surface as will be appreciated from the discussion which follows.

Attempts to apply adhesive to untreated ply and then combine that with treated and cured ply failed to generate sufficient ply attachment, even at high levels of glue application. It was then discovered that if the gluing material is first applied to the treated ply sufficient ply attachment is generated even at low, cost-effective, addition rates. Without intending to be bound by any theory, we believe that when the glue is applied to the untreated ply some of the material moves into the sheet structure while leaving sufficient glue on the surface to attach another ply of similar wetting properties. But when the residual glue comes into contact with the treated ply, the pressure applied forces the rest of the glue into the untreated ply rather than affecting adhesion to the treated ply. We believe this is due to the inability of the process to "push" the adhesive material beyond the surface treated fibers in the z-direction into the structure so that contact with untreated (or lesser treated) fibers beneath the surface. Based upon this experience, it was quite surprising that we could, in fact, print the adhesive onto the treated ply. We believe that when the adhesive is applied to the treated ply, the pressure in the printing nip causes the material to move past the treated surface fibers into the structure of the sheet, thus locking the material to the surface. The adhesive material that remains on the surface is then sufficient to adhere the untreated ply as in a normal operation. In the various multi-ply manufacturing schemes illustrated below, adhesive is preferably applied in accordance with the foregoing discussion, particularly when the barrier coating is cured prior to plying with an untreated ply. Any suitable adhesive may be employed, for example, poly(vinyl alcohol based) adhesives, cellulose ether based adhesives, hot melt adhesives, or any known to the skilled artisan.

Various preferred production schemes and products are summarized briefly in FIGS. 21A through 21J.

Figure 21A:
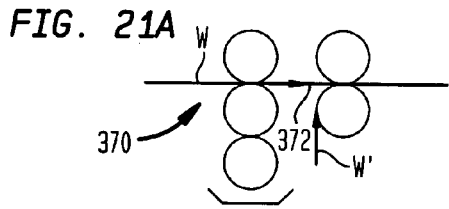
FIGS. 21A-21J are schematic diagrams illustrating various production schemes and multi-ply products thereof.
Figure 21B:
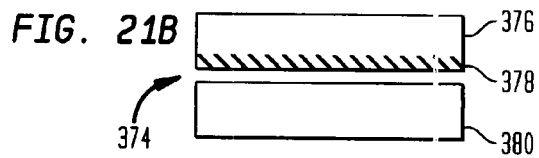
Figure 21C:
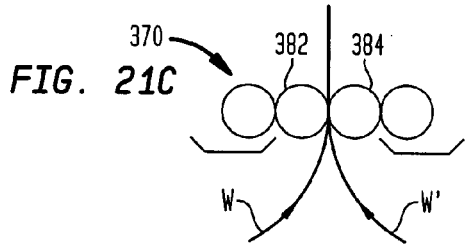
Figure 21D:
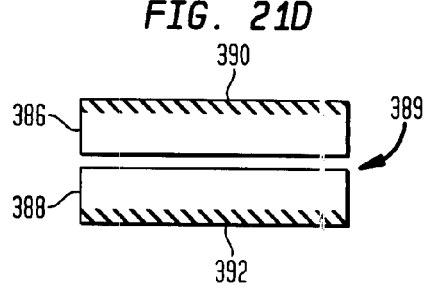

In FIG. 21A there is shown web, W, being provided to a printing station 370 wherein a wax emulsion is printed onto the underside 372 of web W. WebW, is thereafter plied with web W' and the emulsion is melt-fused to produce the two-ply product 374 of FIG. 21B. Product 374 includes a first ply 376 with a treated inner surface 378 as well as an untreated ply 380. Similarly, the inventive products may be produced using a pair of applicator rolls as shown in FIG. 21C where webs, W and W' are plied at a pair of applicator rolls 382, 384 as the webs move in the direction indicated to form the product 389 of FIG. 21D which has two plies 386, 388 with wax-treated outer surfaces 390, 392.

Figure 21E:
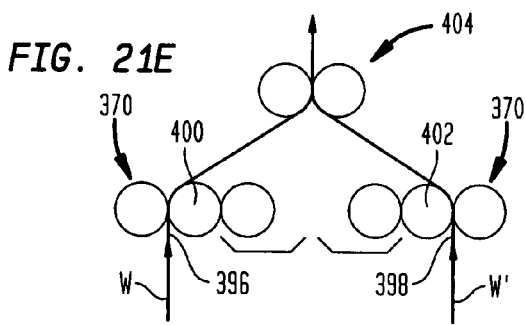
Figure 21F:
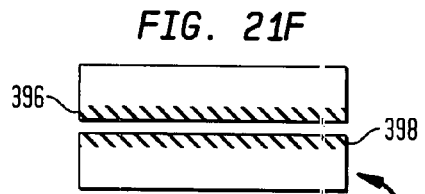

Another two-ply product 394 may be prepared using a wax/emulsifier application apparatus as is shown in FIG. 21E. Here, the wax dispersion is applied to webs W and W' as they travel in the direction indicated on their inner surfaces 396, 398 by applicator rolls 400,402 as shown. The webs are thereafter plied at embossing station 404 and the emulsion is fused with the web to form product 394 shown in FIG. 21F wherein the product has two internal treated surfaces 396, 398 to prevent moisture penetration.

Figure 21G:
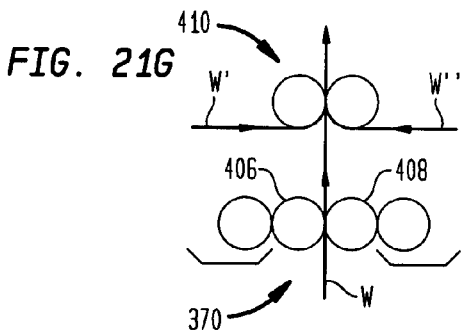
Figure 21H:
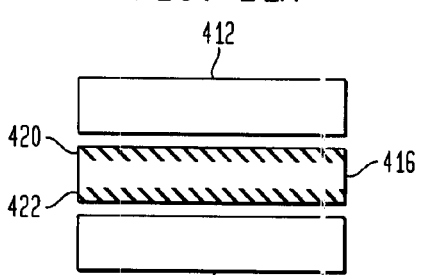
Figure 21I:
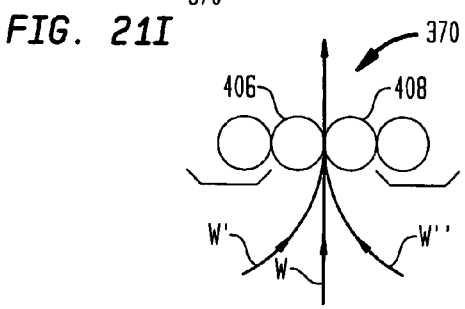
Figure 21J:
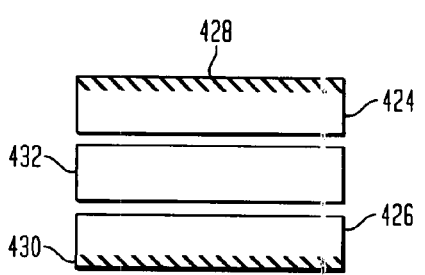

Three-ply products may be produced by way of the application schemes shown in FIGS. 21G and 21I. In FIG. 21G, wax dispersion is printed on both sides of web W as it travels through station 370 by applicator rolls 406, 408 before the web W is plied with webs W' and W" at embossing station 410. The product has the structure shown in FIG. 21H, with two outer plies 412, 414 as well as an inner ply 416 which has been treated on surface 420 adjacent ply 412 as well as on surface 422 adjacent ply 412. Alternatively, web W, web W' and web W'" may be plied while rolls 406, 408 provide the aqueous wax dispersion to the outside of the three-ply structure as is shown in FIG. 21I. The three-ply product, shown in FIG. 21J includes outer plies 424, 426 with outer wax-treated surfaces 428, 430 as well as an internal untreated ply 432.

Figure 22:
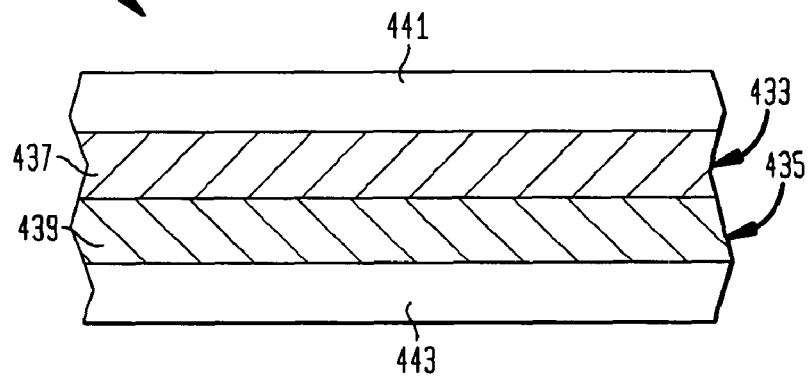
FIGS. 22 and 23 are schematic diagrams illustrating two- and three-ply structures useful for napkins prepared using plies provided with fused wax treatments in accordance with the invention.
Figure 23:
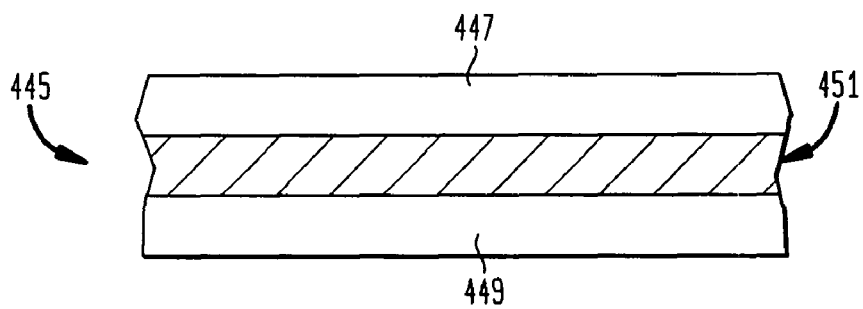

Particularly preferred layer structures for napkins are shown schematically in FIGS. 22 and 23. In FIG. 22 there is shown the cross-section of a 2-ply napkin 431 having plies 433 and 435. Ply 433 has an inner layer 437 which is provided a fused wax treatment so that it has a laterally hydrophobic region at 437 and ply 435 is provided a fused wax treatment at 439 so that this region is hydrophobic as well. The two contiguous hydrophobic regions in the plied structure exhibit the synergistic barrier properties noted above; whereas, outer regions 441, 443 of the napkin are relatively hydrophilic.

Another preferred napkin structure is shown schematically in FIG. 23. A 3-ply napkin 445 is provided with untreated outer plies 447, 449 and an inner ply 451 which has been provided on one or both sides a fused wax treatment in accordance with the invention.

Figure 24:
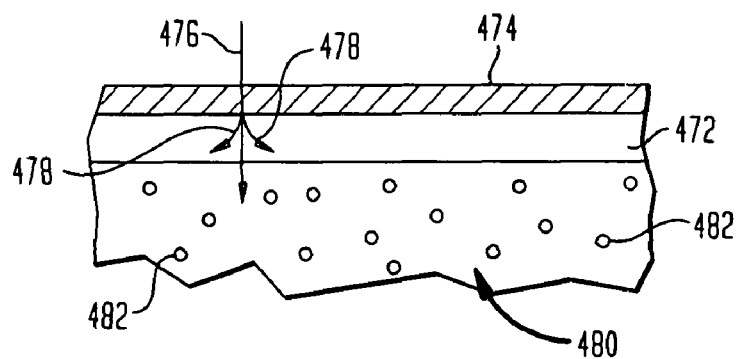
FIG. 24 is a schematic diagram illustrating an absorbent composite wherein the wax-treated absorbent sheet of the invention is used as a cover layer for an absorbent core.

The inventive absorbent sheet of the invention is advantageously employed in connection with facial tissue, bath tissue, paper toweling, napkins, shop towels and the like and is also useful as a cover layer for an absorbent composite since the treated surface resists lateral migration of moisture, minimizing discomfort, for example, associated with a wetted incontinence garment such as diaper. There is shown schematically in FIG. 24 a cross-section of a composite useful for such applications.

The composite is provided with a cover sheet 472 made from wax-treated cellulosic sheet prepared in accordance with the invention. Cover sheet 472 has a wax-treated outer surface 474 which is laterally hydrophobic as noted above such that applied moisture at surface 474 migrates inwardly in the direction of arrow 476 at the surface and tends to migrate laterally (i.e., in the direction of the plane of the sheet) below surface 474, as shown by arrows 478.

An absorbent cellulosic core 480 may be made from nonwoven cellulosic sheet, such as air-laid sheet and is optionally impregnated with superabsorbent polymer particles indicated at 482. The superabsorbent polymer is typically a polymer of acrylic acid as is well known in the art. Sheet 472 is preferably adhered to core 480.

Inasmuch as moisture penetrates surface 474 in a direction perpendicular to the plane of sheet 472, the wetted area at surface 474 is minimized.

Figure 25A:
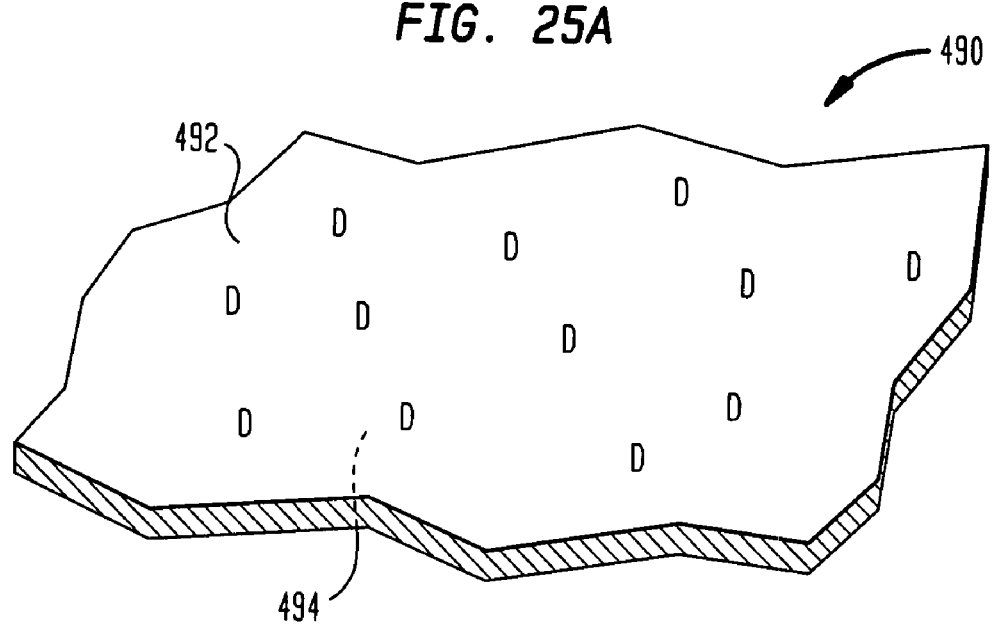
FIG. 25A is a view in perspective of a portion of a wax-treated towel wherein the hydrophobic surface thereof is provided with identifying indicia.
Figure 25B:
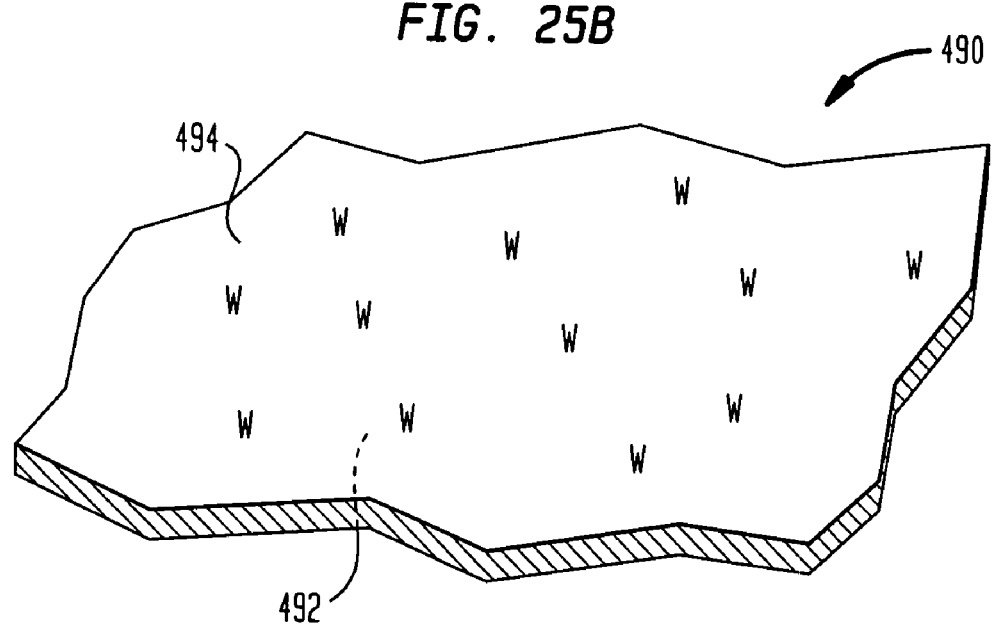
FIG. 25B is a view in perspective of a portion of the opposite side of the towel of FIG. 25A wherein the hydrophilic surface thereof has been provided with identifying indicia.

A shop towel 490 may be prepared from an air-laid web treated in accordance with the invention on one side 492 to be laterally hydrophobic on that side and create a barrier to migration from its other relatively hydrophilic side 494. In such cases, shown schematically in FIGS. 25A and 25B, it may be convenient to mark the towel appropriate indicia, for example, a "D" on the hydrophobic side and a "W" on the hydrophilic side as shown so that a user will readily ascertain the appropriate orientation of the towel if he or she wishes to keep their hands dry, for example, when using the towel. Instead of letters as identifying indicia, designs, colors and so forth may be employed for this purpose.

EXAMPLES 48A THROUGH 52B

The following examples illustrate the effect of the inventive fused wax treatment on the contact angle of the surface of a treated sheet. A high contact angle can be achieved by a "light" treatment of a dense construction or a "high" treatment of an open structure. A large contact angle difference describes the conditions for z-direction wicking which is responsible for pulling the water from the treated surface and leaving it "dry" to the touch. In diaper or incontinence product construction, a "high" contact angle outer surface (e.g. polypropylene) is used on the skin-side and the urine/menses is "pushed" into the absorbent outer layer by overlying hydrostatic pressure or pressure of contact against the skin. The required pressure to push the liquid into the absorbent layer can be calculated from the LaPlace equation: $\Delta p = 2 g \cos \theta / r$; where g is the liquid surface tension, $\theta$ is the liquid contact angle and r is the pore radius. $\Delta p$ values >0 signify a wetting condition and is the internally applied pressure necessary to prohibit liquid intrusion. Also the rate of wicking into the absorbent structure is governed by the Washburn equation: $V = rg \cos \theta / (4 \mu h)$; where r is the pore radius, g=liquid surface tension and $\theta$ is the liquid/solid (contact angle, $\mu$ is liquid viscosity and h is height of liquid penetration in the web.

To demonstrate the effect of the fused wax dispersion on the hydrophobicity of the sheet, basesheet was prepared as described above treated on one side with 6.2% by weight (dry basis) with MICHEM® wax dispersion 48040M2. The contact angle over time for five samples on the treated side (side A) and the untreated side (side B) were measured using the procedure noted hereinabove. The contact angle is thus defined at the line of contact between the air (A), liquid droplet (L) and basesheet (S) as is seen in FIG. 26A, where the contact angle ($\theta$) is shown between the surface (S) and the tangent vector $X_A$ at the air side of the droplet. While values of $\theta$ varied somewhat over time, the differences between contact angles of opposite sides of the sheet remained relatively constant. Results appear in Table 9, and average contact angles over time for the samples appear graphically in FIG. 26B.

TABLE 9

Contact Angle

| Time (min) | Sample No. Applied Side (A) | | | | | | | | Back Side (B) | | | |
|---|---|---|---|---|---|---|---|---|---|---|---|---|
| | 48A | 49A | 50A | 51A | 52A | Avg | SD | Wgt | 48B | 49B | 50B | 51B |
| 1 | 93 | 99 | 90 | 98 | 92 | 94.4 | 3.912 | 6.54 | 82 | 74 | 75 | 72 |
| 3 | 84 | 94 | 80 | 87 | 85 | 86.0 | 5.148 | 3.77 | 72 | 71 | 68 | 70 |
| 5 | 82 | 90 | 76 | 81 | 84 | 82.6 | 5.079 | 3.88 | 65 | 68 | 68 | 70 |
| 7 | 80 | 89 | 73 | 78 | 81 | 80.2 | 5.805 | 2.97 | 65 | 64 | 68 | 68 |
| 9 | 78 | 88 | 69 | 75 | 80 | 78.0 | 6.964 | 2.06 | 62 | 62 | 67 | 67 |
| 11 | 77 | 87 | 67 | 73 | 77 | 76.2 | 7.294 | 1.88 | 59 | 60 | 67 | 62 |

| Time (min) | Back Side (B) | | | | Sample No. Difference | | | | | | | |
|---|---|---|---|---|---|---|---|---|---|---|---|---|
| | 52B | Avg | SD | Wgt | 1 | 2 | 3 | 4 | 5 | Avg | SD | Wgt |
| 1 | 80 | 76.6 | 4.219 | 5.26 | 11 | 25 | 15 | 26 | 12 | 17.8 | 7.190 | 1.93 |
| 3 | 76 | 71.4 | 2.966 | 11.36 | 12 | 23 | 12 | 17 | 9 | 14.6 | 5.505 | 3.30 |
| 5 | 73 | 68.3 | 2.950 | 11.49 | 17 | 22 | 8 | 11 | 11 | 13.8 | 5.630 | 3.15 |
| 7 | 70 | 67.0 | 4.449 | 16.67 | 15 | 25 | 5 | 10 | 11 | 13.2 | 7.497 | 1.78 |
| 9 | 67 | 65.0 | 2.739 | 13.33 | 16 | 26 | 2 | 8 | 13 | 13.0 | 9.000 | 1.23 |
| 11 | 67 | 63.0 | 3.808 | 6.90 | 18 | 27 | 0 | 11 | 10 | 13.2 | 10.035 | 0.99 |

14.267 Avg Difference
6.560 Std Dev
2.934 SE(Avg)
2.776 t(4, 0.975)
−6.121 95% Two-Sided LCL for Avg
22.412 95% Two-Sided UCL for Avg
2.132 t(4, 0.95)
8.012 95% One-Sided LCL for Avg Based on the data of Table 9, the average difference between contact angles, treated side and untreated sides, was about 14 degrees, with a 95% confidence level that the average difference in contact angle between the two sides was from about 6 to about 22. The treated side had a contact angle of at least 8 degrees more than the untreated side with a confidence level of 95%.

The contact angle measured by the method noted herein of untreated basesheet after 1 or 2 seconds is very small (approximately 0°) and thus it appears that the wax penetrated the sheet from one surface to the other in the tests conducted, but remained more concentrated on the treated side for the sheet tested in Table 9. It has been found that the effect of the wax can be tailored by controlling the time, temperature and pressure involved in disseminating the wax into the sheet as discussed further below.

EXAMPLES 53 THROUGH 57

Utilizing generally the application technique described in connection with FIG. 18, the oven temperature was adjusted to 350° F. (177° C.) and the machine speed varied while preparing basesheet provided with a fused wax dispersion. The oven had a length of about 12 feet such that the dryer residence time was from about 0.8 seconds to about 4.8 seconds based on machine speeds of 150 and 900 feet per minute, respectively. Contact angles were measured on the treated (applied) side and the untreated side of the sheet. Results appear in FIG. 26C wherein it can be seen at high machine speeds (low residence times) the effect on contact angles of the basesheet was markedly lower.

Figure 26D:
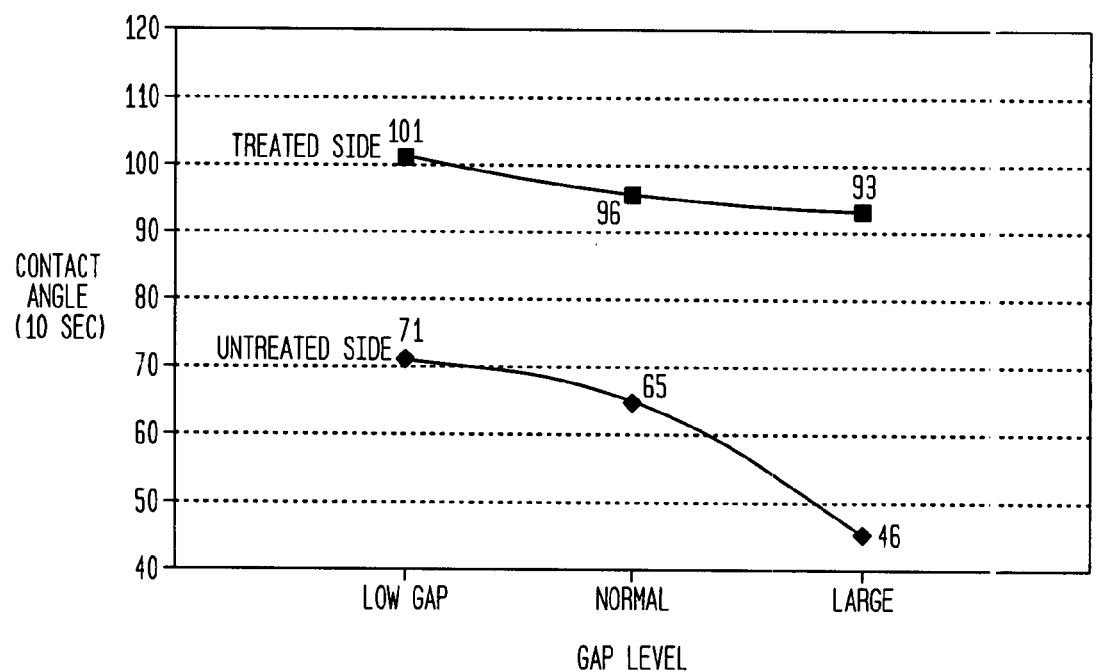
FIG. 26D is a plot of contact angle versus time for the treated and untreated sides of a basesheet wherein dispersion application pressure was varied.

In another series of runs, the application nip gap between an applicator roll (i.e., roll 282 of FIG. 18) and its backing roll 287 was varied between low gap (high pressure), normal gap and large gap (low pressure) while applying the dispersion to the sheet. The gap was generally varied between 0.002-0.010 inches, about 60% of the dry sheet caliper or less. Contact angles were measured and appear in FIG. 26D. In FIG. 26D it is seen that the high gap/low pressure application of the dispersion increased the "sidedness" of the ply.

EXAMPLES 58-65

The wax treatment of the invention was applied to a variety of commercial base sheets which were then compared with untreated base sheet for air permeability and dispersibility. That is to say, the properties of a treated web are compared with a like untreated web in Table 10.

TABLE 10

Comparison of Air Permeability/Dispersibility

| Example # | Product | Frazier Air Perm. (*) (Ft 3/min/ft 2) | Dispersibility (*) (Strokes to Pass) |
|---|---|---|---|
| 58 | Commercial Basesheeet Non-Treated | 117 ± 4 | 26 |
| 59 | Commercial Basesheet Treated | 118 ± 6 | 30 |
| 60 | Commercial Basesheet Treated | 155 ± 15 | 44 |
| 61 | Commercial Basesheet Treated | 166 ± 9 | 64 |
| 62 | Commercial Basesheet (Napkin) Non-Treated | 104 ± 4 | 1500 (1) |
| 63 | Commercial Basesheet (Napkin) Treated | 114 ± 5 | 1500 (2) |
| 64 | Facial Tissue Non-Treated | 157 ± 6 | 1500 (1) |
| 65 | Facial Tissue Treated | 151 ± 2 | 1500 (2) |

(*) Sample size is 4.5 in. × 4.5 in. − (1 ply)
(1) Samples passed the test but wetted sheets were still intact
(2) Samples failed to pass the test at 1500 strokes It can be seen in Table 10 that the wax treatment did not substantially change the permeability of any of the webs, which exhibited more or less the same Frazier Air Permeabilities as untreated product. Examples 58 and 59 exhibited similar dispersibilities, while in other cases the dispersibility of the products appeared to decrease slightly after treatment with wax.

Figure 27:
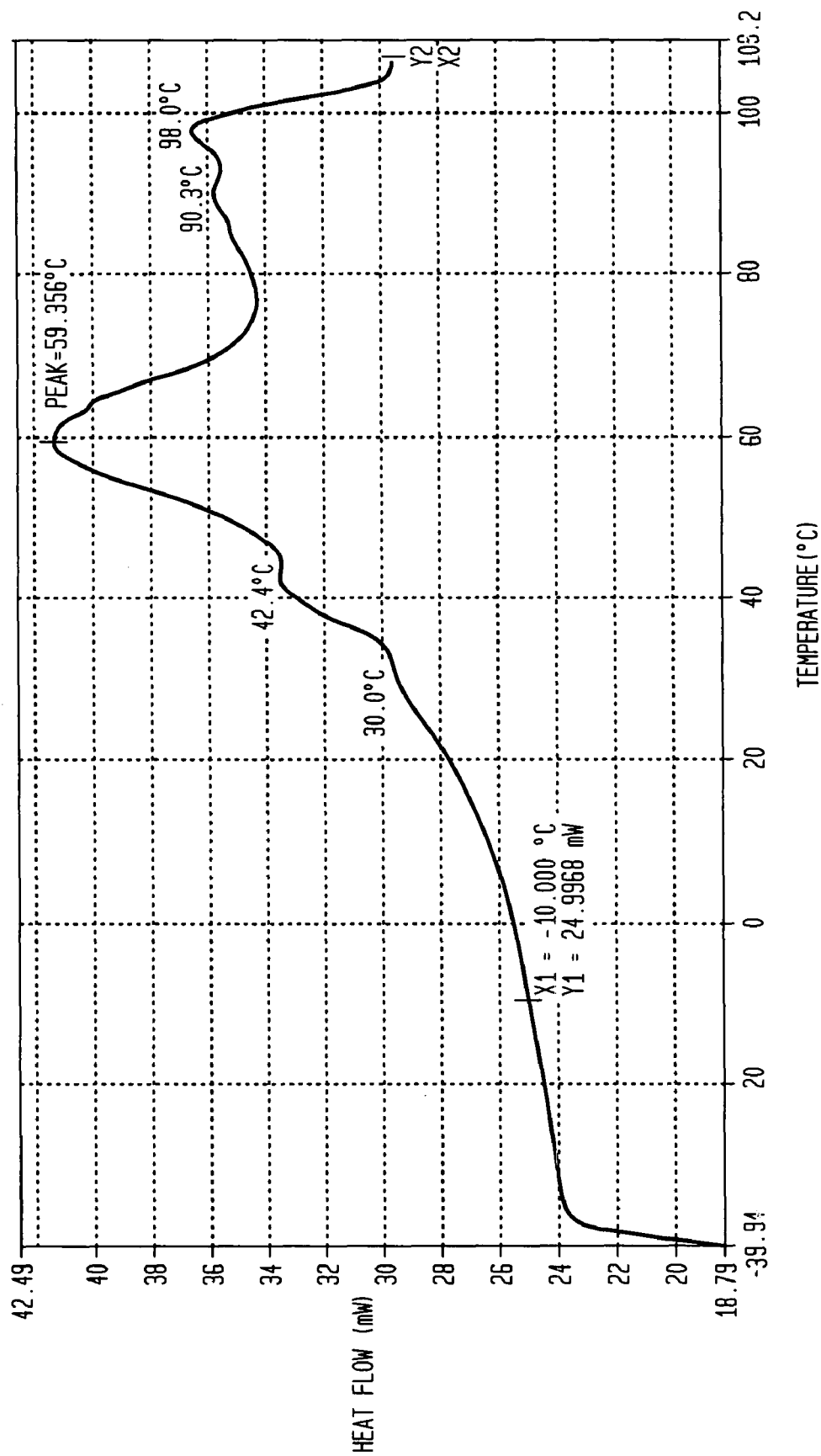
FIGS. 27 and 28 are plots of heat flow versus temperature for the first and second heating respectively of a wax/emulsifier composition.
Figure 28:
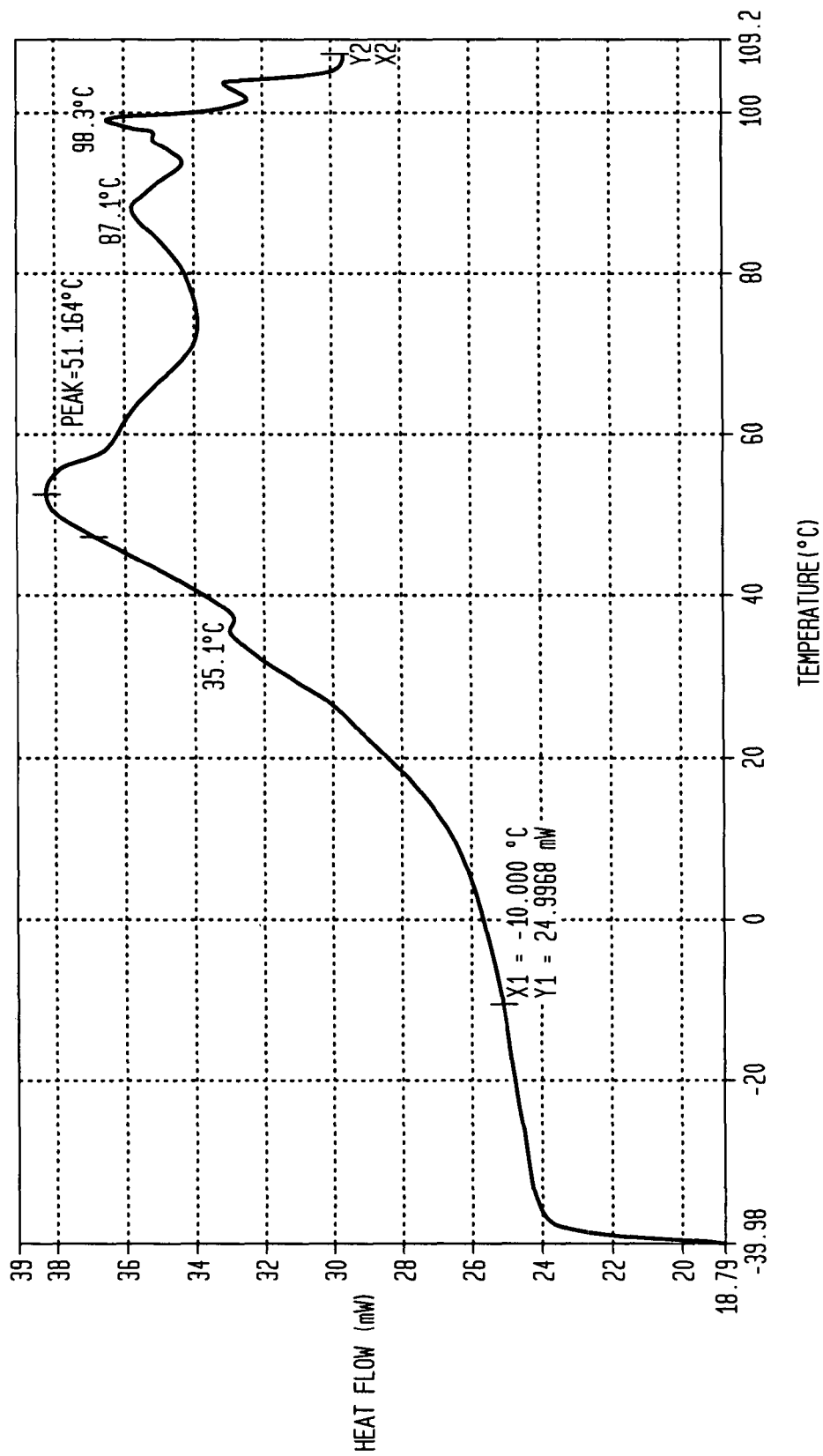

The dispersions including the wax and emulsifier show relatively complex melt behavior as will be appreciated from Table 11 below which is a summary of the DSC data obtained on the 48040M2 material. As can be seen, multiple heat absorbing peaks are absorbed; FIG. 27 is a first heating plot of heat flow versus temperature for the solids of the emulsion. FIG. 28 is a plot of heat flow versus temperature for the second DSC heating of the sample of FIG. 27 wherein it can be seen that one or more of the prominent enthalpy peaks shift to a lower temperature indicative of the fused wax treatments of the invention. It is believed the emulsifier interacts with the wax in the melt to lower one or more of the composition's characteristic melting temperatures of anywhere from 1 to 20 degrees centigrade or so. That is to say, the wax composition fused with the fibers of the web (after melting) differs from that applied to the web (before melting) as seen from the different melt characteristics observed on the first and second heating of the solids of the dispersion.

sneeze, for example. This feature becomes apparent by way of simulated sternutation or sneeze testing, described further below.

Figure 29:
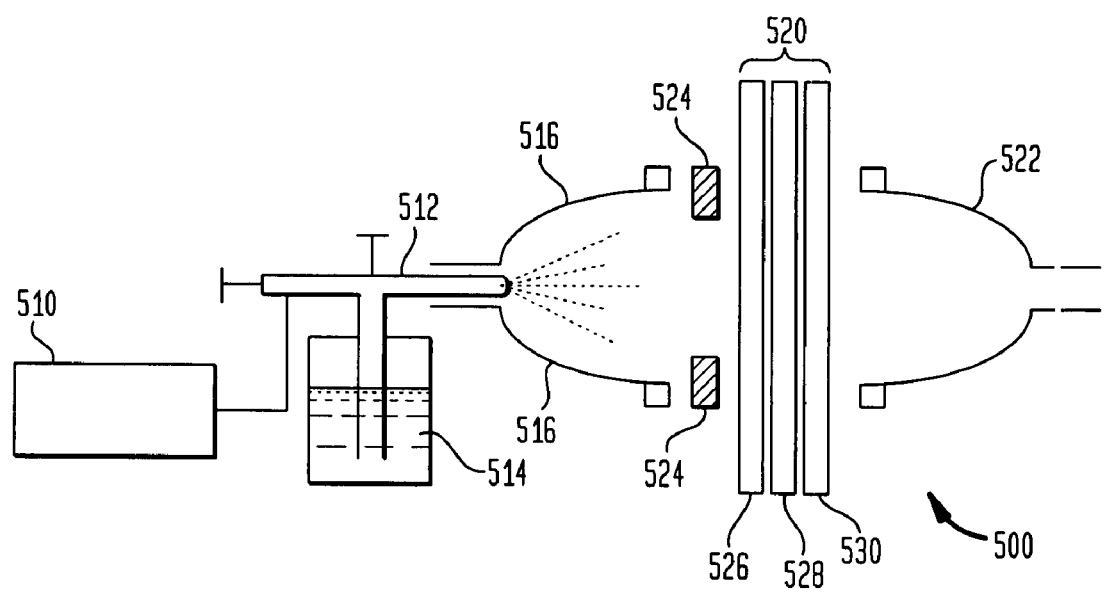
FIG. 29 is a schematic diagram of a sternutation simulator.

There is shown schematically in FIG. 29 an apparatus 500 including a compressed air source 510 provided with a timer and an air brush 512 coupled to source 510 and communicating with a liquid supply 514. Air brush 512 also communicates with a chamber 516 as shown. Chamber 516 encloses one side of a tissue sample 520 while a second chamber 522 encloses the other side of sample 520, which is secured on sample plate 524. The tissue sample employed has a multiplicity of plies, such as plies 526, 528 and 530. The sample chambers (in combination) are available from VWR Scientific Products (Cat. #282000-301), and any suitable air brush, such as a Vega 600 air brush may be used. Samples are prepared with individually separable plies so that liquid sorption and sequestering characteristics can be identified.

Apparatus 500 is operated as follows:

Set the compressed air regulator with timer to 20 psig and a 0.5 second dispense time;

Adjust the needle of the airbrush so the amount of liquid is about 0.105±0.005 g. The blue color water contains 1% of NaC+1% 293C BLUE;

TABLE 11

Thermal Characteristics of Michem ® Emulsion 48040M2

| Sample | | Total Euthalpy ΔH (J/g) | Peak #1 | | | Peak #2 | | | Peak #3 | | |
|---|---|---|---|---|---|---|---|---|---|---|---|
| | | | $T_{peak}$ (°C.) | % | ΔH (J/g) | $T_{peak}$ (°C.) | % | ΔH (J/g) | $T_{peak}$ (°C.) | % | ΔH (J/g) |
| Dry Michem Emulsion | First Heating | 165.2 | 30.0 | 7.7 | 12.7 | 42.4 | 11.0 | 18.3 | 59.4 | 53.3 | 88.1 |
| | Second Heating | 157.4 | — | — | — | 35.1 | 15.8 | 24.9 | 51.2 | 53.6 | 84.4 |
| Liquid Michem Emulsion | First Heating | | — | — | — | — | — | — | 60 | — | — |
| | Second Heating | | — | — | — | — | — | — | — | — | — |

| Sample | | Peak #4 | | | Peak #5 | | | Peak #6 | | |
|---|---|---|---|---|---|---|---|---|---|---|
| | | $T_{peak}$ (°C.) | % | ΔH (J/g) | $T_{peak}$ (°C.) | % | ΔH (J/g) | $T_{peak}$ (°C.) | % | ΔH (J/g) |
| Dry Michem Emulsion | First Heating | 90.3 | 18.0 | 29.7 | 98.0 | 10.0 | 16.4 | — | — | — |
| | Second Heating | 87.1 | 20.8 | 32.8 | 98.3 | 7.9 | 12.4 | 103.0 | 1.9 | 2.9 |
| Liquid Michem Emulsion | First Heating | 90 | — | — | — | — | — | 101* | — | — |
| | Second Heating | — | — | — | — | — | — | — | — | — |

Tissue Products

The resistance to moisture penetration provided by way of the invention is particularly effective in tissue products where the combination of resistance to penetration and limited migration of liquids on a treated surface cooperate to enable the production of tissues with outer surfaces which retain relatively low amounts of liquid even when the product is insulted with pressure-propelled liquid as occurs with a Record the weight of each single ply tissue ($m_n$) of the test sample before testing (n is the ply number of the sample);

Place the sample in between the chamber 522 and the Sample Plate (1.5 inch diameter hole) and close the chambers 516 and 522 with a clip;

The sample side facing the airbrush (chamber 516) is referred to as the Nose-Side, and the opposite side, chamber 522 is referred to as the Hand-Side. This side of the tissue sample is tested to see how much water penetrates through the sheet;

Press the start button on the compressed air regulator. This will supply 0.105±0.005 g of liquid in 0.5 second and also create about 1 psig pressure inside the chamber 516;

Remove the clip and open the chambers to remove the wetted sample; and

Record the weight of each wetted ply tissue ($M_n$).

Following testing, the water distribution (percent) of each ply, n, of the sample is calculated by the following formula:

Water Distribution of Ply $n(\%) = (M_n - m_n) \times 100/\Sigma(M_n - m_n)$

EXAMPLES 66-107

Following the above procedures, samples prepared from plies of tissue sheet enumerated in Table 12 were tested in the configuration indicated in Table 13. N indicates an untreated ply, whereas T indicates a ply treated in accordance with the invention. The sample structure indicated is from the Nose-Side (ply #1) to the Hand-Side in the tables and in FIGS. 30-34. Tissues A through I indicate commercially available products. Most of the commercial products are sold as two or three ply products, and tissue I is sold as a lotioned product. The treated tissue basesheet of the invention (T) had a basis weight of 9.37 lbs/3000 square foot ream.

Sternutation test results appear in Table 13 and in FIGS. 30-34 for selected test samples.

TABLE 12

| Samples | Single Ply Basis Weight (lb/ream) |
| --- | --- |
| Treated Basesheet (T) | 9.37 |
| Tissue A | 10.64 |
| Tissue B | 9.30 |
| Tissue C | 8.57 |
| Tissue D | 8.67 |
| Tissue E | 8.67 |
| Tissue F | 10.86 |
| Tissue G | 9.05 |
| Tissue H | 12.22 |
| Tissue I | 14.70 |

TABLE 13

| Ref. | (#)-Ply | Sample Structure | Water Distribution (%) | | | | | | Total Amount (g) |
| --- | --- | --- | --- | --- | --- | --- | --- | --- | --- |
| | | | Ply 1 Nose-Side | Ply 2 | Ply 3 | Ply 4 | Ply 5 | Ply 6 Hand-Side | |
| Tissue A | 3-Ply | NNN | 35 | 35 | 30 | — | — | — | 0.107 |
| | 4-Ply | NNNN | 25 | 23 | 27 | 25 | — | — | 0.105 |
| | 6-Ply | NNNNNN | 16 | 18 | 15 | 18 | 18 | 15 | 0.100 |
| Tissue A Basesheet (N) With Treated Basesheet (T) | 3-Ply | NTN | 61 | 27 | 12 | — | — | — | 0.102 |
| | 3-Ply | TNT | 35 | 51 | 14 | — | — | — | 0.107 |
| | 4-Ply | NTTN | 67 | 32 | 1 | 0 | — | — | 0.104 |
| | 4-Ply | TNNT | 25 | 37 | 37 | 1 | — | — | 0.104 |
| | 4-Ply | TNTN | 39 | 55 | 6 | 0 | — | — | 0.106 |
| | 4-Ply | NTNT | 36 | 22 | 37 | 5 | — | — | 0.094 |
| | 5-Ply | NNTNN | 47 | 48 | 5 | 0 | 0 | — | 0.100 |
| | 6-Ply | NNTTNN | 48 | 42 | 10 | 0 | 0 | 0 | 0.100 |
| | 6-Ply | NTNNTN | 30 | 10 | 29 | 30 | 1 | 0 | 0.097 |
| | 6-Ply | TNTTNT | 34 | 54 | 12 | 0 | 0 | 0 | 0.101 |
| Tissue B | 3-Ply | NNN | 34 | 35 | 31 | — | — | — | 0.108 |
| | 4-Ply | NNNN | 29 | 29 | 23 | 19 | — | — | 0.105 |
| | 6-Ply | NNNNNN | 25 | 19 | 16 | 14 | 14 | 12 | 0.094 |
| Tissue B Basesheet (N) With Treated Basesheet (T) | 3-Ply | NTN | 58 | 22 | 20 | — | — | — | 0.110 |
| | 4-Ply | NTTN | 78 | 20 | 2 | 0 | — | — | 0.105 |
| | 4-Ply | TNNT | 20 | 40 | 38 | 2 | — | — | 0.101 |
| | 6-Ply | NNTTNN | 45 | 48 | 7 | 0 | 0 | 0 | 0.113 |
| | 6-Ply | NTNNTN | 30 | 10 | 29 | 30 | 1 | 0 | 0.097 |
| Tissue C (2-Ply) | 3-Ply | NNN | 36 | 35 | 29 | — | — | — | 0.112 |
| | 4-Ply | NNNN | 24 | 23 | 27 | 25 | — | — | 0.111 |
| | 6-Ply | NNNNNN | 17 | 16 | 16 | 16 | 18 | 17 | 0.100 |
| Tissue D (2-Ply) | 3-Ply | NNN | 33 | 34 | 33 | — | — | — | 0.102 |
| | 4-Ply | NNNN | 29 | 27 | 25 | 19 | — | — | 0.105 |
| | 6-Ply | NNNNNN | 27 | 18 | 17 | 14 | 15 | 9 | 0.101 |
| Tissue E (3-Ply) | 3-Ply | NNN | 46 | 40 | 14 | — | — | — | 0.121 |
| | 4-Ply | NNNN | 42 | 31 | 16 | 11 | — | — | 0.113 |
| | 6-Ply | NNNNNN | 42 | 35 | 18 | 5 | 0 | 0 | 0.106 |
| Tissue F (2-Ply) | 3-Ply | NNN | 39 | 33 | 28 | — | — | — | 0.107 |
| | 4-Ply | NNNN | 42 | 34 | 19 | 5 | — | — | 0.107 |
| | 6-Ply | NNNNNN | 42 | 32 | 17 | 6 | 3 | 0 | 0.116 |
| Tissue G (2-Ply) | 3-Ply | NNN | 45 | 38 | 17 | — | — | — | 0.114 |
| | 4-Ply | NNNN | 34 | 21 | 27 | 18 | — | — | 0.104 |
| | 6-Ply | NNNNNN | 35 | 29 | 17 | 9 | 7 | 3 | 0.100 |
| Tissue H Extra Strength | 3-Ply | NNN | 55 | 29 | 16 | — | — | — | 0.106 |
| | 4-Ply | NNNN | 55 | 36 | 7 | 2 | — | — | 0.105 |
| | 6-Ply | NNNNNN | 51 | 32 | 15 | 2 | 0 | 0 | 0.094 |
| Tissue I (Lotion) | 3-Ply | NNN | 60 | 27 | 13 | — | — | — | 0.114 |
| | 4-Ply | NNNN | 59 | 27 | 14 | 0 | — | — | 0.114 |
| | 6-Ply | NNNNNN | 54 | 28 | 18 | 0 | 0 | 0 | 0.107 |

The results show that regardless of basis weight, the treated tissue products performed better or at least comparably to all of the products tested in terms of Hand-Side dryness. Given that moisture does not laterally migrate on an outer ply, the tissues of the invention thus provide a tissue product where both outer surfaces are relatively low in moisture content after insulted with propelled liquid, a highly desirable feature since tissue with these attributes will minimize penetration through the tissue as well as reduce "red nose" irritation resulting from contact with a wet tissue surface.

Figure 30:
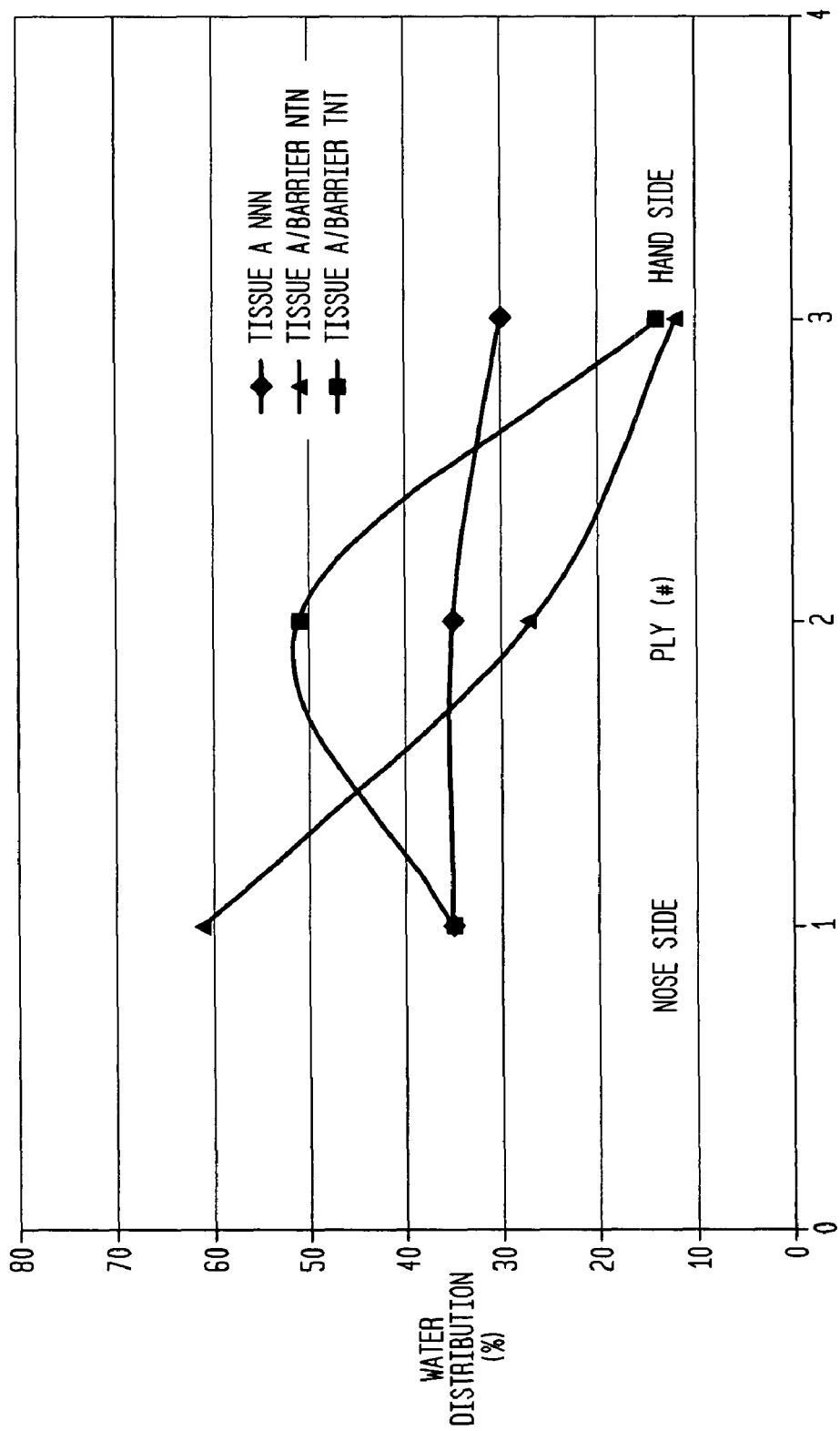
FIGS. 30-34 are sternutation test results.
Figure 31:
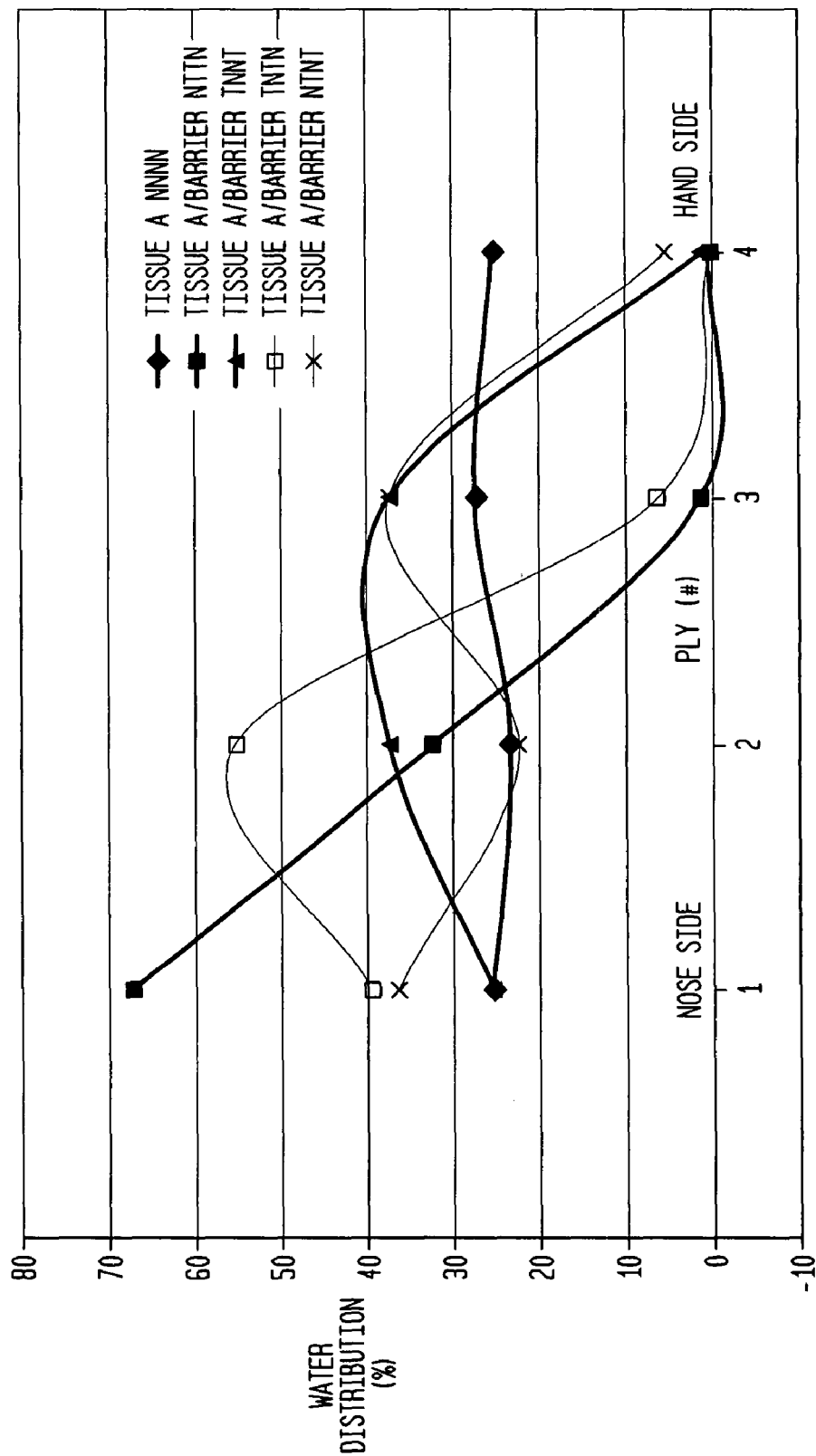
Figure 32:
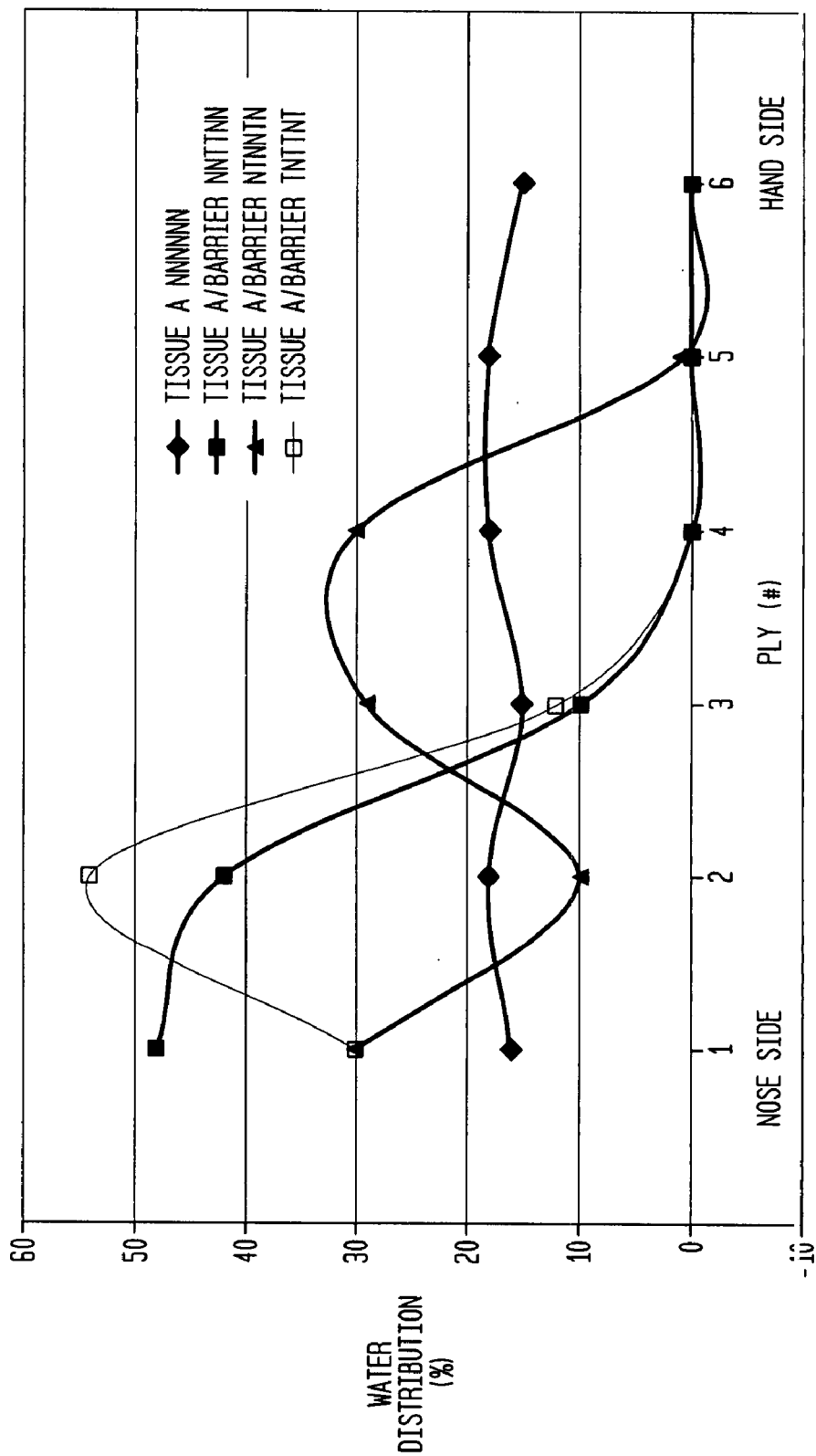
Figure 33:
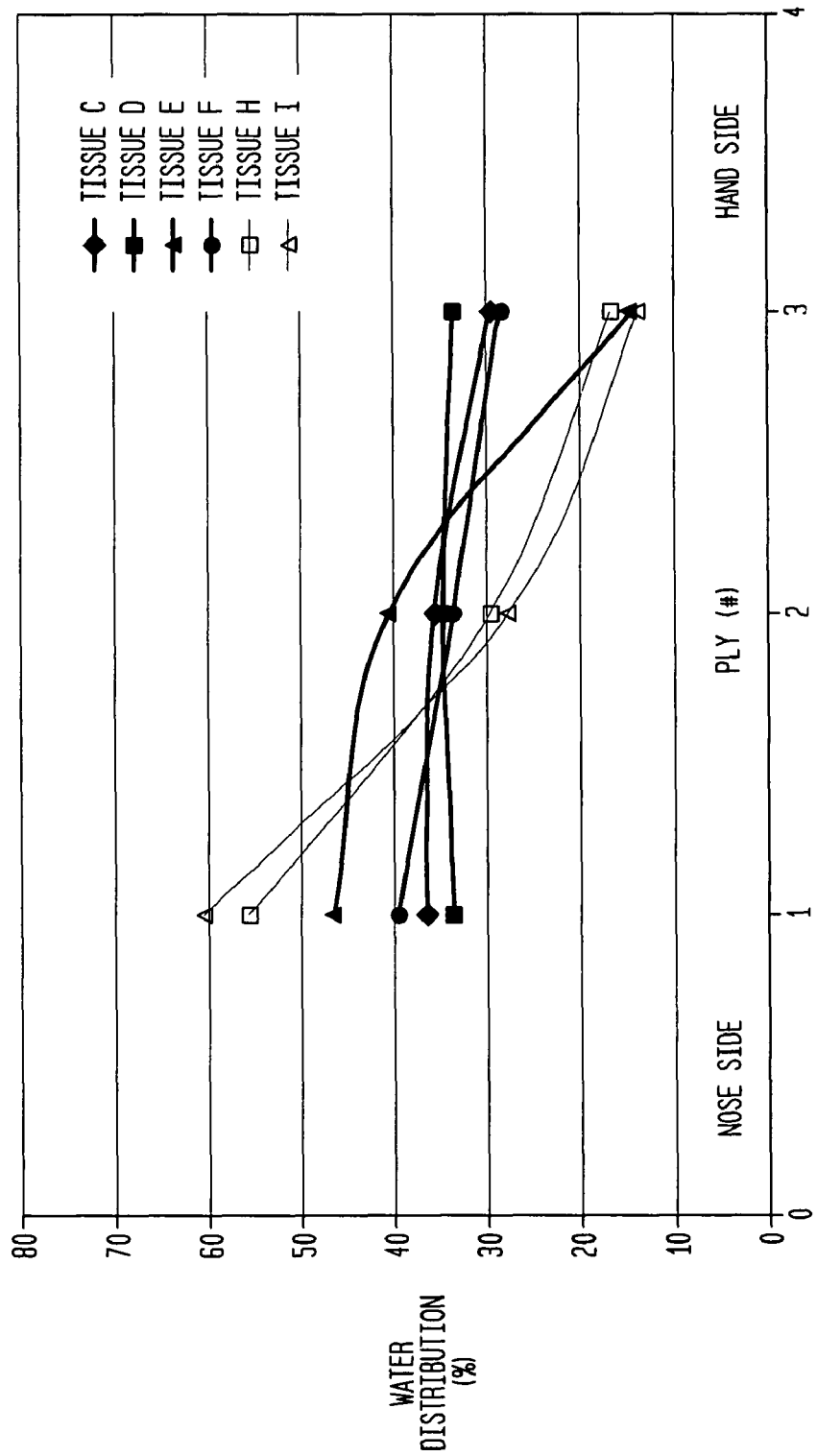
Figure 34:
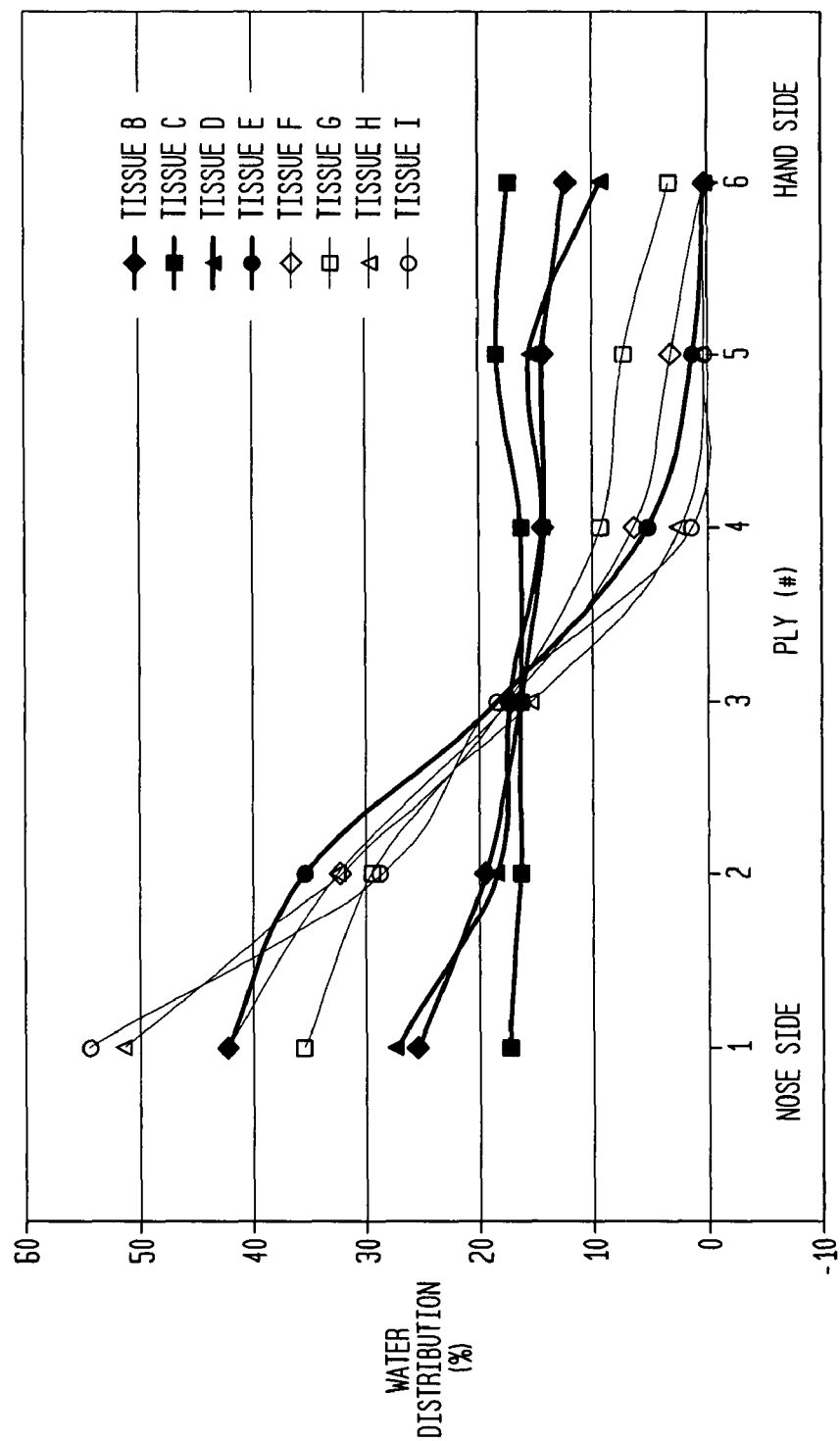

Quite remarkably, it is seen in FIGS. 30-32 that in the samples tested with internal untreated plies and outer treated plies, that liquid is preferentially sequestered between the outer surfaces of the tissue sample, notwithstanding the relatively high velocity of the insult. With conventional products, one ordinarily sees a relatively even distribution of liquid or a continuously decreasing concentration (nose-to-hand) as is seen for conventional products of relatively high basis weight in FIGS. 33 and 34.

The invention has been described in detail with reference to various embodiments; however, modifications to those embodiments within the spirit and scope of the invention will be readily apparent to those of skill in the art. The invention is defined in the appended claims and further described in the following Alternative Embodiments of the invention.

Alternative Embodiments

There is provided in a first alternative embodiment (Alternative Embodiment No. 1) an absorbent cellulosic web exhibiting resistance to moisture penetration comprising an absorbent web of cellulosic fibers provided with a fused wax composition in intimate contact with the fibers in the web, the fused wax composition including a wax and an emulsifier fused in situ with the web and being disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web.

Alternative Embodiment No. 2 is the absorbent web exhibiting resistance to moisture penetration according to the first alternative embodiment, wherein the laterally hydrophobic surface of the web exhibits a moisture penetration delay of from about 3 to about 40 seconds.

Alternative Embodiment No. 3 is the absorbent web exhibiting resistance to moisture penetration according to Alternative Embodiment No. 2, wherein the laterally hydrophobic surface of the web exhibits a moisture penetration delay of at least about 5 seconds.

Alternative Embodiment No. 4 is the absorbent web exhibiting resistance to moisture penetration according to Alternative Embodiment No. 3, wherein the laterally hydrophobic surface of the web exhibits a moisture penetration delay of at least about 10 seconds.

Alternative Embodiment No. 5 is the absorbent web exhibiting resistance to moisture penetration according to Alternative Embodiment No. 4, wherein the laterally hydrophobic surface of the web exhibits a moisture penetration delay of at least about 20 seconds.

Alternative Embodiment No. 6. is the absorbent web exhibiting resistance to moisture penetration according to Alternative Embodiment No. 1, wherein wax is present in an amount of from about 1 to about 20 weight percent based on the amount of wax and cellulosic fiber in the web.

Alternative Embodiment No. 7 is the absorbent sheet exhibiting resistance to moisture penetration according to Alternative Embodiment No. 6, wherein wax is present in an amount of from about 2 to about 10 weight percent based on the amount of wax and cellulosic fiber in the web.

Alternative Embodiment No. 8 is the absorbent web exhibiting resistance to moisture penetration according to Alternative Embodiment No. 7, wherein wax is present in an amount of from about 3 to about 5 weight percent based on the amount of wax and cellulosic fiber in the web.

Alternative Embodiment No. 9 is the absorbent web exhibiting resistance to moisture penetration according to Alternative Embodiment No. 1, wherein the web exhibits an air permeability of at least 25 percent of the air permeability of a like web untreated with the wax and emulsifier composition.

Alternative Embodiment No. 10 is the absorbent web exhibiting resistance to moisture penetration according to Alternative Embodiment No. 9, wherein the web exhibits an air permeability of at least 40 percent of the air permeability of a like web untreated with the wax and emulsifier composition.

Alternative Embodiment No. 11 is the absorbent web exhibiting resistance to moisture penetration according to Alternative Embodiment No. 10, wherein the web exhibits an air permeability of at least 60 percent of the air permeability of a like web untreated with the wax and emulsifier composition.

Alternative Embodiment No. 12 is the absorbent web exhibiting resistance to moisture penetration according to Alternative Embodiment No. 11, wherein the web exhibits an air permeability of at least 80 percent of the air permeability of a like web untreated with the wax and emulsifier composition.

Alternative Embodiment No. 13 is the absorbent web exhibiting resistance to moisture penetration according to Alternative Embodiment No. 12, wherein the web exhibits substantially the same air permeability as a like web of cellulosic filer untreated with the wax and emulsifier composition.

Alternative Embodiment No. 14 is the absorbent web exhibiting resistance to moisture penetration according to Alternative Embodiment No. 1, wherein the web exhibits an air permeability of from about 15 $ft^3/min\text{-}ft^2$ to about 45 $ft^3/min\text{-}ft^2$ at 0.5 inches of water.

Alternative Embodiment No. 15 is the absorbent web exhibiting resistance to moisture penetration according to Alternative Embodiment No. 14, wherein the web exhibits an air permeability of from 50 $ft^3/min\text{-}ft^2$ to about 150 $ft^3/min\text{-}ft^2$ at 0.5 inches of water.

Alternative Embodiment No. 16 is the absorbent web exhibiting resistance to moisture penetration according to Alternative Embodiment No. 1, wherein the web exhibits a wet tensile strength that is less than about 135 percent of the wet tensile strength of a like web untreated with the wax and emulsifier composition.

Alternative Embodiment No. 17 is the absorbent web exhibiting resistance to moisture penetration according to Alternative Embodiment No. 16, wherein the web exhibits a wet tensile strength that is less than about 125 percent of the wet tensile strength of a like web untreated with the wax and emulsifier composition.

Alternative Embodiment No. 18 is the absorbent web exhibiting resistance to moisture penetration according to Alternative Embodiment No. 17, wherein the web exhibits a wet tensile strength that is less than about 115 percent of the wet tensile strength of a like web untreated with the wax and emulsifier composition.

Alternative Embodiment No. 19 is the absorbent web exhibiting resistance to moisture penetration according to Alternative Embodiment No. 18 wherein the web exhibits a wet tensile strength that is less than about 110 percent of the wet tensile strength of a like web untreated with the wax and emulsifier composition.

Alternative Embodiment No. 20 is the absorbent web exhibiting resistance to moisture penetration according to Alternative Embodiment No. 19, wherein the web exhibits substantially the same wet tensile strength as a like web of cellulosic fiber untreated with the wax and emulsifier composition.

Alternative Embodiment No. 21 is the absorbent web exhibiting resistance to moisture penetration according to Alternative Embodiment No. 1, wherein the web exhibits substantially the same dry tensile strength as a like web of cellulosic fiber untreated with the wax and emulsifier composition.

Alternative Embodiment No. 22 is the absorbent cellulosic web exhibiting resistance to moisture penetration according to Alternative Embodiment No. 1, wherein the web exhibits an absorbency of at least 60 percent of that of a like web untreated with the wax and emulsifier composition.

Alternative Embodiment No. 23 is the absorbent cellulosic web exhibiting resistance to moisture penetration according to Alternative Embodiment No. 22, wherein the web exhibits an absorbency of at least 75 percent of that of a like web untreated with the wax and emulsifier composition.

Alternative Embodiment No. 24 is the absorbent cellulosic web exhibiting resistance to moisture penetration according to Alternative Embodiment No 23, wherein the web exhibits an absorbency of at least 90 percent of that of a like web untreated with the wax and emulsifier composition.

Alternative Embodiment No. 25 is the absorbent web exhibiting resistance to moisture penetration according to Alternative Embodiment No. 24, wherein the web exhibits substantially the same absorbency as a like web of cellulosic fiber untreated with the wax and emulsifier composition.

Alternative Embodiment No. 26 is the absorbent web exhibiting resistance to moisture penetration according to Alternative Embodiment No. 1, wherein the web exhibits an absorbency of at least 3 g/g.

Alternative Embodiment No. 27 is the absorbent web exhibiting resistance to moisture penetration according to Alternative Embodiment No. 26, wherein the web exhibits an absorbency of at least 6 g/g.

Alternative Embodiment No. 28 is the absorbent web exhibiting resistance to moisture penetration according to Alternative Embodiment No. 27, wherein the web exhibits an absorbency of at least 8 g/g.

Alternative Embodiment No. 29 is the absorbent web exhibiting resistance to moisture penetration according to Alternative Embodiment No. 1, wherein the hydrophobic surface of the web exhibits contact angle with water of at least about 70 degrees at one minute of contact time with the web.

Alternative Embodiment No. 30 is the absorbent web exhibiting resistance to moisture penetration according to Alternative Embodiment No. 1, wherein the hydrophobic surface of the web exhibits contact angle with water of at least about 85 degrees at one minute of contact time with the web.

Alternative Embodiment No. 31 is the absorbent web exhibiting resistance to moisture penetration according to Alternative Embodiment No. 1, wherein the web is repulpable.

Alternative Embodiment No. 32 is the absorbent web exhibiting resistance to moisture penetration according to Alternative Embodiment No. 1, wherein the web is dispersible.

Alternative Embodiment No. 33 is the absorbent web exhibiting resistance to moisture penetration according to Alternative Embodiment No. 1, wherein the web is flushable.

Alternative Embodiment No. 34 is the absorbent web exhibiting resistance to moisture penetration according to Alternative Embodiment No. 1, wherein the wax comprises a wax selected from the group consisting of microcrystalline waxes, carnauba waxes, polyolefin waxes such as polyethylene waxes, polypropylene waxes and polybutene waxes, polyurethane waxes, montan waxes, paraffin waxes, Fascher-Tropsch waxes and mixtures thereof.

Alternative Embodiment No. 35 is the absorbent web exhibiting resistance to moisture penetration according to Alternative Embodiment No. 34, wherein the wax is a microcrystalline wax.

Alternative Embodiment No. 36 is the absorbent web exhibiting resistance to moisture penetration according to Alternative Embodiment No. 35, wherein the wax dispersion includes an emulsifier selected from the group consisting of anionic emulsifiers and non-ionic emulsifiers.

Alternative Embodiment No. 37 is the absorbent web exhibiting resistance to moisture penetration according to Alternative Embodiment No. 36, wherein the wax is a carnauba wax.

Alternative Embodiment No. 38 is the absorbent web exhibiting resistance to moisture penetration according to Alternative Embodiment No. 37, wherein the dispersion comprises a non-ionic emulsifier.

Alternative Embodiment No. 39 is the absorbent web exhibiting resistance to moisture penetration according to Alternative Embodiment No. 1, wherein the wax has a molecular weight in the range of from about 500 to about 3000.

Alternative Embodiment No. 40 is the absorbent web exhibiting resistance to moisture penetration according to Alternative Embodiment No. 1, wherein the melting temperature of the wax is less than about 140° C.

Alternative Embodiment No. 41 is the absorbent web exhibiting resistance to moisture penetration according to Alternative Embodiment No. 40, wherein the melting temperature of the wax is less than about 120° C.

Alternative Embodiment No. 42 is the absorbent sheet exhibiting resistance to moisture penetration according to Alternative Embodiment No. 41, wherein the melting temperature of the wax is less than about 105° C.

Alternative Embodiment No. 43 is the absorbent sheet exhibiting resistance to moisture penetration according to Alternative Embodiment No. 42, wherein the melting temperature of the wax is from about 50° to about 105° C.

Alternative Embodiment No. 44 is the absorbent sheet exhibiting resistance to moisture penetration according to Alternative Embodiment No. 43, wherein the melting temperature of the wax is from about 75° to about 105° C.

Alternative Embodiment No. 45 is the absorbent web exhibiting resistance to moisture penetration according to Alternative Embodiment No. 1, wherein the cellulosic web is a creped cellulosic web.

Alternative Embodiment No. 46 is the absorbent web exhibiting resistance to moisture penetration according to Alternative Embodiment No. 45, wherein the cellulosic web has a biaxially undulatory structure.

Alternative Embodiment No. 47 is the absorbent web exhibiting resistance to moisture penetration according to Alternative Embodiment No. 1, further comprising a grease repellant agent.

Alternative Embodiment No. 48 is the absorbent web exhibiting resistance to moisture penetration according to Alternative Embodiment No. 1, further comprising an emollient.

Alternative Embodiment No. 49 is the absorbent web exhibiting resistance to moisture penetration according to Alternative Embodiment No. 1, further comprising a binder.

Alternative Embodiment No. 50 is the absorbent web exhibiting resistance to moisture penetration according to Alternative Embodiment No. 1, further comprising a cross-linking agent.

Alternative Embodiment No. 51 is an absorbent cellulosic web exhibiting resistance to moisture penetration comprising an absorbent web of cellulosic fibers provided with a fused wax composition in intimate contact with the fibers in the web generally assimilating the morphology of the fiber surfaces, the fused wax composition including a wax and an emulsifier and being disposed in the web so that the open interstitial microstructure between fibers in the web is substantially preserved and wherein the web exhibits an absorbency of at least 3 g/g.

Alternative Embodiment No. 52 is the absorbent web exhibiting resistance to moisture penetration according to Alternative Embodiment No. 51, wherein the web exhibits an absorbency of at least 6 g/g.

Alternative Embodiment No. 53 is the absorbent web exhibiting resistance to moisture penetration according to Alternative Embodiment No. 52, wherein the web exhibits an absorbency of at least 8 g/g.

Alternative Embodiment No. 54 is the absorbent web exhibiting resistance to moisture penetration according to Alternative Embodiment No. 51, wherein the web exhibits an air permeability of from about 15 $ft^3$/min-$ft^2$ to about 45 $ft^3$/min-$ft^2$ at 0.5 inches of water.

Alternative Embodiment No. 55 is the absorbent web exhibiting resistance to moisture penetration according to Alternative Embodiment No. 51, wherein the web exhibits an air permeability of from about 50 $ft^3$/min-$ft^2$ to about 150 $ft^3$/min-$ft^2$ at 0.5 inches of water.

Alternative Embodiment No. 56 is a sided absorbent cellulosic web exhibiting resistance to moisture penetration having a first and second surface comprising an absorbent web of cellulosic fibers provided with a fused wax composition in intimate contact with the fibers in the web generally assimilating the morphology of the fiber surfaces, the fused wax composition including a wax and an emulsifier and being disposed in the web so that the open interstitial microstructure between fibers in the web is substantially preserved and such that the fused wax is concentrated at the first surface of the web and decreases in concentration in a direction toward the second surface whereby the web has a laterally hydrophobic surface exhibiting a moisture penetration delay of at least about 3 seconds.

Alternative Embodiment No. 57 is the sided absorbent web according to Alternative Embodiment No. 56, wherein the web has a laterally hydrophilic surface exhibiting a moisture penetration delay of less than 2 seconds.

Alternative Embodiment No. 58 is the sided absorbent sheet exhibiting resistance to moisture penetration according to Alternative Embodiment No. 57, wherein the wax treated laterally hydrophobic first surface exhibits a moisture penetration delay of from about 3 to about 40 seconds.

Alternative Embodiment No. 59 is the sided absorbent web exhibiting resistance to moisture penetration according to Alternative Embodiment No. 58, wherein the laterally hydrophobic first surface exhibits a moisture penetration delay of at least about 5 seconds.

Alternative Embodiment No. 60 is the sided absorbent web exhibiting resistance to moisture penetration according to Alternative Embodiment No. 59, wherein the laterally hydrophobic first surface exhibits a moisture penetration delay of at least about 10 seconds.

Alternative Embodiment No. 61 is the sided absorbent sheet exhibiting resistance to moisture penetration according to Alternative Embodiment No. 60, wherein the laterally hydrophobic first surface exhibits a moisture penetration delay of at least about 20 seconds.

Alternative Embodiment No. 62 is the sided absorbent web exhibiting resistance to moisture penetration according to Alternative Embodiment No. 56, wherein the web exhibits an air permeability of at least 40 percent of the air permeability of a like web untreated with the wax and emulsifier composition.

Alternative Embodiment No. 63 is the sided absorbent exhibiting resistance to moisture penetration according to Alternative Embodiment No. 62, wherein the web exhibits an air permeability of at least 60 percent of the air permeability of a like web untreated with the wax and emulsifier composition.

Alternative Embodiment No. 64 is the sided absorbent exhibiting resistance to moisture penetration according to Alternative Embodiment No. 63, wherein the web exhibits an air permeability of at least 80 percent of the air permeability of a like web untreated with the wax and emulsifier composition.

Alternative Embodiment No. 65 is the sided absorbent web exhibiting resistance to moisture penetration according to Alternative Embodiment No. 64, wherein the web exhibits substantially the same air permeability as a like web of cellulosic fiber untreated with the wax and emulsifier composition.

Alternative Embodiment No. 66 is the sided absorbent web exhibiting resistance to moisture penetration according to Alternative Embodiment No. 56, wherein the web exhibits an air permeability of from about 15 $ft^3$/min-$ft^2$ to about 45 $ft^3$/min-$ft^2$ at 0.5 inches of water.

Alternative Embodiment No. 67 is the sided absorbent web exhibiting resistance to moisture penetration according to Alternative Embodiment No. 56, wherein the web exhibits an air permeability of from about 50 $ft^3$/min-$ft^2$ to about 150 $ft^3$/min-$ft^2$ at 0.5 inches of water.

Alternative Embodiment No. 68 is the sided absorbent web exhibiting resistance to moisture penetration according to Alternative Embodiment No. 56, wherein the web exhibits a wet tensile strength that is less than about 135 percent of the wet tensile strength of a like web untreated with the wax and emulsifier composition.

Alternative Embodiment No. 69 is the sided absorbent web exhibiting resistance to moisture penetration according to Alternative Embodiment No. 68, wherein the web exhibits a wet tensile strength that is less than about 125 percent of the wet tensile strength of a like web untreated with the wax and emulsifier composition.

Alternative Embodiment No. 70 is the sided absorbent web exhibiting resistance to moisture penetration according to Alternative Embodiment No. 69, wherein the web exhibits a wet tensile strength that is less than about 115 percent of the wet tensile strength of a like web untreated with the wax and emulsifier composition.

Alternative Embodiment No. 71 is the sided absorbent web exhibiting resistance to moisture penetration according to Alternative Embodiment No. 70, wherein the web exhibits a wet tensile strength that is less than about 110 percent of the wet tensile strength of a like web untreated with the wax and emulsifier composition.

Alternative Embodiment No. 72 is the sided absorbent web exhibiting resistance to moisture penetration according to Alternative Embodiment No. 71, wherein the web exhibits substantially the same wet tensile strength as a like web of cellulosic fiber untreated with the wax and emulsifier composition.

Alternative Embodiment No. 73 is the sided absorbent web exhibiting resistance to moisture penetration according to Alternative Embodiment No. 56, wherein the web exhibits substantially the same dry tensile strength as a like web of cellulosic fiber untreated with the wax and emulsifier composition.

Alternative Embodiment No. 74 is the sided absorbent cellulosic web exhibiting resistance to moisture penetration according to Alternative Embodiment No. 56, wherein the web exhibits an absorbency of at least 60 percent of that of a like web untreated with the wax and emulsifier composition.

Alternative Embodiment No. 75 is the sided absorbent cellulosic web exhibiting resistance to moisture penetration according to Alternative Embodiment No. 74, wherein the web exhibits an absorbency of at least 75 percent of that of a like web untreated with the wax and emulsifier composition.

Alternative Embodiment No. 76 is the sided absorbent cellulosic web exhibiting resistance to moisture penetration according to Alternative Embodiment No. 75, wherein the web exhibits an absorbency of at least 90 percent of that of a like web untreated with the wax and emulsifier composition.

Alternative Embodiment No. 77 is the sided absorbent web exhibiting resistance to moisture penetration according to Alternative Embodiment No. 76, wherein the web exhibits substantially the same absorbency as a like web of cellulosic fiber untreated with the wax and emulsifier composition.

Alternative Embodiment No. 78 is the sided absorbent web exhibiting resistance to moisture penetration according to Alternative Embodiment No. 56, wherein the web exhibits an absorbency of at least 3 g/g.

Alternative Embodiment No. 79 is the sided absorbent web exhibiting resistance to moisture penetration according to Alternative Embodiment No. 78, wherein the web exhibits an absorbency of at least 6 g/g.

Alternative Embodiment No. 80 is the sided absorbent web exhibiting resistance to moisture penetration according to Alternative Embodiment No. 79, wherein the web exhibits an absorbency of at least 8 g/g.

Alternative Embodiment No. 81 is the absorbent web exhibiting resistance to moisture penetration according to Alternative Embodiment No. 56, wherein the hydrophobic surface of the web exhibits contact angle with water of at least about 50 degrees at one minute of contact time with the web.

Alternative Embodiment No. 82 is an absorbent cellulosic web exhibiting resistance to moisture penetration comprising an absorbent web of cellulosic fiber and the fused residue of an aqueous wax dispersion applied to one side thereof, wherein the sheet has a laterally hydrophobic surface and a relatively hydrophilic surface such that the contact angle of the laterally hydrophobic surface with water is at least about 5 degrees greater than the contact angle of the relatively hydrophilic surface with water.

Alternative Embodiment No. 83 is the absorbent cellulosic web exhibiting resistance to moisture penetration according to Alternative Embodiment No. 82, wherein the contact angle of the laterally hydrophobic surface with water is at least about 10 degrees greater than the contact angle of the relatively hydrophilic surface with water.

Alternative Embodiment No. 84 is the absorbent cellulosic web exhibiting resistance to moisture penetration according to Alternative Embodiment No. 33, wherein the contact angle of the laterally hydrophobic surface with water is at least about 20 degrees greater than the contact angle of the relatively hydrophilic surface with water.

Alternative Embodiment No. 85 is the absorbent cellulosic web exhibiting resistance to moisture penetration according to Alternative Embodiment No. 84, wherein the contact angle of the laterally hydrophobic surface with water is at least about 40 degrees greater than the contact angle of the relatively hydrophilic surface with water.

Alternative Embodiment No. 86 is the sided absorbent cellulosic web exhibiting resistance to moisture penetration according to Alternative Embodiment No. 85, wherein the contact angle of the laterally hydrophobic surface with water is at least about 80 degrees greater than the contact angle of the relatively hydrophilic surface with water.

Alternative Embodiment No. 87 is the sided absorbent cellulosic web exhibiting resistance to moisture penetration according to Alternative Embodiment No. 82, incorporated into a multi-ply absorbent product.

Alternative Embodiment No. 88 is the sided absorbent cellulosic web exhibiting resistance to moisture penetration according to Alternative Embodiment No. 82, having a single-ply monolithic web structure.

Alternative Embodiment No. 89 is the sided absorbent cellulosic web exhibiting resistance to moisture penetration according to Alternative Embodiment No. 82, wherein the hydrophobic surface exhibits a moisture penetration delay of from about 3 to about 40 seconds.

Alternative Embodiment No. 90 is the sided absorbent cellulosic web exhibiting resistance to moisture penetration according to Alternative Embodiment No. 89, wherein the hydrophilic surface exhibits a moisture penetration delay of less than 2 seconds.

Alternative Embodiment No. 91 is the sided absorbent cellulosic web exhibiting resistance to moisture penetration according to Alternative Embodiment No. 90, wherein the hydrophobic surface exhibits a moisture penetration delay of at least about 5 seconds.

Alternative Embodiment No. 92 is the sided absorbent cellulosic web exhibiting resistance to moisture penetration according to Alternative Embodiment No. 91, wherein the hydrophobic surface exhibits a moisture penetration delay of at least about 10 seconds.

Alternative Embodiment No. 93 is the sided absorbent cellulosic web exhibiting resistance to moisture penetration according to Alternative Embodiment No. 92, wherein the hydrophobic surface exhibits a moisture penetration delay of at least about 20 seconds.

Alternative Embodiment No. 94 is the sided absorbent cellulosic web exhibiting resistance to moisture penetration according to Alternative Embodiment No. 82, wherein moisture applied to the hydrophobic surface does not migrate substantially in a lateral direction on the hydrophobic surface of the sheet.

Alternative Embodiment No. 95 is the sided absorbent cellulosic web exhibiting resistance to moisture penetration according to Alternative Embodiment No. 94, wherein moisture applied to the hydrophobic surface of the sheet migrates laterally in the sheet as it penetrates the sheet.

Alternative Embodiment No. 96 is the sided absorbent cellulosic web exhibiting resistance to moisture penetration according to Alternative Embodiment No. 95, wherein moisture applied to the hydrophobic surface of the sheet migrates laterally progressively increasing distances with increasing penetration into the sheet.

Alternative Embodiment No. 97 is the sided absorbent cellulosic web exhibiting resistance to moisture penetration according to Alternative Embodiment No. 82, wherein the fused wax residue is localized at the hydrophobic surface of the sheet.

Alternative Embodiment No. 98 is the sided absorbent cellulosic web exhibiting resistance to moisture penetration according to Alternative Embodiment No. 82, wherein the amount of fused wax residue in the sheet decreases in a direction inwardly into the sheet from the laterally hydrophobic surface.

Alternative Embodiment No. 99 is the sided absorbent cellulosic web exhibiting resistance to moisture penetration according to Alternative Embodiment No. 82, wherein the amount of emulsifier residue increases in a direction inwardly into the sheet from the laterally hydrophobic surface.

Alternative Embodiment No. 100 is the sided absorbent cellulosic web exhibiting resistance to moisture penetration according to Alternative Embodiment No. 82, further comprising indicia identifying the hydrophobic surface of the sheet.

Alternative Embodiment No. 101 is the sided absorbent cellulosic web exhibiting resistance to moisture penetration according to Alternative Embodiment No. 82, further comprising indicia identifying the hydrophilic surface of the sheet.

Alternative Embodiment No. 102 is the sided absorbent cellulosic web exhibiting resistance to moisture penetration according to Alternative Embodiment No. 82, having a basis weight of from about 7 lbs per 3000 square foot ream to about 35 lbs per 3000 square foot ream.

Alternative Embodiment No. 103 is the sided absorbent cellulosic web exhibiting resistance to moisture penetration according to Alternative Embodiment No. 82, prepared from a creped cellulosic web.

Alternative Embodiment No. 104 is the sided absorbent cellulosic web exhibiting resistance to moisture penetration according to Alternative Embodiment No. 103, prepared from a creped cellulosic web having a biaxially undulatory structure.

Alternative Embodiment No. 105 is the absorbent web exhibiting resistance to moisture penetration according to Alternative Embodiment No. 82, wherein the web exhibits an air permeability of at least 25 percent of the air permeability of a like web untreated with the aqueous wax dispersion.

Alternative Embodiment No. 106 is the absorbent web exhibiting resistance to moisture penetration according to Alternative Embodiment No. 105, wherein the web exhibits an air permeability of at least 40 percent of the air permeability of a like web untreated with aqueous wax dispersion.

Alternative Embodiment No. 107 is the absorbent web exhibiting resistance to moisture penetration according to Alternative Embodiment No. 106, wherein the web exhibits an air permeability of at least 60 percent of the air permeability of a like web untreated with the aqueous wax dispersion.

Alternative Embodiment No. 108 is the absorbent web exhibiting resistance to moisture penetration according to Alternative Embodiment No. 107, wherein the web exhibits an air permeability of at least 80 percent of the air permeability of a like web untreated with the aqueous wax dispersion.

Alternative Embodiment No. 109 is the absorbent web exhibiting resistance to moisture penetration according to Alternative Embodiment No. 108, wherein the web exhibits substantially the same air permeability as a like web of cellulosic fiber untreated with the aqueous wax dispersion.

Alternative Embodiment No. 110 is the absorbent web exhibiting resistance to moisture penetration according to Alternative Embodiment No. 82, wherein the web exhibits an air permeability of from about 15 $ft^3$/min-$ft^2$ to about 45 $ft^3$/min-$ft^2$ at 0.5 inches of water.

Alternative Embodiment No. 111 is the absorbent web exhibiting resistance to moisture penetration according to Alternative Embodiment No. 82, wherein the web exhibits an air permeability of from about 50 $ft^3$/min-$ft^2$ to about 150 $ft^3$/min-$ft^2$ at 0.5 inches of water.

Alternative Embodiment No. 112 is the absorbent web exhibiting resistance to moisture penetration according to Alternative Embodiment No. 82, wherein the web exhibits a wet tensile strength that is less than about 135 percent of the wet tensile strength of a like web untreated with the aqueous wax dispersion.

Alternative Embodiment No. 113 is the absorbent web exhibiting resistance to moisture penetration according to Alternative Embodiment No. 112, wherein the web exhibits a wet tensile strength that is less than about 125 percent of the wet tensile strength of a like web untreated with the aqueous wax dispersion.

Alternative Embodiment No. 114 is the absorbent web exhibiting resistance to moisture penetration according to Alternative Embodiment No. 113, wherein the web exhibits a wet tensile strength that is less than about 115 percent of the wet tensile strength of a like web untreated with the aqueous wax dispersion.

Alternative Embodiment No. 115 is the absorbent web exhibiting resistance to moisture penetration according to Alternative Embodiment No. 114, wherein the web exhibits a wet tensile strength that is less than about 110 percent of the wet tensile strength of a like web untreated with the aqueous wax dispersion.

Alternative Embodiment No. 116 is the absorbent web exhibiting resistance to moisture penetration according to Alternative Embodiment No. 115, wherein the web exhibits substantially the same wet tensile strength as a like web of cellulosic fiber untreated with the aqueous wax dispersion position.

Alternative Embodiment No. 117 is the absorbent web exhibiting resistance to moisture penetration according to Alternative Embodiment No. 82, wherein the web exhibits substantially the same dry tensile strength as a like web of cellulosic fiber untreated with the aqueous wax dispersion.

Alternative Embodiment No. 118 is the absorbent cellulosic web exhibiting resistance to moisture penetration according to Alternative Embodiment No. 82, wherein the web exhibits an absorbency of at least 60 percent of that of a like web untreated with the aqueous wax dispersion.

Alternative Embodiment No. 119 is the absorbent cellulosic web exhibiting resistance to moisture penetration according to Alternative Embodiment No. 118, wherein the web exhibits an absorbency of at least 75 percent of that of a like web untreated with the aqueous wax dispersion.

Alternative Embodiment No. 120 is the absorbent cellulosic web exhibiting resistance to moisture penetration according to Alternative Embodiment No. 119, wherein the web exhibits an absorbency of at least 90 percent of that of a like web untreated with the aqueous wax dispersion position.

Alternative Embodiment No. 121 is the absorbent web exhibiting resistance to moisture penetration according to Alternative Embodiment No. 120, wherein the web to moisture penetration exhibits substantially the same absorbency as a like web of cellulosic fiber untreated with the aqueous wax dispersion.

Alternative Embodiment No. 122 is the absorbent web exhibiting resistance to moisture penetration according to Alternative Embodiment No. 82, wherein the web exhibits an absorbency of at least 3 g/g.

Alternative Embodiment No. 123 is the absorbent web exhibiting resistance to moisture penetration according to Alternative Embodiment No. 122, wherein the web exhibits an absorbency of at least 6 g/g.

Alternative Embodiment No. 124 is the absorbent web exhibiting resistance to moisture penetration according to Alternative Embodiment No. 123, wherein the web exhibits an absorbency of at least 8 g/g.

Alternative Embodiment No. 125 is an absorbent wax-treated cellulosic web comprising: an absorbent web of cellulosic fiber having a hydrophobic side and a hydrophilic side; wherein the hydrophobic side comprises at least one surfactant and at least one wax; wherein at least one wax is substantially fused to the fibers; wherein the hydrophobic side allows water applied to the hydrophobic side to eventually diffuse into the hydrophilic side; and wherein water applied to the hydrophobic side diffuses into the hydrophilic side and laterally diffuses in the hydrophilic side, prior to substantial lateral diffusion of the water on the hydrophobic side.

Alternative Embodiment No. 126 is the absorbent wax-treated web exhibiting resistance to moisture penetration according to Alternative Embodiment No. 125, wherein the web exhibits an air permeability of at least 25 percent of the air permeability of a like web untreated with the wax and emulsifier composition.

Alternative Embodiment No. 127 is the absorbent wax-treated web exhibiting resistance to moisture penetration according to Alternative Embodiment No. 126, wherein the web exhibits an air permeability of at least 40 percent of the air permeability of a like web untreated with the wax and emulsifier composition.

Alternative Embodiment No. 128 is the absorbent wax-treated web exhibiting resistance to moisture penetration according to Alternative Embodiment No. 127, wherein the web exhibits an air permeability of at least 60 percent of the air permeability of a like web untreated with the wax and emulsifier composition.

Alternative Embodiment No. 129 is the absorbent wax-treated web exhibiting resistance to moisture penetration according to Alternative Embodiment No. 128, wherein the web exhibits an air permeability of at least 80 percent of the air permeability of a like web untreated with the wax and emulsifier composition.

Alternative Embodiment No. 130 is the absorbent wax-treated web exhibiting resistance to moisture penetration according to Alternative Embodiment No. 129, wherein the web exhibits substantially the same air permeability as a like web of cellulosic fiber untreated with the wax and emulsifier composition.

Alternative Embodiment No. 131 is the absorbent wax-treated web exhibiting resistance to moisture penetration according to Alternative Embodiment No. 125, wherein the web exhibits an air permeability of from about 15 ft$^3$/min-ft$^2$ to about 45 ft$^3$/min-ft$^2$ at 0.5 inches of water.

Alternative Embodiment No. 132 is the absorbent wax-treated web exhibiting resistance to moisture penetration according to Alternative Embodiment No. 125, wherein the web exhibits an air permeability of from about 50 ft$^3$/min-ft$^2$ to about 150 ft$^3$/min-ft$^2$ at 0.5 inches of water.

Alternative Embodiment No. 133 is the absorbent wax-treated web exhibiting resistance to moisture penetration according to Alternative Embodiment No. 125, wherein the web to moisture penetration exhibits substantially the same absorbency as a like web of cellulosic fiber untreated with the wax and emulsifier composition.

Alternative Embodiment No. 134 is the absorbent wax-treated web exhibiting resistance to moisture penetration according to Alternative Embodiment No. 125, wherein the web exhibits an absorbency of at least 3 g/g.

Alternative Embodiment No. 135 is the absorbent wax-treated web exhibiting resistance to moisture penetration according to Alternative Embodiment No. 134, wherein the web exhibits an absorbency of at least 6 g/g.

Alternative Embodiment No. 136 is the absorbent wax-treated web exhibiting resistance to moisture penetration according to Alternative Embodiment No. 135, wherein the web exhibits an absorbency of at least 8 g/g.

Alternative Embodiment No. 137 is a wax-treated absorbent cellulosic web, comprising: at least one absorbent web of cellulosic fiber having a hydrophobic side and a hydrophilic side; wherein the hydrophobic side comprises at least one nonionic surfactant and at least one microcrystalline wax; wherein at least one wax has a melting point of about 85° C.; wherein at least one wax is substantially fused to the fibers; wherein the hydrophobic side allows water applied to the hydrophobic side to eventually diffuse into the hydrophilic side; wherein water applied to the hydrophilic side is delayed from diffusing to the hydrophobic side; wherein the delay is at least about two seconds; and wherein water applied to the hydrophobic side diffuses into the hydrophilic side and laterally diffuses in the hydrophilic side, prior to lateral diffusion of the water on the hydrophobic side.

Alternative Embodiment No. 138 is aft absorbent cellulosic web exhibiting resistance to moisture penetration comprising an absorbent web of cellulosic fibers provided with a wax composition in intimate contact with the fibers in the web generally assimilating the morphology of the fiber surfaces, the wax composition having no independent macrostructure and being disposed in the web so that the open interstitial microstructure between fibers in the web is substantially preserved and wherein the web exhibits an absorbency of at least 3 g/g.

Alternative Embodiment No. 139 is the absorbent web exhibiting resistance to moisture penetration according to Alternative Embodiment No. 138, wherein the web exhibits an absorbency of at least 6 g/g.

Alternative Embodiment No. 140 is the absorbent web exhibiting resistance to moisture penetration according to Alternative Embodiment No. 138, wherein the web exhibits an absorbency of at least 8 g/g.

Alternative Embodiment No. 141 is the absorbent web exhibiting resistance to moisture penetration according to Alternative Embodiment No. 138, wherein the web exhibits an air permeability of at least 25 percent of the air permeability of a like web untreated with the aqueous wax dispersion.

Alternative Embodiment No. 142 is the absorbent web exhibiting resistance to moisture penetration according to Alternative Embodiment No. 138, wherein the web exhibits an air permeability of at least 40 percent of the air permeability of a like web untreated with aqueous wax dispersion.

Alternative Embodiment No. 143 is the absorbent web exhibiting resistance to moisture penetration according to Alternative Embodiment No. 138, wherein the web exhibits an air permeability of at least 60 percent of the air permeability of a like web untreated with the aqueous wax dispersion.

Alternative Embodiment No. 144 is the absorbent web exhibiting resistance to moisture penetration according to Alternative Embodiment No. 138, wherein the web exhibits an air permeability of at least 80 percent of the air permeability of a like web untreated with the aqueous wax dispersion.

Alternative Embodiment No. 145 is the absorbent web exhibiting resistance to moisture penetration according to Alternative Embodiment No. 138, wherein the web exhibits substantially the same air permeability as a like web of cellulosic fiber untreated with the aqueous wax dispersion.

Alternative Embodiment No. 146 is a method of making an absorbent cellulosic web comprising: depositing a cellulosic papermaking furnish on a foraminous support; dewatering the papermaking furnish to produce a web comprising cellulosic fibers; rendering at least one surface of the web laterally hydrophobic by applying a fused wax dispersion thereto, the process of applying the fused wax dispersion including: wetting at least one surface of the web with an aqueous dispersion including a wax and an emulsifier; and heating the web above the melting point of the wax to fuse the wax of the dispersion and to provide a hydrophobic surface on the web, the surface being more hydrophobic than the web of cellulosic fibers.

Alternative Embodiment No. 147 is the method according to Alternative Embodiment No. 146, wherein the heat tolerance limit of the web is not exceeded while fusing the wax.

Alternative Embodiment No. 148 is the method according to Alternative Embodiment No. 147, wherein the wax dispersion is applied to the web in an amount of from about 1 to about 20 weight percent on a dry basis.

Alternative Embodiment No. 149 is the method according to Alternative Embodiment No. 148, wherein the wax dispersion is applied to the web in an amount of from about 2 to about 10 weight percent on a dry basis.

Alternative Embodiment No. 150 is the method according to Alternative Embodiment No. 149, wherein the wax dispersion is applied to the web in an amount of from about 3 to about 5 weight percent on a dry basis.

Alternative Embodiment No. 151 is the method according to Alternative Embodiment No. 146, wherein the wax dispersion is wetted onto the web by way of spraying it onto the web.

Alternative Embodiment No. 152 is the method according to Alternative Embodiment No. 146, wherein the wax dispersion is wetted onto the web by way of printing it onto the web.

Alternative Embodiment No. 153 is the method according to Alternative Embodiment No. 152, wherein the wax dispersion is wetted onto the web by way of gravure printing.

Alternative Embodiment No. 154 is the method according to Alternative Embodiment No. 152, wherein the wax dispersion is wetted onto the web by way of printing it onto the web with a smooth printing roll.

Alternative Embodiment No. 155 is the method according to Alternative Embodiment No. 154, wherein the wax dispersion is wetted onto the web by way of offset printing with a smooth rubber application roll.

Alternative Embodiment No. 156 is the method according to Alternative Embodiment No. 146, wherein the step of heating the web above the melting temperature of the wax comprises heating the web with a throughdryer.

Alternative Embodiment No. 157 is the method according to Alternative Embodiment No. 146, wherein the step of heating the web above the melting temperature of the wax comprises heating the web with an impingement-air dryer.

Alternative Embodiment No. 158 is the method according to Alternative Embodiment No. 146, wherein the step of heating the web above the melting temperature of the wax comprises heating the web with a can dryer.

Alternative Embodiment No. 159 is the method according to Alternative Embodiment No. 146, wherein the process of applying the fused wax dispersion includes wetting an aqueous wax dispersion onto both sides of the web.

Alternative Embodiment No. 160 is a method of making an absorbent cellulosic sheet comprising: depositing a cellulosic papermaking furnish on a foraminous support; dewatering the papermaking furnish to form a web comprising cellulosic fibers; adhering the dewatered web to a Yankee dryer and drying the web to a consistency of greater than 50 percent; creping the web from the Yankee dryer; subsequent to the step of creping the web from the Yankee dryer, rendering at least one surface of the web laterally hydrophobic by applying a fused wax dispersion thereto, the process of applying the fused wax dispersion including: wetting at least one surface of the web with an aqueous dispersion including a wax and an emulsifier; and heating the web above the melting temperature of the wax to fuse the wax of the dispersion and to provide a hydrophobic surface on the web, the hydrophobic surface being more hydrophobic than the web of cellulosic fibers.

Alternative Embodiment No. 161 is the method according to Alternative Embodiment No. 160, wherein the heat tolerance limit of the web is not exceeded while fusing the wax.

Alternative Embodiment No. 162 is the method according to Alternative Embodiment No. 160, wherein the step of dewatering the web comprises throughdrying the web.

Alternative Embodiment No. 163 is the method according to Alternative Embodiment No. 160, wherein the web is creped from the Yankee dryer at a consistency of at least about 95 percent.

Alternative Embodiment No. 164 is the method according to Alternative Embodiment No. 160, wherein the web is creped from the Yankee dryer at a consistency of greater than about 50 percent and less than about 95 percent.

Alternative Embodiment No. 165 is the method according to Alternative Embodiment No. 160, wherein the web is creped from the Yankee dryer at a consistency of from about 60 to about 80 percent.

Alternative Embodiment No. 166 is the method according to Alternative Embodiment No. 160, wherein the web is creped from the Yankee dryer using an undulatory creping blade.

Alternative Embodiment No. 167 is a method of making an absorbent cellulosic web resistant to moisture penetration comprising: wetting at least one surface of the web with an aqueous dispersion including a wax and an emulsifier; and heating the wetted web above the melting temperature of the wax to fuse the wax of the dispersion and to provide a hydrophobic surface on the web, the hydrophobic surface being more hydrophobic than the corresponding surface of the untreated web, wherein the wax-treated web exhibits an air permeability of at least about 25 percent of the air permeability of the untreated web.

Alternative Embodiment No. 168 is the method according to Alternative Embodiment No. 167, wherein the wax-treated web exhibits an air permeability of at least about 40 percent of the air permeability of the treated web.

Alternative Embodiment No. 169 is the method according to Alternative Embodiment No. 168, wherein the wax-treated web exhibits an air permeability of at least about 60 percent of the air permeability of the treated web.

Alternative Embodiment No. 170 is the method according to Alternative Embodiment No. 169, wherein the wax-treated web exhibits an air permeability of at least about 80 percent of the air permeability of the treated web.

Alternative Embodiment No. 171 is the method according to Alternative Embodiment No. 170, wherein the wax-treated web exhibits an air permeability substantially the same as the untreated web.

Alternative Embodiment No. 172 is the method according to Alternative Embodiment No. 167, wherein the wax-treated web exhibits an air permeability of from about 15 ft$^3$/min-ft$^2$ to about 45 ft$^3$/min-ft$^2$ at 0.5 inches of water.

Alternative Embodiment No. 173 is the method according to Alternative Embodiment No. 172, wherein the wax-treated web exhibits an air permeability of from about 50 ft$^3$/min-ft$^2$ to about 150 ft$^3$/min-ft$^2$ at 0.5 inches of water.

Alternative Embodiment No. 174 is the method according to Alternative Embodiment No. 167, wherein the wax dispersion is wetted onto the web by way of spraying it onto the web.

Alternative Embodiment No. 175 is the method according to Alternative Embodiment No. 167, wherein the wax dispersion is wetted onto the web by way of printing it onto the web.

Alternative Embodiment No. 176 is the method according to Alternative Embodiment No. 175, wherein the wax dispersion is wetted onto the web by way of gravure printing.

Alternative Embodiment No. 177 is the method according to Alternative Embodiment No. 175, wherein the wax dispersion is wetted onto the web by way of printing it onto the web with a smooth printing roll.

Alternative Embodiment No. 178 is the method according to Alternative Embodiment No. 177, wherein the wax dispersion is wetted onto the web by way of offset printing with a smooth rubber application roll.

Alternative Embodiment No. 179 is the method according to Alternative Embodiment No. 175, wherein the wax dispersion is printed onto both sides of the absorbent cellulosic sheet.

Alternative Embodiment No. 180 is the method according to Alternative Embodiment No. 167, further comprising the step of heating the aqueous wax dispersion immediately prior to applying it to the sheet.

Alternative Embodiment No. 181 is the method according to Alternative Embodiment No. 180, wherein the step of heating the aqueous dispersion is operative to increase the solids content of the aqueous dispersion.

Alternative Embodiment No. 182 is the method according to Alternative Embodiment No. 180, wherein the step of heating the aqueous wax dispersion is operative to at least partially melt the wax.

Alternative Embodiment No. 183 is the method according to Alternative Embodiment No. 167, wherein the aqueous wax dispersion is wetted onto the web with an applicator roll and wherein the aqueous wax dispersion is heated while in contact with the applicator roll.

Alternative Embodiment No. 184 is the method according to Alternative Embodiment No. 183, wherein the step of heating the aqueous wax dispersion is operative to increase the solids content of the aqueous wax dispersion.

Alternative Embodiment No. 185 is the method according to Alternative Embodiment No. 183, wherein the step of heating the aqueous wax dispersion is operative to at least partially melt the wax.

Alternative Embodiment No. 186 is a method of making an absorbent cellulosic web resistant to moisture penetration comprising: wetting at least one surface of the web with an aqueous dispersion including a wax and an emulsifier; and heating the wetted web above the melting temperature of the wax to fuse the wax of the dispersion and to provide a hydrophobic surface on the web, the hydrophobic surface being more hydrophobic than the corresponding surface of the untreated web, wherein the wax-treated web exhibits a wet tensile strength that is less than about 135 percent of wet tensile strength of the untreated web.

Alternative Embodiment No. 187 is the method according to Alternative Embodiment No. 186, wherein the wax-treated web exhibits a wet tensile strength which is less than about 125 percent of wet tensile strength of the untreated web.

Alternative Embodiment No. 188 is the method according to Alternative Embodiment No. 187, wherein the wax-treated web exhibits a wet tensile strength which is less than about 115 percent of wet tensile strength of the untreated web.

Alternative Embodiment No. 189 is the method according to Alternative Embodiment No. 188, wherein the wax-treated web exhibits a wet tensile strength which is less than about 110 percent of wet tensile strength of the untreated web.

Alternative Embodiment No. 190 is the method according to Alternative Embodiment No. 189, wherein the wax-treated web exhibits a wet tensile strength substantially the same as the untreated web.

Alternative Embodiment No. 191 is a method of making an absorbent cellulosic web resistant to moisture penetration comprising: wetting at least one surface of the web with an aqueous dispersion including a wax and an emulsifier; and heating the wetted web above the melting temperature of the wax to fuse the wax of the dispersion and to provide a hydrophobic surface on the web, wherein the hydrophobic surface of the wax-treated web exhibits a contact angle with water which is at least about 20 degrees greater at one minute than the contact angle of the corresponding surface of the web prior to treatment at one minute.

Alternative Embodiment No. 192 is the method of making an absorbent cellulosic web resistant to moisture penetration according to Alternative Embodiment No. 191, wherein the contact angle with water of the hydrophobic surface of the treated web at one minute is at least about 40 degrees greater than the contact angle of the corresponding surface of the web prior to treatment at one minute.

Alternative Embodiment No. 193 is the method of making an absorbent cellulosic web resistant to moisture penetration according to Alternative Embodiment No. 192, wherein the contact angle with water of the hydrophobic surface of the treated web at one minute is at least about 60 degrees greater than the contact angle of the corresponding surface of the web prior to treatment at one minute.

Alternative Embodiment No. 194 is the method of making an absorbent cellulosic web resistant to moisture penetration according to Alternative Embodiment No. 193, wherein the contact angle with water of the hydrophobic surface of the treated web at one minute is at least about 80 degrees greater than the contact angle of the corresponding surface of the web prior to treatment at one minute.

Alternative Embodiment No. 195 is a method of controlling microbial contamination comprising: providing an absorbent barrier sheet formed from a web of cellulosic fibers provided with a fused wax composition in intimate contact with the fibers in the web generally assimilating the morphology of the fiber surfaces, the fused wax composition including a wax and an emulsifier and being disposed in the web so that the open interstitial microstructure between fibers in the web is substantially preserved; interposing the absorbent barrier sheet between a microbial contamination source and its surroundings, the absorbent sheet being effective to impede migration of the microbial contamination source therethrough.

Alternative Embodiment No. 196 is the method according to Alternative Embodiment No. 195, wherein said microbial contamination source comprises a bacterial contamination source.

Alternative Embodiment No. 197 is the method according to Alternative Embodiment No. 196, wherein the bacterial contamination source comprises a *staphylococcus* bacteria.

Alternative Embodiment No. 198 is the method according to Alternative Embodiment No. 196, wherein the bacterial contamination source comprises an *E. coli* bacteria.

Alternative Embodiment No. 199 is the method according to Alternative Embodiment No. 196, wherein the bacterial contamination source comprises a *streptococcus* bacteria.

Alternative Embodiment No. 200 is the method according to Alternative Embodiment No. 196, wherein the bacterial contamination source comprises a *salmonella* bacteria.

Alternative Embodiment No. 201 is the method according to Alternative Embodiment No. 195, wherein the microbial composition comprises an alga.

Alternative Embodiment No. 202 is the method according to Alternative Embodiment No. 195, wherein the microbial contamination source comprises a fungus.

Alternative Embodiment No. 203 is the method according to Alternative Embodiment No. 195, wherein the microbial contamination source comprises a virus.

Alternative Embodiment No. 204 is the method according to Alternative Embodiment No. 203, wherein the virus is a rhino virus.

Alternative Embodiment No. 205 is the method according to Alternative Embodiment No. 203, wherein the virus is an influenza virus.

Alternative Embodiment No. 206 is a method of controlling microbial contamination comprising: providing an absorbent barrier sheet formed from a web of cellulosic fibers provided with a fused wax composition in intimate contact with the fibers in the web generally assimilating the morphology of the fiber surfaces, the fused wax composition including a wax and an emulsifier and being disposed in the web so that the open interstitial microstructure between fibers in the web is substantially preserved; covering a substrate with the absorbent barrier sheet, the absorbent sheet being effective to impede migration from a microbial contamination source to the substrate.

Alternative Embodiment No. 207 is the method according to Alternative Embodiment No. 206, wherein said microbial contamination source comprises a bacterial contamination source.

Alternative Embodiment No. 208 is the method according to Alternative Embodiment No. 207, wherein the bacterial contamination source comprises a *staphylococcus* bacteria.

Alternative Embodiment No. 209 is the method according to Alternative Embodiment No. 207, wherein the bacterial contamination source comprises an *E.coli* bacteria.

Alternative Embodiment No. 210 is the method according to Alternative Embodiment No. 207, wherein the bacterial contamination source comprises a *streptococcus* bacteria.

Alternative Embodiment No. 211 is the method according to Alternative Embodiment No. 207, wherein the bacterial contamination source comprises a *salmonella* bacteria.

Alternative Embodiment No. 212 is the method according to Alternative Embodiment No. 206, wherein the microbial composition comprises an alga.

Alternative Embodiment No. 213 is the method according to Alternative Embodiment No. 206, wherein the microbial contamination source comprises a fungus.

Alternative Embodiment No. 214 is the method according to Alternative Embodiment No. 206, wherein the microbial contamination source comprises a virus.

Alternative Embodiment No. 215 is the method according to Alternative Embodiment No. 214, wherein the virus is a rhino virus.

Alternative Embodiment No. 216 is the method according to Alternative Embodiment No. 214, wherein the virus is an influenza virus.

Alternative Embodiment No. 217 is the method according to Alternative Embodiment No. 214, wherein the virus is a corona virus of the class believed to cause severe acute respiratory syndrome (SARS) in humans.

Alternative Embodiment No. 218 is a multi-ply absorbent structure comprising a plurality of wax-treated plies exhibiting resistance to moisture penetration having at least two contiguous wax-treated plies each of which comprises an absorbent web of cellulosic fibers provided with a fused composition in intimate contact with the fibers in the web generally assimilating the morphology of the fiber surfaces, the fused composition including a wax and an emulsifier and being disposed in the web so that the open interstitial microstructure between fibers in the web is substantially preserved and wherein further the multi-ply absorbent structure is characterized by a resistance to moisture penetration greater than its constituent plies.

Alternative Embodiment No. 219 is the multilayer absorbent structure according to Alternative Embodiment No. 218, wherein the multilayer absorbent structure is a folded napkin including at least one ply consisting of the wax treated absorbent sheet.

Alternative Embodiment No. 220 is the multilayer absorbent structure according to Alternative Embodiment No. 219, wherein the multilayer absorbent structure is a folded napkin including at least two plies consisting of the wax treated absorbent sheet.

Alternative Embodiment No. 221 is the multilayer absorbent structure according to Alternative Embodiment No. 218, wherein the multilayer absorbent structure is a two-ply folded napkin wherein one ply consists of the wax treated absorbent sheet and the other ply consists of an absorbent sheet of cellulosic fiber which is untreated with wax.

Alternative Embodiment No. 222 is the multilayer absorbent structure according to Alternative Embodiment No. 218, wherein the multilayer absorbent structure is in the form of a two panel folded napkin.

Alternative Embodiment No. 223 is the multilayer absorbent structure according to Alternative Embodiment No. 218, wherein the multilayer absorbent structure is in the form of a four panel folded napkin.

Alternative Embodiment No. 224 is a multi-ply absorbent sheet comprising a plurality of absorbent cellulosic plies bonded together wherein at least a first treated ply is a wax treated cellulosic ply exhibiting resistance to moisture penetration wherein the wax treated cellulosic ply comprises an absorbent web of cellulosic fiber and the fused residue of an aqueous wax dispersion applied to one side thereof, wherein the first treated ply has a laterally hydrophobic surface and a relatively hydrophilic surface such that the contact angle of the laterally hydrophobic surface with water is at least about 5 degrees greater than the contact angle of the relatively hydrophilic surface with water and wherein the hydrophobic surface exhibits a moisture penetration delay of from about 3 to about 40 seconds.

Alternative Embodiment No. 225 is the multi-ply absorbent sheet according to Alternative Embodiment No. 224, wherein the hydrophobic surface of the first wax-treated ply has a contact angle with water at least about 10 degrees greater than the contact angle with water of the relatively hydrophilic surface.

Alternative Embodiment No. 226 is the multi-ply absorbent sheet according to Alternative Embodiment No. 225, wherein the hydrophobic surface of the first wax-treated ply has a contact angle with water at least about 15 degrees greater than the contact angle with water of the relatively hydrophilic surface.

Alternative Embodiment No. 227 is the multi-ply absorbent sheet according to Alternative Embodiment No. 226, wherein the hydrophobic surface of the first wax-treated ply has a contact angle with water at least about 20 degrees greater than the contact angle with water of the relatively hydrophilic surface.

Alternative Embodiment No. 228 is the multi-ply absorbent sheet according to Alternative Embodiment No. 227, wherein the hydrophobic surface of the first wax-treated ply has a contact angle with water at least about 40 degrees greater than the contact angle with water of the relatively hydrophilic surface.

Alternative Embodiment No. 229 is the multi-ply absorbent sheet according to Alternative Embodiment No. 228, wherein the hydrophobic surface of the first wax-treated ply has a contact angle with water at least about 80 degrees greater than the contact angle with water of the relatively hydrophilic surface.

Alternative Embodiment No. 230 is the multi-ply absorbent sheet according to Alternative Embodiment No. 224, wherein the hydrophobic surface of the first treated ply is internally disposed in the product.

Alternative Embodiment No. 231 is the multi-ply absorbent sheet according to Alternative Embodiment No. 224, wherein at least two plies are glue-bonded.

Alternative Embodiment No. 232 is the multi-ply absorbent sheet according to Alternative Embodiment No. 224, further comprising a second treated ply comprising a wax treated cellulosic ply exhibiting resistance to moisture penetration wherein the wax treated cellulosic ply comprises an absorbent web of cellulosic fiber and the fused residue of an aqueous wax dispersion applied to one side thereof, wherein the second treated ply has a laterally hydrophobic surface and a relatively hydrophilic surface such that the contact angle of the laterally hydrophobic surface with water is at least about 5 degrees greater than the contact angle of the relatively hydrophilic surface with water and wherein the hydrophobic surface of the second treated ply exhibits a moisture penetration delay of from about 3 to about 40 seconds.

Alternative Embodiment No. 233 is the multi-ply absorbent sheet according to Alternative Embodiment No. 232, wherein the hydrophobic surfaces of the first and second treated plies are internally disposed in the multi-ply sheet.

Alternative Embodiment No. 234 is the multi-ply absorbent sheet according to Alternative Embodiment No. 233, wherein the hydrophobic surfaces of said first and second treated plies are in contact with one another.

Alternative Embodiment No. 235 is the multi-ply absorbent sheet according to Alternative Embodiment No. 234, in the form of a napkin.

Alternative Embodiment No. 236 is the multi-ply absorbent sheet according to Alternative Embodiment No. 232, wherein the hydrophobic surface of the first absorbent ply is internally disposed in the sheet and the hydrophobic surface of the second treated ply is an outer surface of the product.

Alternative Embodiment No. 237 is the multi-ply absorbent sheet according to Alternative Embodiment No. 232, wherein the hydrophobic surface of the first treated ply is an outer surface of the sheet and the hydrophobic surface of the second treated ply is the other outer surface of the sheet.

Alternative Embodiment No. 238 is a multi-ply absorbent sheet comprising a plurality of absorbent cellulosic plies bonded together including a wax-treated ply, wherein the wax-treated ply comprises an absorbent web of cellulosic fibers provided with a fused composition in intimate contact with the fibers in the web generally assimilating the morphology of the fiber surfaces, the fused composition including a wax and an emulsifier and being disposed in the web so that the open interstitial microstructure between fibers in the ply is substantially preserved.

Alternative Embodiment No. 239 is the multi-ply absorbent sheet according to Alternative Embodiment No. 238, wherein the wax treated ply is internally disposed in the sheet between two outer plies.

Alternative Embodiment No. 240 is the multi-ply sheet according to Alternative Embodiment No. 238, wherein the sheet is a 3 ply sheet with a central wax treated ply.

Alternative Embodiment No. 241 is the multi-ply sheet according to Alternative Embodiment No. 240, in the form of a three-ply napkin.

Alternative Embodiment No. 242 is a method of making a multiply absorbent sheet which resists moisture penetration comprising: preparing a moisture penetration resistant treated cellulosic ply by way of: providing an absorbent cellulosic web; wetting one surface of the web with an aqueous dispersion including a wax and an emulsifier; and heating the web above the melting temperature of the wax to fuse the wax of the dispersion and to provide a hydrophobic surface on the web, the hydrophobic surface being more hydrophobic than the web of cellulosic fiber; applying an adhesive to the treated ply; and bonding the treated ply to a second cellulosic ply.

Alternative Embodiment No. 243 is the method according to Alternative Embodiment No. 232, wherein the adhesive is applied to a surface of the treated ply that was wetted with the aqueous dispersion.

Alternative Embodiment No. 244 is the method according to Alternative Embodiment No. 232, wherein the second ply is an untreated ply.

Alternative Embodiment No. 245 is the method according to Alternative Embodiment No. 232, wherein the plies are bonded to each other in a press nip.

Alternative Embodiment No. 246 is the method according to Alternative Embodiment No. 242, wherein the adhesive is printed onto the treated ply.

Alternative Embodiment No. 247 is an absorbent composite comprising an absorbent core and a cover sheet disposed thereon, the cover sheet consisting of an absorbent cellulosic sheet exhibiting resistance to moisture penetration including an absorbent web of cellulosic fibers provided with a fused composition in intimate contact with the fibers in the web generally assimilating the morphology of the fiber surfaces, the fused composition including a wax and an emulsifier and being disposed in the web so that the open interstitial microstructure between fibers in the ply is substantially preserved.

Alternative Embodiment No. 248 is the absorbent composite according to Alternative Embodiment No. 247, wherein the absorbent core comprises cellulosic fiber.

Alternative Embodiment No. 249 is the absorbent composite according to Alternative Embodiment No. 242, wherein the absorbent core comprises superabsorbent polymer.

Alternative Embodiment No. 250 is the absorbent composite according to Alternative Embodiment No. 249, wherein the superabsorbent polymer is an acrylic acid polymer.

Alternative Embodiment No. 251 is the absorbent composite according to Alternative Embodiment No. 247, wherein the outer surface of the cover layer is laterally hydrophobic with respect to its inner portion such that moisture applied to the outer surface of the cover layer migrates inwardly and laterally in the cover layer beneath the outer surface to a greater extent than it migrates laterally at the outer surface.

Alternative Embodiment No. 252 is the absorbent composite according to Alternative Embodiment No. 251, wherein moisture applied to the outer surface of the cover layer does not migrate substantially on the outer surface in a lateral direction.

Alternative Embodiment Nos. 253-260 are directed to respirators such as surgical masks (N95 respirators) and the like (e.g., N100 respirators) for limiting airborne microbial contamination. Specifically, filter media for such devices and the devices themselves are contemplated within the scope of the present invention.

Alternative Embodiment No. 253 is a filter media for a respirator comprising an absorbent web of cellulosic fibers provided with a wax composition in intimate contact with the fibers in the web generally assimilating the morphology of the fiber surfaces, the wax composition having no independent macrostructure and being disposed in the web so that the open interstitial microstructure between fibers in the web is substantially preserved and wherein the web exhibits an absorbency of at least 3 g/g.

Alternative Embodiment No. 254 is the filter media according to Alternative Embodiment No. 253, wherein the web exhibits an absorbency of at least 6 g/g.

Alternative Embodiment No. 255 is the filter media according to Alternative Embodiment No. 253, wherein the web exhibits an absorbency of at least 8 g/g.

Alternative Embodiment No. 256 is the filter media according to Alternative Embodiment No. 253, wherein the web exhibits an air permeability of at least 25 percent of the air permeability of a like web untreated with the aqueous wax dispersion.

Alternative Embodiment No. 257 is the filter media according to Alternative Embodiment No. 253, wherein the web exhibits an air permeability of at least 40 percent of the air permeability of a like web untreated with aqueous wax dispersion.

Alternative Embodiment No. 258 is the filter media according to Alternative Embodiment No. 253, wherein the web exhibits an air permeability of at least 60 percent of the air permeability of a like web untreated with the aqueous wax dispersion.

Alternative Embodiment No. 259 is the filter media according to Alternative Embodiment No. 253 wherein the web exhibits an air permeability of at least 80 percent of the air permeability of a like web untreated with the aqueous wax dispersion.

Alternative Embodiment No. 260 is the filter media according to Alternative Embodiment No. 253, wherein the web exhibits substantially the same air permeability as a like web of cellulosic fiber untreated with the aqueous wax dispersion.

Alternative Embodiment No. 261 is a tissue having a basis weight of from about 15 to about 30 lbs per 3000 square foot ream exhibiting resistance to wet-through from propelled liquid incident thereon, comprising a cellulosic web treated with the heat fused residue of a wax emulsion applied thereto, the tissue exhibiting liquid penetration barrier properties such that less than about 20 percent of liquid sorbed from 0.1 ml thereof propelled to one surface of the tissue in a sneeze simulation test will penetrate to the surface of the tissue opposite to the insult.

Alternative Embodiment No. 262 is a tissue having a basis weight of from about 15 to about 30 lbs per 3000 square foot ream exhibiting resistance to wet-through from propelled liquid incident thereon, comprising a cellulosic web treated with the heat fused residue of a wax emulsion applied thereto, the tissue exhibiting liquid penetration barrier properties such that less than about 10 percent of liquid sorbed from 0.1 ml thereof propelled to one surface of the tissue in a sneeze simulation test will penetrate to the surface of the tissue opposite to the insult.

Alternative Embodiment No. 263 is a tissue having a basis weight of from about 15 to about 30 lbs per 3000 square foot ream exhibiting resistance to wet-through from propelled liquid incident thereon, comprising a cellulosic web treated with the heat fused residue of a wax emulsion applied thereto, the tissue exhibiting liquid penetration barrier properties such that less than about 5 percent of liquid sorbed from a 0.1 ml insult propelled to one surface of the tissue in a sneeze simulation test will penetrate to the surface of the tissue opposite to the insult.

Alternative Embodiment No. 264 is the tissue according to Alternative Embodiment No. 261, wherein the tissue is a 1 ply tissue.

Alternative Embodiment No. 265 is the tissue according to Alternative Embodiment No. 261, wherein the tissue is a 2 ply tissue.

Alternative Embodiment No. 266 is the tissue according to Alternative Embodiment No. 261, wherein the tissue is a 3 ply tissue.

Alternative Embodiment No. 267 is a tissue having a basis weight of from about 15 to about 30 lbs per 3000 square foot ream exhibiting resistance to wet-through from propelled liquid incident thereon, comprising a cellulosic web treated with the heat fused residue of a wax emulsion applied thereto, wherein the liquid sorbed from liquid propelled to one surface of the tissue will exhibit a maximum concentration at the central portion of the tissue, wherein that maximum concentration is at least about 1.25 times the concentration of the liquid sorbed at the surface portion proximate the vicinity of impact and wherein the maximum is at least about 2.5 times the concentration of liquid sorbed from the insult at the surface portion distal to impact.

Alternative Embodiment No. 268 is a method of measuring the resistance of tissue to liquid penetration by a simulated sneeze comprising the steps of positioning a target sample of tissue and propelling a predetermined amount of liquid to the target sample followed by measuring the penetration of the liquid into the sample.

Alternative Embodiment No. 269 is the embodiment according to Alternative Embodiment No. 268, wherein the predetermined amount of liquid is from about 0.25 to about 4 ml of liquid.

Alternative Embodiment No. 270 is the embodiment according to Alternative Embodiment No. 268, wherein the predetermined amount of liquid is from about 0.5 to about 1.5 ml of liquid.

Alternative Embodiment No. 271 is the embodiment according to Alternative Embodiment No. 268, wherein the liquid is propelled by a pneumatic pressure source having a pressure of from about 5 psig to about 75 psig.

Alternative Embodiment No. 272 is the embodiment according to Alternative Embodiment No. 268, wherein the liquid is propelled by a pneumatic pressure source having a pressure of from about 10 psig to about 50 psig.

Alternative Embodiment No. 273 is the embodiment according to Alternative Embodiment No. 268, wherein the liquid is propelled by a pneumatic pressure source having a pressure of from about 15 psig to about 30 psig.

Alternative Embodiment No. 274 is the embodiment according to Alternative Embodiment No. 268, wherein the target sample is positioned in a chamber under substantially ambient conditions.

Alternative Embodiment No. 275 is the embodiment according to Alternative Embodiment No. 268, wherein the penetration of liquid is characterized as a function of distance from the impact of the test liquid.

Alternative Embodiment No. 276 is the embodiment according to Alternative Embodiment No. 268, wherein the target sample of tissue is a multi-ply sample of tissue.

Alternative Embodiment No. 277 is the embodiment according to Alternative Embodiment No. 268, wherein the target sample of tissue has from 2 to 8 separable plies.

Alternative Embodiment No. 278 is the embodiment according to Alternative Embodiment No. 268, wherein the target sample of tissue has from 3 to 6 separable plies.

Alternative Embodiment No. 279 is the embodiment according to Alternative Embodiment No. 268, wherein the target sample of tissue is a multi-ply sample of separable plies, each of which plies has a basis weight of from about 7 to about 15 lbs. per 3000 square foot ream.

Alternative Embodiment No. 280 is the embodiment according to Alternative Embodiment No. 268, wherein the target sample of tissue is a multi-ply sample of separable plies, each of which plies has a basis weight of from about 9 to about 13 lbs. per 3000 square foot ream.

In a still further aspect of the present invention there is provided a method and apparatus for testing tissue resistance to penetration by propelled liquid to penetration by propelled liquid, that is, simulating a sneeze and characterizing the resistance to moisture penetration.

What is claimed is:

1. A tissue comprising: a cellulosic fibrous web, the fibers in said cellulosic fibrous web bearing heat fused wax residue in intimate contact with the fibers in the web, said wax being disposed in the web so that the open interstitial microstructure between fibers in the web is substantially preserved and the web has a laterally hydrophobic surface which exhibits a moisture penetration delay of at least about 2 seconds as well as a contact angle with water of at least 50 degrees at one minute of contact time with the web.

2. The tissue according to claim 1, wherein the laterally hydrophobic surface of the web exhibits a moisture penetration delay of from about 3 to about 40 seconds.

3. The tissue according to claim 1, wherein the laterally hydrophobic surface of the web exhibits a moisture penetration delay of at least about 5 seconds.

4. The tissue according to claim 1, wherein the laterally hydrophobic surface of the web exhibits a moisture penetration delay of at least about 10 seconds.

5. The tissue according to claim 1, wherein the laterally hydrophobic surface of the web exhibits a moisture penetration delay of at least about 20 seconds.

6. A tissue comprising: a sided absorbent cellulosic fibrous web exhibiting resistance to moisture penetration having a first and second surface, the cellulosic fibers in said sided absorbent cellulosic fibrous web being provided with a fused wax composition in intimate contact with the fibers in the web, generally assimilating the morphology of the fiber surfaces, the fused wax composition including a wax and an emulsifier and being disposed in the web so that the open interstitial microstructure between fibers in the web is substantially preserved and such that the fused wax is concentrated at the first surface of the web and decreases in concentration in a direction toward the second surface whereby the web has a laterally hydrophobic surface exhibiting a moisture penetration delay of at least about 3 seconds.

7. The tissue according to claim 6, wherein wax is present in an amount of from about 1 to about 20 weight percent based on the amount of wax and cellulosic fiber in the web.

8. The tissue according to claim 6, wherein wax is present in an amount of from about 2 to about 10 weight percent based on the amount of wax and cellulosic fiber in the web.

9. The tissue according to claim 6, wherein wax is present in an amount of from about 3 to about 5 weight percent based on the amount of wax and cellulosic fiber in the web.

10. The tissue according to claim 6, wherein the web exhibits substantially the same wet tensile strength as a like web of cellulosic fiber untreated with the wax and emulsifier composition.

11. An absorbent cellulosic sheet exhibiting resistance to moisture penetration comprising an absorbent web of cellulosic fiber and the fused residue of an aqueous wax dispersion applied to one side thereof, wherein the sheet has a laterally hydrophobic surface and a relatively hydrophilic surface such that the contact angle of the laterally hydrophobic surface with water is at least about 5 degrees greater than the contact angle of the relatively hydrophilic surface with water.

12. The absorbent cellulosic sheet according to claim 11, wherein the contact angle of the laterally hydrophobic surface with water is at least about 10 degrees greater than the contact angle of the relatively hydrophilic surface with water.

13. The absorbent cellulosic sheet according to claim 11, wherein the contact angle of the laterally hydrophobic surface with water is at least about 20 degrees greater than the contact angle of the relatively hydrophilic surface with water.

14. The absorbent cellulosic sheet according to claim 11, wherein the contact angle of the laterally hydrophobic surface with water is at least about 40 degrees greater than the contact angle of the relatively hydrophilic surface with water.

15. The absorbent cellulosic sheet according to claim 11, wherein the contact angle of the laterally hydrophobic surface with water is at least about 80 degrees greater than the contact angle of the relatively hydrophilic surface with water.

16. An absorbent wax-treated cellulosic fibrous web, comprising: at least one absorbent web of cellulosic fiber having a hydrophobic side and a hydrophilic side; wherein the hydrophobic side comprises at least one surfactant and at least one wax; wherein at least one wax has a melting point of about 85° C.; wherein at least one wax is substantially fused to the fibers, the wax being in intimate contact with the fibers in the web, generally assimilating the morphology of the fiber surfaces, the wax having no independent macrostructure and being disposed in the web so that the open interstitial microstructure between fibers in the web is substantially preserved; wherein the hydrophobic side allows water applied to the hydrophobic side to eventually diffuse into the hydrophilic side; wherein water applied to the hydrophilic side is delayed from diffusing to the hydrophobic side; wherein the delay is at least about two seconds; and wherein water applied to the hydrophobic side diffuses into the hydrophilic side and laterally diffuses in the hydrophilic side, prior to lateral diffusion of the water on the hydrophobic side and wherein the web exhibits an absorbency of at least 3 g/g.

17. The absorbent wax-treated cellulosic fibrous web according to claim 16, wherein the web exhibits an air permeability of at least 25 percent of the air permeability of a like web untreated with the wax and emulsifier composition.

18. The absorbent wax-treated cellulosic fibrous web according to claim 16, wherein the web exhibits an air permeability of at least 40 percent of the air permeability of a like web untreated with the wax and emulsifier composition.

19. The absorbent wax-treated cellulosic fibrous web according to claim 16, wherein the web exhibits an air permeability of at least 60 percent of the air permeability of a like web untreated with the wax and emulsifier composition.

20. The absorbent wax-treated cellulosic fibrous web according to claim 16, wherein the web exhibits substantially the same air permeability as a like web of cellulosic fiber untreated with the wax and emulsifier composition.

21. A multi-ply absorbent sheet comprising a plurality of absorbent cellulosic tissue plies bonded together wherein at least a first treated ply is a wax treated cellulosic tissue ply exhibiting resistance to moisture penetration wherein the wax treated cellulosic tissue ply comprises an absorbent web of cellulosic fiber and the fused residue of an aqueous wax dispersion applied to one side thereof, wherein the first treated ply has a laterally hydrophobic surface and a relatively hydrophilic surface such that the contact angle of the laterally hydrophobic surface with water is at least about 5 degrees greater than the contact angle of the relatively hydrophilic surface with water and wherein the hydrophobic surface exhibits a moisture penetration delay of from about 3 to about 40 seconds.

22. The multi-ply absorbent sheet according to claim 21, wherein the hydrophobic surface of the first treated ply is internally disposed in the sheet.

23. The multi-ply absorbent sheet according to claim 21, wherein at least two plies are glue-bonded.

24. The multi-ply absorbent sheet according to claim 21, wherein the hydrophobic surface of the first wax-treated ply has a contact angle with water at least about 10 degrees greater than the contact angle with water of the relatively hydrophilic surface.

25. The multi-ply absorbent sheet according to claim 21, wherein the hydrophobic surface of the first wax-treated ply has a contact angle with water at least about 15 degrees greater than the contact angle with water of the relatively hydrophilic surface.

\* \* \* \* \*